United States Patent [19]

Suzuki et al.

[11] Patent Number: 6,072,941
[45] Date of Patent: Jun. 6, 2000

[54] IMAGE PROCESSING APPARATUS AND METHOD WHICH CLASSIFIES IMAGES ACCORDING TO ATTRIBUTES

[75] Inventors: Kazuyoshi Suzuki; Akihiko Sakai, both of Kawasaki; Masahiro Iwadate, Yokohama; Michiko Hirayu, Kawasaki, all of Japan

[73] Assignee: Canon Kabushiki Kaisha, Tokyo, Japan

[21] Appl. No.: 08/871,630

[22] Filed: Jun. 9, 1997

Related U.S. Application Data

[63] Continuation of application No. 08/336,070, Nov. 4, 1994, abandoned.

[30] Foreign Application Priority Data

Nov. 8, 1993 [JP] Japan .................................. 5-278430

[51] Int. Cl.$^7$ .................................................. G06K 15/02
[52] U.S. Cl. ........................ 395/109; 395/110; 395/112; 358/462
[58] Field of Search ..................... 395/109, 110, 395/112; 358/462, 452, 456, 465, 466; 382/176

[56] References Cited

U.S. PATENT DOCUMENTS

| | | | |
|---|---|---|---|
| 4,641,197 | 2/1987 | Miyagi ..................... | 358/462 |
| 4,893,188 | 1/1990 | Murakami et al. ........... | 358/456 |
| 4,903,145 | 2/1990 | Funada ..................... | 358/462 |
| 4,908,716 | 3/1990 | Sakano ..................... | 358/462 |
| 4,953,013 | 8/1990 | Tsuji et al. ................ | 358/462 |
| 4,996,603 | 2/1991 | Kanemitsu et al. .......... | 358/462 |
| 4,998,122 | 3/1991 | Kanno et al. .............. | 358/462 |
| 5,075,788 | 12/1991 | Funada ..................... | 358/462 |
| 5,101,438 | 3/1992 | Kanada et al. ............. | 382/176 |
| 5,113,492 | 5/1992 | Ariki et al. ............... | 395/147 |
| 5,153,925 | 10/1992 | Tanioka et al. ............ | 358/462 |
| 5,303,381 | 4/1994 | Yagasaki . | |
| 5,351,314 | 9/1994 | Vaezi . | |
| 5,377,021 | 12/1994 | Mori ....................... | 358/462 |

FOREIGN PATENT DOCUMENTS

| | | | |
|---|---|---|---|
| 0325417 | 7/1989 | European Pat. Off. ........ | G06F 15/62 |
| 0415373 | 3/1991 | European Pat. Off. ......... | G06K 9/20 |
| 0629078 | 12/1994 | European Pat. Off. ......... | H04N 1/40 |
| 2217548 | 10/1989 | United Kingdom ........... | H04N 1/387 |

OTHER PUBLICATIONS

"Automated Entry System For Printed Documents", T. Akiyama, et al. Pattern Recognition, 1990, UK, vol. 23, No. 11, ISSN 0031-3203, pp. 1141-1154.

*Primary Examiner*—Scott Rogers
*Attorney, Agent, or Firm*—Fitzpatrick, Cella, Harper & Scinto

[57] ABSTRACT

An image processor, in which the attributes of an image are classified, and optimal processing for each attribute is performed, thereby improving the overall quality of the image. When this processing method is applied to a copying machine, a high processing efficiency is realized, and an area designating operation is omitted. The image processor includes a block selection processing unit for classifying images stored in a storage unit according to various attributes and provides area information for each attribute.

10 Claims, 33 Drawing Sheets

FIG. 30A
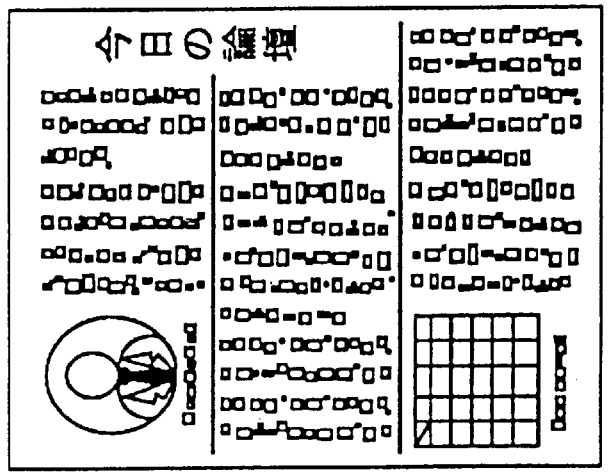
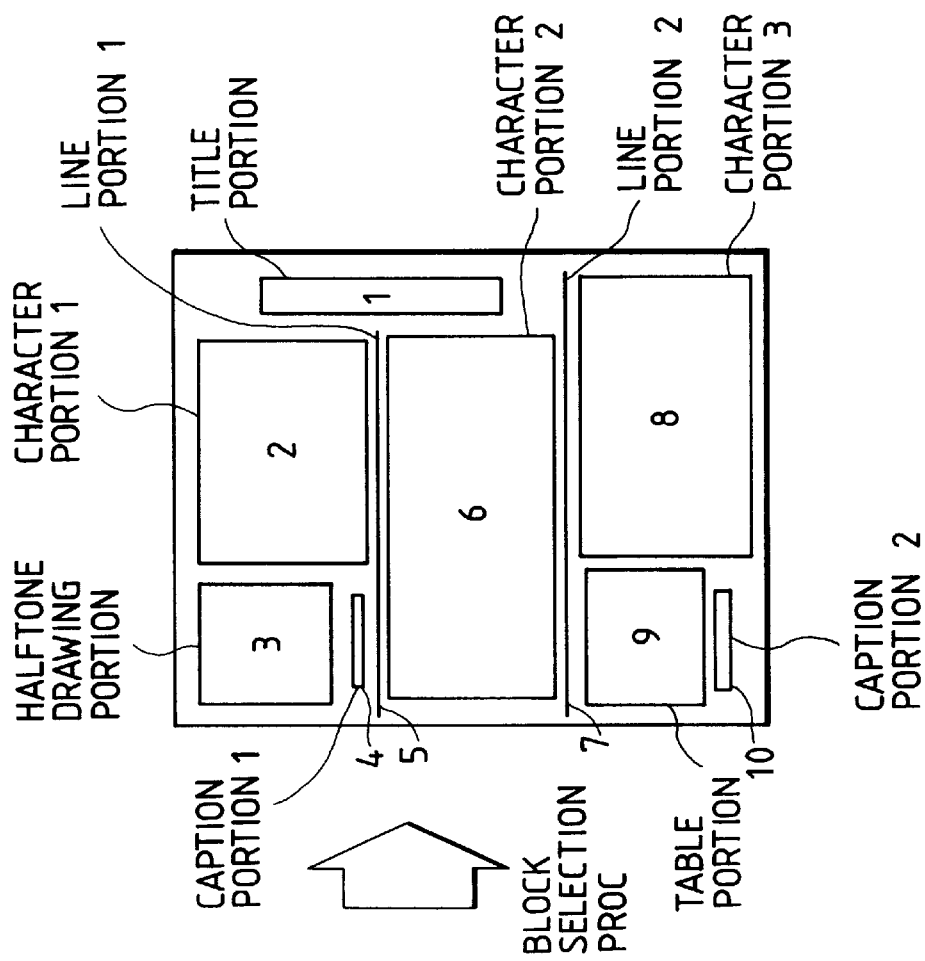

FIG. 30B

| NUMBER | UNIT CLASSIFICATION | UPPER-LEFT x COORDINATE OF UNIT AREA | UPPER-LEFT y COORDINATE OF UNIT AREA | WIDTH OF UNIT AREA |
|---|---|---|---|---|
| 1 | TITLE PORTION | 235 | 45 | 18 | 106 |
| 2 | CHARACTER PORTION | 150 | 12 | 124 | 86 |
| 3 | HALFTONE DRAWING PORTION | 8 | 13 | 62 | 74 |
| 4 | CAPTION PORTION | 14 | 76 | 38 | 5 |
| 5 | LINE PORTION | 3 | 80 | 193 | 2 |
| 6 | CHARACTER PORTION | 6 | 82 | 187 | 68 |
| 7 | LINE PORTION | 2 | 163 | 218 | 1 |
| 8 | CHARACTER PORTION | 78 | 166 | 168 | 65 |
| 9 | TABLE PORTION | 4 | 168 | 70 | 73 |
| 10 | CAPTION PORTION | 9 | 242 | 45 | 5 |

FIG. 31

| | READER UNIT READING DENSITY (1-10) | EDGE EMPHASIS | COLOR | SHADING CORRECTION |
|---|---|---|---|---|
| CHARACTER PORTION | 5 | YES | BLACK | NO |
| TITLE PORTION | 6 | YES | RED | NO |
| CLOSING LINE PORTION | 5 | NO | BLACK | NO |
| TABLE PORTION | 5 | NO | BLACK | NO |
| HALFTONE DRAWING PORTION | 10-(AREA AVERAGE DENSITY) | NO | BLUE | YES |
| LINE DRAWING PORTION | 5 | NO | GREEN | NO |
| LINE PORTION | 5 | NO | BLACK | NO |
| CAPTION PORTION | 6 | YES | BLACK | NO |

2601

IMAGE PROCESSING APPARATUS AND METHOD WHICH CLASSIFIES IMAGES ACCORDING TO ATTRIBUTES

This application is a continuation of application Ser. No. 08/336,070 filed Nov. 4, 1994 abandoned.

BACKGROUND OF THE INVENTION

1. Field of the Invention

The present invention relates to an image processing apparatus having a function of classifying input images according to various attributes (or attribution), and an image processing method.

2. Related Background Art

Conventionally, in extracting a certain portion (e.g., a photograph portion or a table portion) from an image, the portion is manually designated by using an editor or the like.

In addition, the attributes of an image are classified as two portions, i.e., a photograph portion and a character portion, and methods such as image processing methods are variably used.

Extraction of a portion of a given attribute from an image, however, requires a cumbersome manual operation. In addition, since the attributes of an image can only be classified as a photograph portion and a character portion, finer processing corresponding to each attribute of the image cannot be performed.

Especially, attributes cannot be automatically classified. For this reason, edit processing in, e.g., a copying machine is complicated.

Classification of attributes is disclosed in U.S. patent application Ser. Nos. 771,220 (filed on Oct. 4, 1991), 787,615 (filed on Nov. 4, 1991), 832,594 (filed on Feb. 7, 1992), 832,725 (filed on Feb. 7, 1992), and 873,012 (filed on Apr. 24, 1992), and U.S. Pat. No. 5,303,381 issued on Apr. 12, 1994.

There is, however, room for improvement in application to a copying machine.

Especially, there is room for improvement in operability and apparatus arrangement.

SUMMARY OF THE INVENTION

The present invention has been made in consideration of the above situation, and has as its object to provide an image processing apparatus and method which can efficiently edit image data.

In order to achieve the above object, according to the present invention, there is provided an image processing apparatus comprising reading means for scanning an original and generating image data, classifying means for classifying a plurality of areas based on an attribute of the image data in a respective area and outputting area information and classification information, editing means for editing the image data by using the area information and the classification information, and image forming means for forming an image in accordance with the image data edited by the editing means.

It is another object of the present invention to improve the overall quality of an image by performing optimal processing for each attribute using a processing means for finely classifying the attributes of the image (as a character portion, a title portion, a table portion, a halftone drawing portion a line drawing portion, a line portion, a caption such as a table or a drawing, a closing line portion, and the like), realize a high processing efficiency when the present invention is applied to a copying machine, and omit an area designating operation by automatically recognizing the attributes.

It is still another object of the present invention to provide a copying machine having a novel function.

It is still another object of the present invention to systematize the arrangement of a copying machine.

The above and other objects, features, and advantages of the present invention will be apparent from the following detailed description in conjunction with the accompanying drawings and the appended claims.

BRIEF DESCRIPTION OF THE DRAWINGS

FIGS. 30A and 30B are views showing a block selection processing result and a data structure of the processing result;

FIG. 31 is a view showing a reference table showing correspondence between reading conditions and the attributes of units which can be classified by block selection processing;

DETAILED DESCRIPTION OF THE PREFERRED EMBODIMENTS

[First Embodiment]

Figure 1:
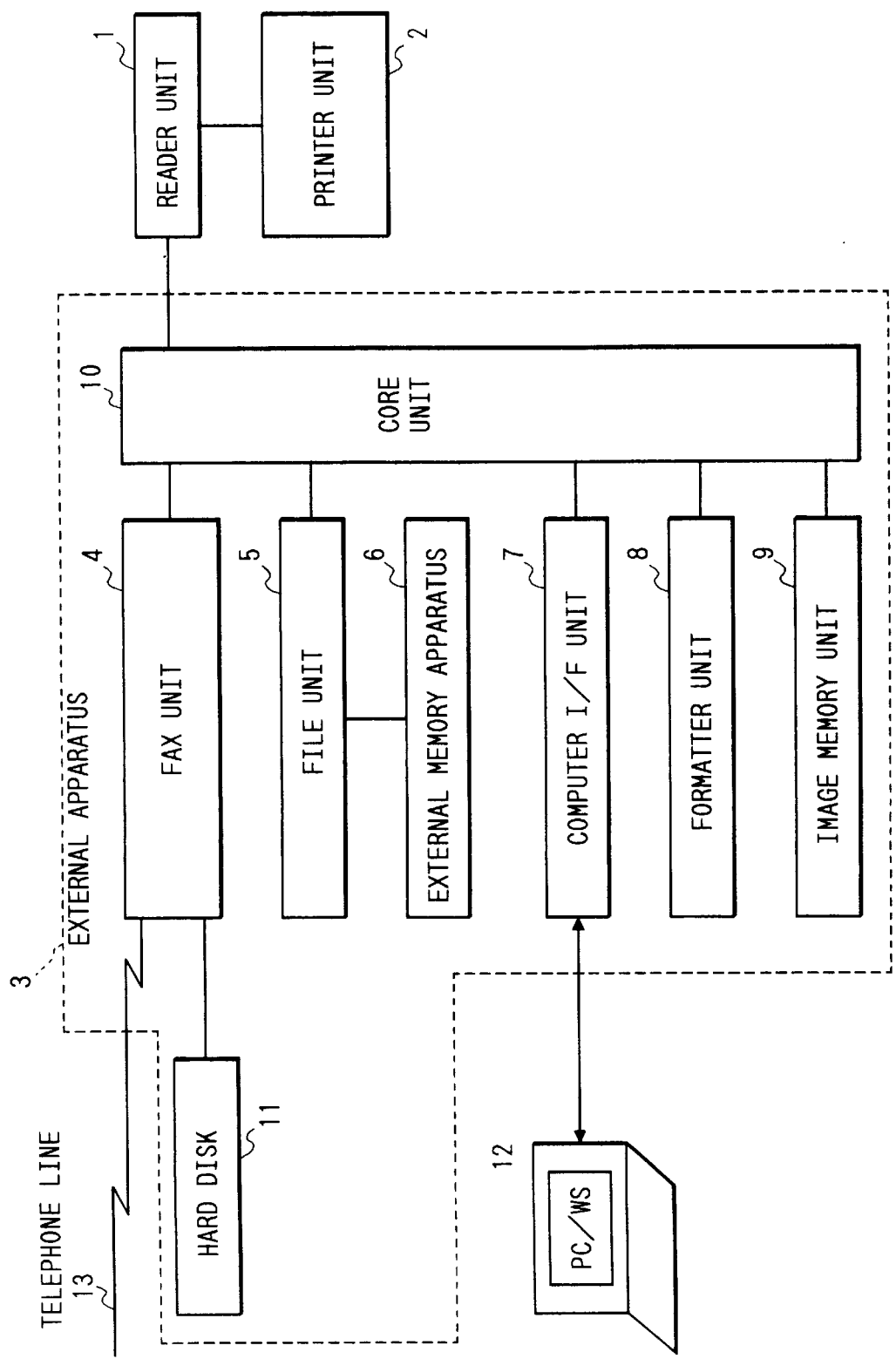
FIG. 1 is a block diagram showing the overall arrangement of an image forming apparatus.

FIG. 1 is a block diagram showing the arrangement of an image forming system according to an embodiment of the present invention.

Referring to FIG. 1, an image input apparatus (to be referred to as a reader unit hereinafter) 1 converts an image on an original into image data.

An image output apparatus (to be referred to as a printer unit hereinafter) 2 has a plurality of types of recording sheet cassettes and outputs image data as a visible image onto a recording sheet in response to a print instruction. An external apparatus 3 is electrically connected to the reader unit 1 and has various functions. The external apparatus 3 includes a fax unit 4, a file unit 5, an external memory apparatus 6 connected to the file unit 5, a computer I/F unit 7 for connecting the external apparatus 3 to a computer, a formatter unit 8 for converting information from the computer into a visible image, an image memory unit 9 for temporarily storing information sent from the reader unit 1 or a computer 12 and classifying the attributes (attribution) of the partial areas in an image expressed by temporarily stored image information (this process will be referred to as block selection processing hereinafter), a core unit 10 for controlling the respective functions described above, and the like. The functions of the components denoted by reference numerals 1 to 9 will be described in detail below.

(Description of Reader Unit 1)

Figure 2:
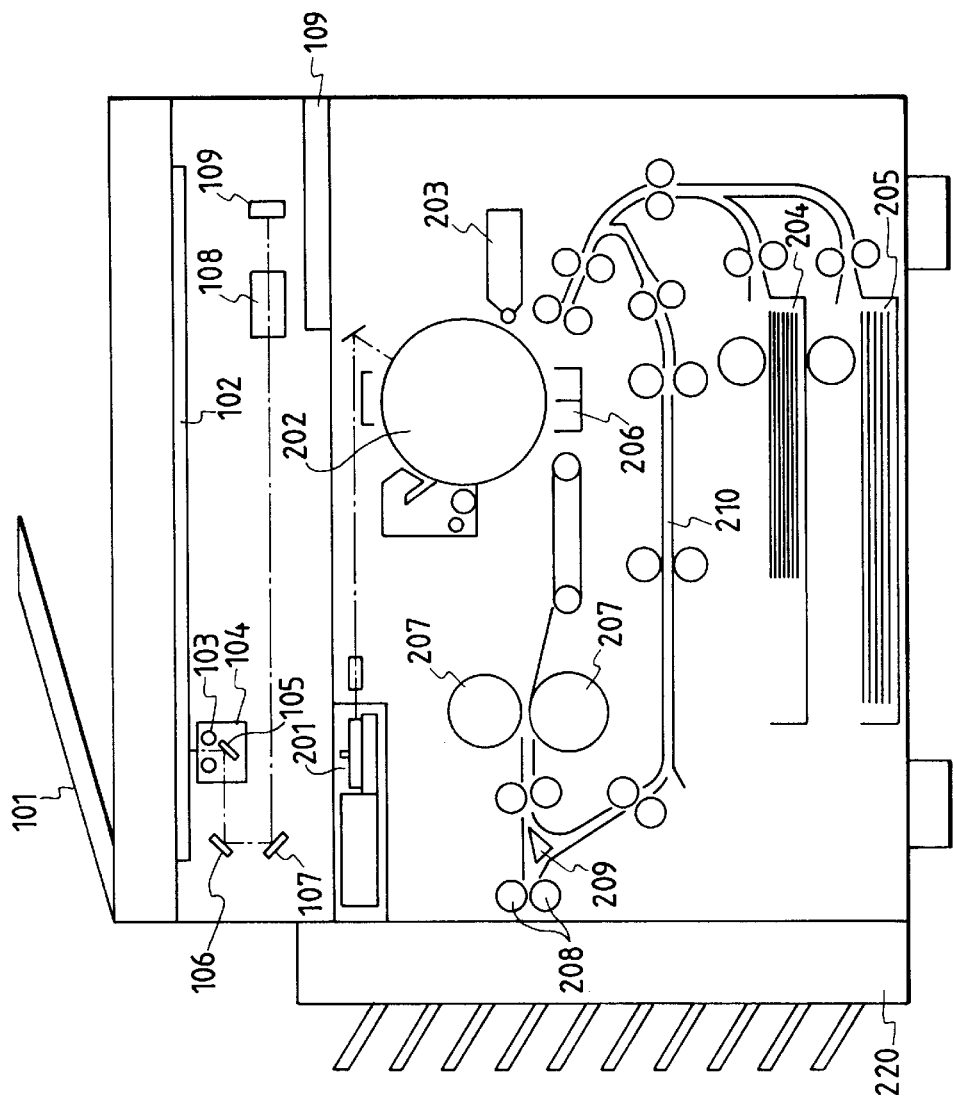
FIG. 2 is a sectional view showing a reader unit 1 and a printer unit 2.

FIG. 2 is a sectional view showing the arrangement of the reader unit 1 and the printer unit 2. The arrangement and operation of these components will be described below.

Originals set on an original feeder 101 are conveyed one by one onto an original table glass surface 102. When an original is conveyed, a lamp 103 of a scanner unit is turned on, and a scanner unit 104 is moved to irradiate the original with light. Light reflected by the original sequentially passes through mirrors 105 to 107 and a lens 108. Thereafter, the light is input to a CCD image sensor unit (to be referred to as a CCD hereinafter) 109.

Figure 3:
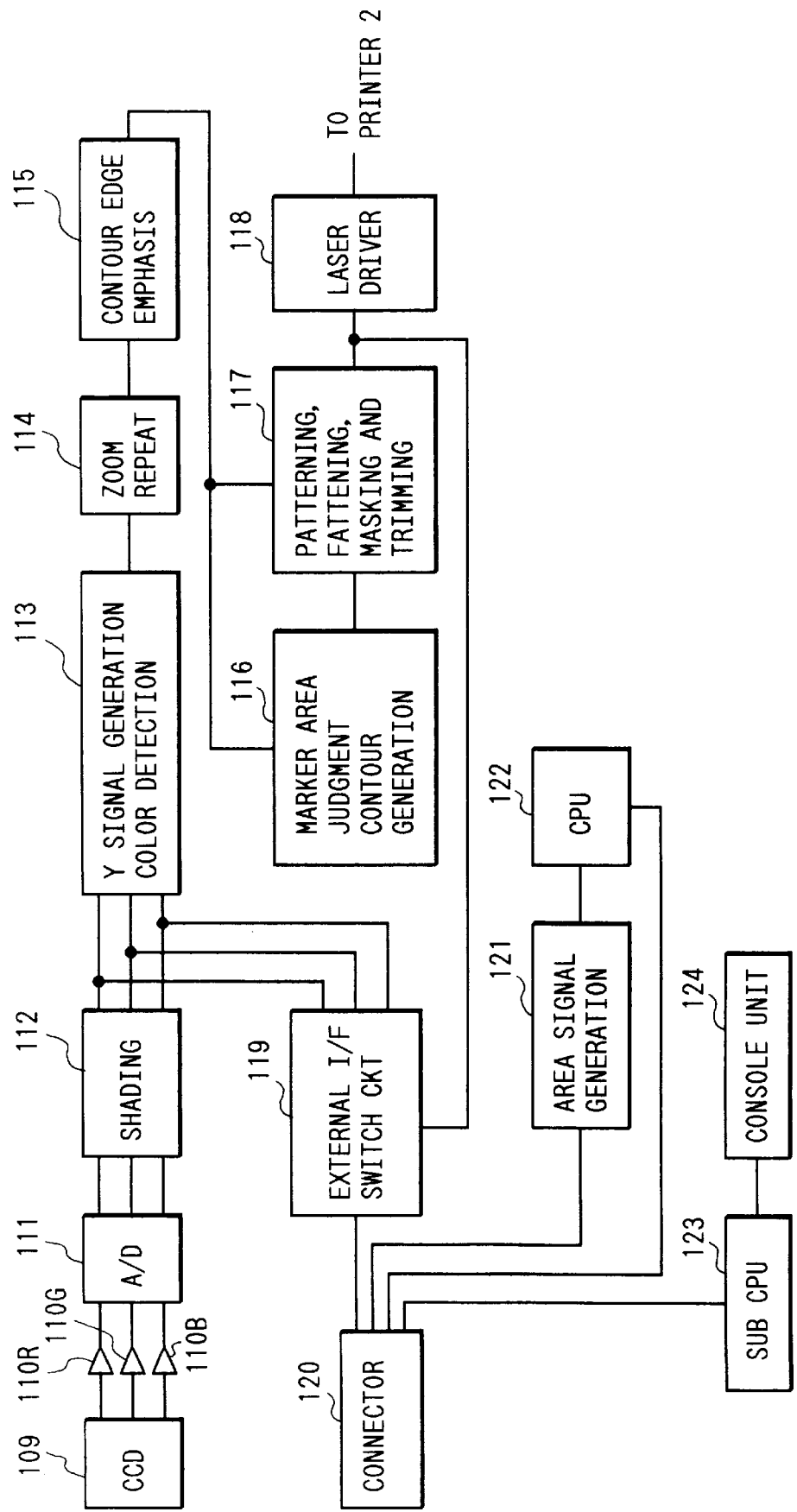
FIG. 3 is a block diagram showing an image processing unit in the reader unit 2.

FIG. 3 is a block diagram showing the signal processing arrangement of the reader unit 1 described above. The arrangement and operation of the reader unit 1 will be described below.

Image information input to the CCD 109 is photoelectrically converted into an electrical signal. Color information from the CCD 109 is amplified by amplifiers 110R, 110G, and 110B in accordance with the input signal level of an A/D converter 111. An output signal from the A/D converter 111 is input to a shading circuit 112. In the shading circuit 112, a luminous intensity distribution irregularity caused by the lamp 103 and a sensitivity irregularity caused by the CCD are corrected. A signal from the shading circuit 112 is input to a Y signal generation color detection circuit 113 and an external I/F switch circuit 119.

The Y signal generation color detection circuit 113 obtains a Y signal by performing calculation with respect to the signal from the shading circuit 112 according to the following equation:

$$Y = 0.3R + 0.6G + 0.1B$$

The Y signal generation color detection circuit 113 has a color detection circuit for separating R, G, and B signals into seven colors and outputting, for each pixel, a code signal indicating a specific color, of the seven colors, to which a color represented by a signal from the shading circuit 112 corresponds. An output signal from the Y signal generation color detection circuit 113 is input to a zoom repeat circuit 114. A zoom operation in the sub-scanning direction is performed by controlling the scanning speed of the scanner unit 104, whereas a zoom operation in the main scanning direction is performed by the zoom repeat circuit 114. A plurality of identical images can be repeatedly output as one image by using the zoom repeat circuit 114. A contour edge emphasis circuit 115 emphasizes a high-frequency component of a signal from the zoom repeat circuit 114 to perform edge emphasis and obtain contour edge information. A signal from the contour edge emphasis circuit 115 is input to a marker area judgment contour generation circuit 116 and a patterning, fattening, masking and trimming circuit 117.

The marker area judgment contour generation circuit 116 reads a portion written on an original with a felt pen having a designated color to generate contour edge information of the marker area. The patterning, fattening, masking and trimming circuit 117 performs fattening, masking (partial image deletion), and trimming (partial image extraction) on the basis of this contour edge information. In addition, patterning, fattening, masking and trimming circuit 117 performs patterning by using a color detection signal from the Y signal generation color detection circuit 113.

An output signal from the patterning, fattening, masking and trimming circuit 117 is input to a laser driver 118. In the laser driver 118, the signal which has undergone various processes is converted into a signal for driving a laser. An output signal from the laser driver 118 is input to the printer unit 2, in which image formation is printed to obtain a visible image.

The external I/F switch circuit 119 serving as an I/F with an external apparatus will be described next.

In outputting image information from the reader unit 1 to the external apparatus 3, the external I/F switch circuit 119 outputs the image information including a Y signal from the patterning, fattening, masking and trimming circuit 117 to a connector 120. In inputting image information from the external apparatus 3 to the reader unit 1, the external I/F switch circuit 119 inputs the image information (R, G, and B signals) from the connector 120 to the Y signal generation color detection circuit 113. Note that R, G, and B signals from the shading circuit 112 may be output to the external apparatus 3.

Image processing in each of the components described above, i.e., the CCD 109 to the patterning, fattening, masking and trimming circuit 117, is performed, in real time, in synchronism with a predetermined timing signal under the control of a CPU 122. An area signal generation circuit 121 generates various timing signals required for the above image processing by using values set by the CPU 122. Communication with the external apparatus 3 is performed by using a communication function incorporated in the CPU 122. A SUB CPU 123 controls a console unit 124 and performs communication with the external apparatus 3 by using a communication function incorporated in the SUB CPU 123.

(Description of Printer Unit 2)

The arrangement and operation of the printer unit 2 will be described below with reference to FIG. 2.

A signal input to the printer unit 2 is converted into an optical signal by an exposure control unit 201 to irradiate a photosensitive member 202 with light in accordance with an image signal. A latent image formed on the photosensitive member 202 by the radiated light is developed by a developing unit 203. A transfer sheet is conveyed from a transfer sheet stacking unit 204 or 205 in accordance with the timing of the above developing operation. The developed image is then transferred to the transfer sheet by a transfer unit 206. The transferred image is fixed on the transfer sheet by a fixing unit 207. Thereafter, the transfer sheet is discharged outside through a discharge unit 208. The transfer sheet output through the discharge unit 208 is discharged onto a corresponding bin if a sorter function is enabled, or discharged onto the uppermost bin if the sorter function is disabled.

A method of outputting a sequentially read image onto the upper and lower surfaces of an output paper sheet will be described next.

An output paper sheet which has undergone fixing processing in the fixing unit 207 is temporarily conveyed to the discharge unit 208. The direction of conveying the paper sheet is reversed, and the paper sheet is conveyed to a re-feeding transfer sheet stacking unit 210 via a convey direction switching member 209. When the next original is prepared, an original image is read by the same process as described above. Since the transfer sheet is fed from the re-feeding transfer sheet stacking unit 210, the images on the two originals are eventually output onto the upper and lower surfaces of the same output paper sheet.

(Description of External Apparatus 3)

The external apparatus 3 is connected to the reader unit 1 via a cable. Signals and functions are controlled by a core unit in the external apparatus 3. The external apparatus 3 incorporates the fax unit 4 for performing facsimile transmission/reception processing, the file unit 5 for converting various original information into electrical signals and storing the signals, the formatter unit 8 for developing code information from the computer 12 into image information, the computer I/F unit 7 serving as an I/F with the computer 12, the image memory unit 9 for temporarily storing information sent from the reader unit 1 or the computer 12 and performing block selection processing to classify the attributes of the partial areas in an image expressed by temporarily stored image information, and the core unit 10 for controlling the respective functions described above.

The arrangement and operation of the core unit 10 of the external apparatus 3 will be described below with reference to the block diagram shown in FIG. 4.

(Description of Core Unit 10)

Figure 4:
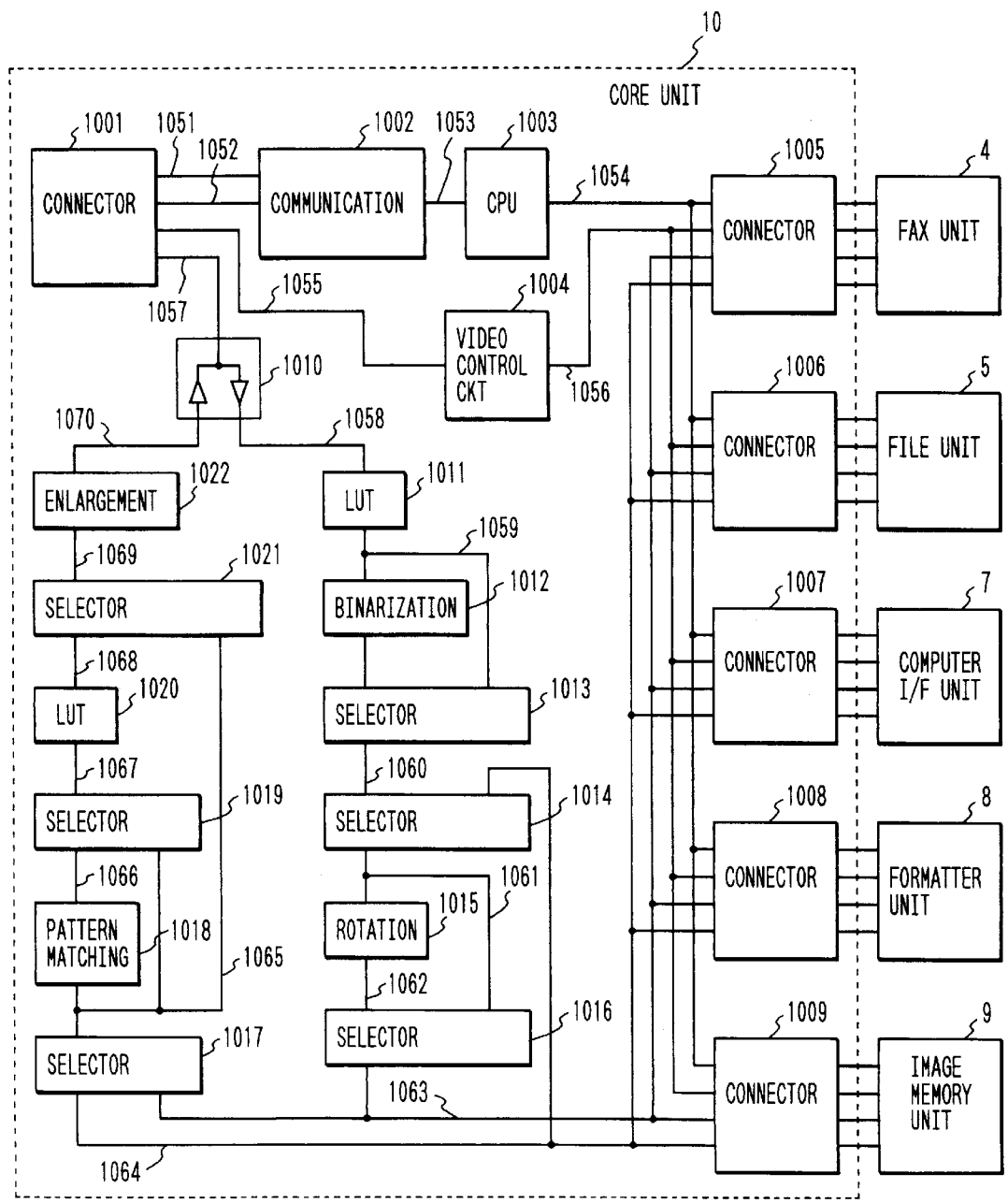
FIG. 4 is a block diagram showing a core unit 10.

FIG. 4 is a block diagram showing the arrangement of the core unit 10 in detail.

A connector 1001 of the core unit 10 is connected to the connector 120 of the reader unit 1 via a cable. Four types of signal lines are connected to the connector 1001. A signal 1057 is an 8-bit multivalued video signal. A signal 1055 is a control signal for controlling a video signal. A signal 1051 is a signal for communication with the CPU 122 in the reader unit 1. A signal 1052 is a signal for communication with the SUB CPU 123 in the reader unit 1. The signals 1051 and 1052 are subjected to communication protocol processing in a communication IC 1002 to transfer communication information to a CPU 1003 via a CPU bus 1053.

The signal 1057 is a bidirectional video signal. That is, information from the reader unit 1 can be received by the core unit 10, and information from the core unit 10 can be output to the reader unit 1.

The signal 1057 is connected to a buffer 1010, in which the bidirectional signal is separated into unidirectional signals 1058 and 1070. The signal 1058 is an 8-bit multivalued video signal from the reader unit 1, which signal is input to a LUT 1011 on the next stage. In the LUT 1011, image information from the reader unit 1 is converted into a desired value by using a look-up table. An output signal 1059 from the LUT 1011 is input to a binarization circuit 1012 or a selector 1013. The binarization circuit 1012 has a simple binarization function of binarizing the multivalued signal 1059 with a fixed slice level, a binarization function based on a variable slice level which varies depending on the values of pixels around a target pixel, and a binarization function based on an error diffusion method. When block selection (to be described later) is to be executed, binarization based on a fixed or variable slice level is performed. Binarized information is converted into a multivalued signal in such a manner that information "0" is converted to "OOH"; and information "1" to "FFH". The multivalued signal is then input to the selector 1013 on the next stage. The selector 1013 selects a signal from the LUT 1011 or an output signal from the binarization circuit 1012. In block selection processing, the selector 1013 selects an output from the binarization circuit 1012. An output signal 1060 from the selector 1013 is input to a selector 1014. The selector 1014 selects a signal 1064, obtained when output video signals from the fax unit 4, the file unit 5, the computer I/F unit 7, the formatter unit 8, and the image memory unit 9 are respectively input to the core unit 10 via connectors 1005, 1006, 1007, 1008, and 1009, and the output signal 1060 from the selector 1013 in accordance with an instruction from the control unit of the CPU 1003. An output signal 1061 from the selector 1014 is input to a rotation circuit 1015 or a selector 1016. The rotation circuit 1015 has a function of rotating an input image signal through +90°, −90°, or +180°. Information output from the reader unit 1 is converted into a binary signal by the binarization circuit 1012. The binary signal is then stored, as information from the reader unit 1, in the rotation circuit 1015. The rotation circuit 1015 rotates and outputs the stored information in accordance with an instruction from the CPU 1003. The selector 1016 selects either an output signal 1062 from the rotation circuit 1015 or the input signal 1061 to the rotation circuit 1015, and outputs the selected signal to the connector 1005 of the fax unit 4, the connector 1006 of the file unit 5, the connector 1007 of the computer I/F unit 7, the connector 1008 of the formatter unit 8, the connector 1009 of the image memory unit 9, and a selector 1017 via a synchronous 8-bit unidirectional video bus 1063.

The unidirectional video bus 1063 serves to transfer image information from the core unit 10 to the fax unit 4, the file unit 5, the computer I/F unit 7, the formatter unit 8, and the image memory unit 9. A synchronous 8-bit unidirectional video bus 1064 serves to transfer image information from the fax unit 4, the file unit 5, the computer I/F unit 7, the formatter unit 8, and the image memory unit 9. The synchronous buses 1063 and 1064 described above are controlled by a video control circuit 1004. That is, these buses are controlled by an output signal 1056 from the video control circuit 1004. In addition, a 16-bit bidirectional CPU bus 1054 is connected to the connectors 1005 to 1009. The CPU bus 1054 serves to exchange data and commands by an asynchronous scheme. Transfer of information between the core unit 10 and the fax unit 4, the file unit 5, the computer I/F unit 7, the formatter unit 8, and the image memory unit 9 is performed by using the above two video buses 1063 and 1064 and the CPU bus 1054.

Signals from the fax unit 4, the file unit 5, the computer I/F unit 7, the formatter unit 8, and the image memory unit 9 are input to the selectors 1014 and 1017 via the video bus 1064. The selector 1016 inputs a signal from the video bus 1064 to the rotation circuit 1015 on the next stage in accordance with an instruction from the CPU 1003.

The selector 1017 selects one of the signals from the video buses 1063 and 1064 in accordance with an instruction from the CPU 1003. An output signal 1065 from the selector 1017 is input to pattern matching unit 1018 and a selector 1019. The pattern matching unit 1018 performs pattern matching between the input signal 1065 and a predetermined pattern. If the patterns coincide with each other, the pattern matching unit 1018 outputs a predetermined multivalued signal to a signal line 1066. If the patterns do not coincide with each other in pattern matching, the pattern matching unit 1018 outputs the input signal 1065 to the signal line 1066.

The selector 1019 selects one of the signals 1065 and 1066 in accordance with an instruction from the CPU 1003. An output signal 1067 from the selector 1019 is input to an LUT 1020 on the next stage.

In outputting image information to the printer unit 2, the LUT 1020 converts the input signal 1067 in accordance with the characteristics of the printer unit 2. For example, the LUT 1020 performs γ-correction in accordance with the gradation reproduction characteristics of the printer unit 2.

The selector 1021 selects an output signal 1068 from the LUT 1020 or the signal 1065 in accordance with an instruction from the CPU 1003. An output signal from the selector 1021 is input to an enlargement circuit 1022 on the next stage.

The enlargement circuit 1022 sets enlargement magnifications in the X and Y directions, respectively, in accordance with an instruction from the CPU 1003. As an enlargement method, a primary linear interpolation method is used. An output signal 1070 from the enlargement circuit 1022 is input to the buffer 1010.

The signal 1070 input to the buffer 1010 is converted into the bidirectional signal 1057 and supplied to the printer unit 2 via the connector 1001 in accordance with an instruction from the CPU 1003. As a result, the resultant image is printed out.

The flow of signals between the core unit 10 and its respective components will be described below.

(Operation of Core Unit 10 for Information of Fax Unit 4)

A case wherein information is to be output to the fax unit 4 will be described below. The CPU 1003 communicates with the CPU 122 of the reader unit 1 via the communication IC 1002 to issue an original scan instruction. In response to this instruction, the scanner unit 104 of the reader unit 1 scans an original. The reader unit 1 then outputs the resultant image information to the connector 120. The reader unit 1 and the external apparatus 3 are connected to each other via a cable so that information from the reader unit 1 is input to the connector 1001 of the core unit 10. The image information input to the connector 1001 is input to the buffer 1010 via the 8-bit multivalued signal line 1057. The buffer 1010 converts the bidirectional signal 1057 into a unidirectional signal in accordance with an instruction from the CPU, and inputs the signal to the LUT 1011 via the signal line 1058. The LUT 1011 converts the image information from the reader unit 1 into a desired value by using the look-up table. For example, a background portion of an original can be omitted. The output signal 1059 from the LUT 1011 is input to the binarization circuit 1012 on the next stage. The binarization circuit 1012 converts the 8-bit multivalued signal 1059 into a binary signal. The binarization circuit 1012 converts a binary signal "0" into a signal "OOH"; and a binary signal "1", a signal "FFH", thereby obtaining two multivalued signals. The output signal from the binarization circuit 1012 is input to the rotation circuit 1015 or the selector 1016 via the selector 1013 and the selector 1014. The output signal 1062 from the rotation circuit 1015 is also input to the selector 1016. The selector 1016 selects one of the signals 1061 and 1062. A signal to be selected is determined upon communication between the CPU 1003 and the fax unit 4 via the CPU bus 1054. The output signal 1063 from the selector 1016 is sent to the fax unit 4 via the connector 1005.

A case wherein information from the fax unit 4 is received will be described next.

Image information from the fax unit 4 is sent to the signal line 1064 via the connector 1005. The signal 1064 is input to the selectors 1014 and 1017. When an image in the facsimile reception mode is to be rotated and output to the printer unit 2 in accordance with an instruction from the CPU 1003, the signal 1064 input to the selector 1014 is subjected to rotation processing. The output signal 1062 from the rotation circuit 1015 is input to the pattern matching 1018 via the selectors 1016 and 1017.

When an image in the facsimile reception mode is to be output to the printer unit 2 without any modification in accordance with an instruction from the CPU 1003, the signal 1064 input to the selector 1017 is input to the pattern matching 1018.

The pattern matching 1018 has a function of smoothing a roughened portion of an image received in the facsimile reception mode. A signal which has undergone pattern matching is input to the LUT 1020 via the selector 1019. The table of the LUT 1020 can be changed by the CPU 1003 to output an image received in the facsimile reception mode, as an image having a desired density, to the printer unit 2. The output signal 1068 from the LUT 1020 is input to the enlargement circuit 1022 via the selector 1021. The enlargement circuit 1022 performs enlargement processing of an 8-bit multivalued signal having two values ("OOH" and "FFH") by the primary linear interpolation method. The 8-bit multivalued signal having many values, which is output from the enlargement circuit 1022, is sent to the reader unit 1 via the buffer 1010 and the connector 1001. The reader unit 1 inputs this signal to the external I/F switch circuit 119 via the connector 120. The external I/F switch circuit 119 inputs the signal from the fax unit 4 to the Y signal generation color detection circuit 113. The output signal from the Y signal generation color detection circuit 113 undergoes the above-described processing. The resultant signal is then output to the printer unit 2 to form an image on an output paper sheet.

(Operation of Core Unit 10 for Information of File Unit 5)

A case wherein information is to be output to the file unit 5 will be described below.

The CPU 1003 communicates with the CPU 122 of the reader unit 1 via the communication IC 1002 and issues an original scan instruction. In response to this instruction, the scanner unit 104 of the reader unit 1 scans an original. The reader unit 1 then outputs the resultant image information to the connector 120. The reader unit 1 and the external apparatus 3 are connected to each other via the cable so that information from the reader unit 1 is input to the connector 1001 of the core unit 10. The image information input to the connector 1001 is converted into the unidirectional signal 1058 by the buffer 1010. The 8-bit multivalued signal 1058 is converted into a desired signal by the LUT 1011. The output signal 1059 from the LUT 1011 is input to the connector 1006 via the selectors 1013, 1014, and 1016.

That is, the output signal 1059 is transferred, as the 8-bit multivalued signal, to the file unit 5 without using the functions of the binarization circuit 1012 and the rotation circuit 1015. When filing of a binary signal is to be performed upon communication between the CPU 1003 and the file unit 5 via the CPU bus 1054, the functions of the binarization circuit 1012 and the rotation circuit 1015 are used. Since binarization processing and rotation processing are the same as those described above in the case of the fax unit 4, a description thereof will be omitted.

A case wherein information from the file unit 5 is to be received will be described next.

Image information from the file unit 5 is input, as the signal 1064, to the selector 1014 or 1017 via the connector 1006. In filing an 8-bit multivalued signal, the image information can be input to the selector 1017. In filing a binary signal, the information can be input to the selector 1014 or 1017. Filing of a binary signal is the same as that in the fax unit 4, a description thereof will be omitted.

In filing a multivalued signal, the output signal 1065 from the selector 1017 is input to the LUT 1020 via the selector 1019. In the LUT 1020, a look-up table is formed in accordance with a desired print density under the control of the CPU 1003. The output signal 1068 from the LUT 1020 is input to the enlargement circuit 1022 via the selector 1021. The 8-bit multivalued signal 1070 enlarged at a desired magnification by the enlargement circuit 1022 is sent to the reader unit 1 via the buffer 1010 and the connector 1001. The information sent from the file unit 5 to the reader unit 1 is output to the printer unit 2 to form an image on an output paper sheet in the same manner as in the fax unit 4 described above.

(Operation of Core Unit 10 for Information of Computer I/F Unit 7)

The computer I/F unit 7 interfaces with a computer connected to the external apparatus 3. The computer I/F unit 7 includes a plurality of interfaces for communication with a SCSI interface, an RS232C interface, and a Centronics interface. The computer I/F unit 7 has the above three types of interfaces. Information from each interface is sent to the CPU 1003 via the connector 1007 and the data bus 1054. The CPU 1003 performs various control operations in accordance with the contents of sent information.

(Operation of Core Unit 10 for Information of Formatter Unit 8)

The formatter unit 8 has a function of developing command data such as document file data sent from the computer I/F unit 7 described above into image data. Upon determining that data sent from the computer I/F unit 7 via the data bus 1054 is data associated with the formatter unit 8, the CPU 1003 transfers the data to the formatter unit 8 via the connector 1008. The formatter unit 8 develops the transferred data into a significant image such as a character or a drawing in the memory.

A procedure for receiving information from the formatter unit 8 and forming an image on an output paper sheet will be described next. Image information from the formatter unit 8 is sent, as a multivalued signal having two values ("OOH" and "FFH"), to the signal line 1064 via the connector 1008. The signal 1064 is input to the selectors 1014 and 1017. The selectors 1014 and 1017 are controlled by instructions from the CPU 1003. Since the subsequent operations are the same as those in the fax unit 4, a description thereof will be omitted.

(Operation of Core Unit 10 for Information of Image Memory Unit 9)

A case wherein image information read by the reader unit 1 is to be output to the image memory unit 9 will be described below.

The CPU 1003 communicates with the CPU 122 of the reader unit 1 via the communication IC 1002 and issues an original scan instruction. In response to this instruction, the scanner unit 104 of the reader unit 1 scans an original. The reader unit 1 then outputs the resultant image information to the connector 120. The reader unit 1 and the external apparatus 3 are connected to each other via the cable so that the image information from the reader unit 1 is input to the connector 1001 of the core unit 10. The image information input to the connector 1001 is sent to the LUT 1011 via the 8-bit multivalued signal line 1057 and the buffer 1010. The output signal 1059 from the LUT 1011 is transferred, as multivalued image information, to the image memory unit 9 via the selectors 1013, 1014, and 1016 and the connector 1009.

A case wherein image information from the image memory unit 9 is to be output from the printer unit 2 will be described next.

The image memory unit 9 sends the 8-bit multivalued signal 1064 to the selectors 1014 and 1017 via the connector 1009. The output signal from the selector 1014 or 1017 is output to the printer unit 2 in accordance with an instruction from the CPU 1003 to form an image on an output paper sheet in the same manner as in the fax unit 4.

In addition, the image memory unit 9 can receive and store information from a computer connected to the computer I/F unit 7 described above, and can transfer information stored in the image memory unit 9 to the computer.

When the image memory unit 9 is to receive information from the computer, the information from the computer is sent to the core unit 10 via the computer I/F unit 7. Upon determining that the data sent from the computer I/F unit 7 via the CPU bus 1054 is data associated with the image memory unit 9, the CPU 1003 transfers the data to the image memory unit 9 via the connector 1009.

When information stored in the image memory unit 9 is to be transferred to the computer, the information stored in the image memory unit 9 is sent to the CPU 1003 via the CPU bus 1054. The CPU 1003 then transfers the data sent from the image memory unit 9 to the computer I/F unit 7. The computer I/F unit 7 transfers the data to the computer via desired one of the three types of interfaces (SCSI, RS232C, and Centronics interfaces).

Note that information which can exchanged between the image memory unit 9 and the computer is not limited to image information.

(Description of Fax Unit 4)

Figure 5:
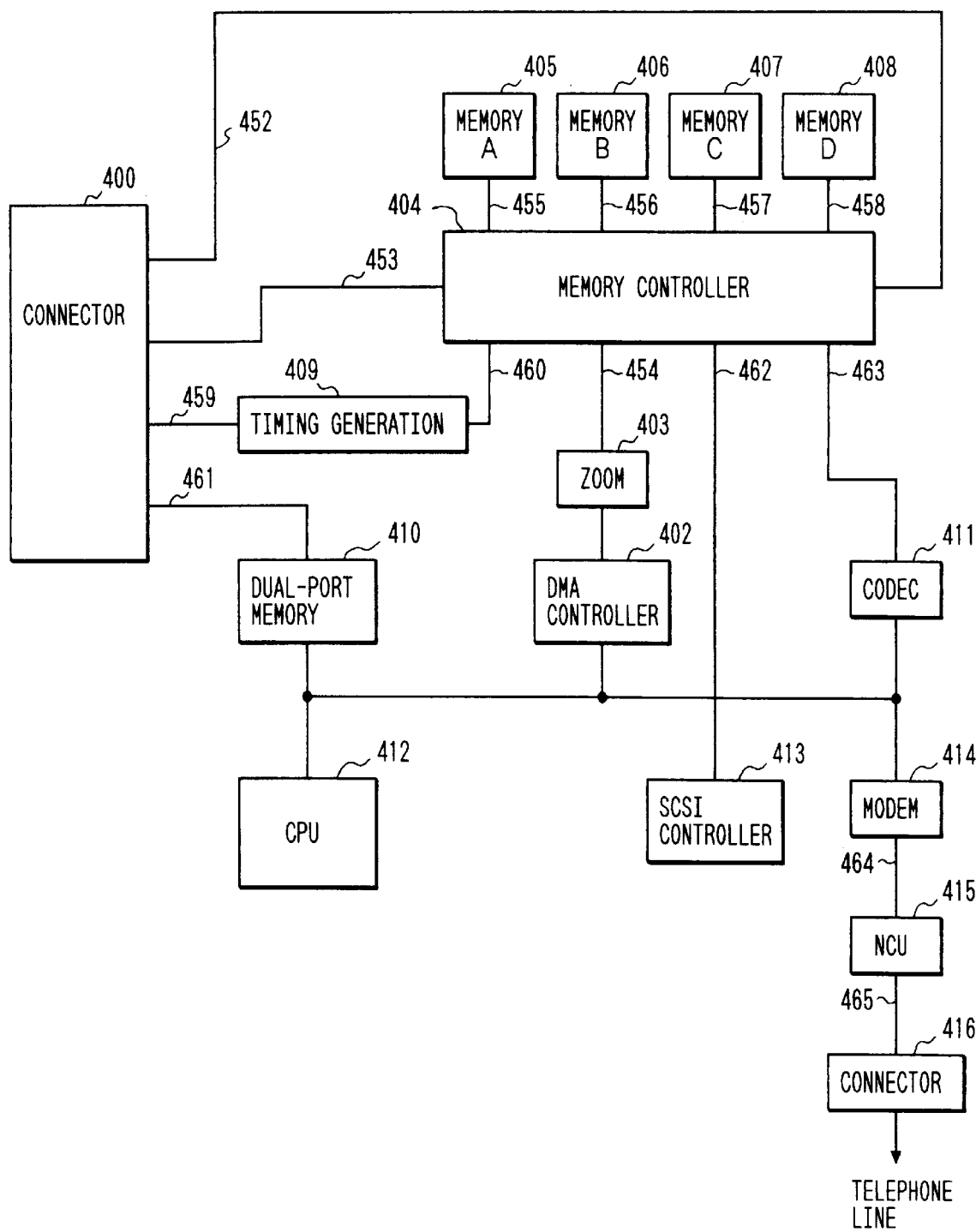
FIG. 5 is a block diagram showing a fax unit 4.

FIG. 5 is a block diagram showing the arrangement of the fax unit 4 in detail.

The fax unit 4 exchanges various signals with the core unit 10 via a connector 400. When binary information from the core unit 10 is to be stored in one of a memory A 405 to a memory D 408, a signal 453 from the connector 400 is input to a memory controller 404. As a result, the binary information is stored in one of the memory A 405, the memory B 406, the memory C 407, and the memory D 408 or two pairs of cascaded memories under the control of the memory controller 404.

The memory controller 404 has five functions, i.e., operates according to the following five modes. In the first mode, the memory controller 404 exchanges data with the memory A 405, the memory B 406, the memory C 407, the memory D 408, and a CPU bus 462 in accordance with instructions from the CPU 412. In the second mode, the memory controller 404 exchanges data with a CODEC bus 463 of a CODEC 411 having an encoding/decoding function. In the third mode, the memory controller 404 exchanges data with the memory A 405, the memory B 406, the memory C 407, the memory D 408, and a bus 454 extending from a zoom circuit 403 under the control of a DMA controller 402. In the fourth mode, the memory controller 404 stores binary video input data 454 in one of the memory A 405 to the memory D 408 under the control of a timing generation circuit 409. In the fifth mode, the memory controller 404 reads out data from one of the memory A 405 to the memory D 408 and outputs the data to a read signal line 452.

Each of the memory A 405, the memory B 406, the memory C 407, and the memory D 408 has a capacity of 2 Mbytes and stores an image of an A4 size at a resolution of 400 dpi. The timing generation circuit 409 is connected to the connector 400 via a signal line 459. The timing generation circuit 409 is started by control signals (HSYNC, HEN, VSYNC, and VEN) from the core unit 10 and generates signals for achieving the following two functions: a function of storing an image signal from the core unit 10 into one or two of the memory A 405 to the memory D 408, and a function of reading out an image signal from one of the memory A 405 to the memory D 408 and sending the signal to the read signal line 452. A dual-port memory 410 is connected to the CPU 1003 of the core unit 10 via a signal line 461. The CPU 412 of the fax unit 4 is connected to the dual-port memory 410 via a signal line 462. Each CPU exchanges commands via this dual-port memory 410. A SCSI controller 413 interfaces with a hard disk connected to the fax unit 4 in FIG. 1, and stores data in the facsimile transmission and reception modes. The CODEC 411 reads out image information stored in one of the memory A 405 to the memory D 408 and encodes the information by desired one of the MH, MR, and MMR schemes. The CODEC 411 then stores the resultant information, as encoded information, in one of the memory A 405 to the memory D 408. In addition, the CODEC 411 reads out encoded information stored in one of the memory A 405 to the memory D 408 and decodes the information by desired one of the MH, MR and MMR scheme. Thereafter, the CODEC 411 stores the decoded information, as image information, in one of the memory A 405 to the memory D 408. The MODEM 414 has a function of modulating encoded information from the hard disk connected to the CODEC 411 or the SCSI controller 413 to send the information onto a telephone line, and a function of demodulating information sent from an NCU 415 to convert it into encoded information and transferring the encoded information to the hard disk connected to the CODEC 411 or the SCSI controller 413. The NCU 415 is directly connected to a telephone line and exchanges information with a switching unit installed in a telephone office according to a predetermined procedure.

An embodiment in the facsimile transmission mode will be described below. A binary image signal from the reader unit 1 is input through the connector 400 and reaches the memory controller 404 via the signal 453. The signal 453 is stored in the memory A 405 by the memory controller 404. The timing at which the signal is stored in the memory A 405 is generated by the timing generation circuit 409 on the basis of a timing signal 459 from the reader unit 1. The CPU 412 connects the memory A 405 and the memory B 406 of the memory controller 404 to the bus line 463 of the CODEC 411. The CODEC 411 reads out image information from the memory A 405, encodes the information by the MR method, and writes the encoded information in the memory B 406. When the CODEC 411 encodes image information of an A4 size, the CPU 412 connects the memory B 406 of the memory controller 404 to the CPU bus 462. The CPU 412 sequentially reads out the encoded information from the memory B 406 and transfers the information to a MODEM 414. The MODEM 414 modulates the encoded information and transmits the facsimile information to the telephone line via the NCU 415.

An embodiment in the facsimile reception mode will be described next. Information sent from the telephone line is input to the NCU 415 and is connected to the fax unit 4 by the NCU 415 according to a predetermined procedure. The information from the NCU 415 is input to the MODEM 414 to be demodulated. The CPU 412 stores the information from the MODEM 414 into the memory C 407 via the CPU bus 462. When one-frame information is stored in the memory C 407, the CPU 412 controls the memory controller 404 to connect a data line 457 of the memory C 407 to the line 463 of the CODEC 411. The CODEC 411 sequentially reads out the encoded information from the memory C 407 and stores it, as decoded information, i.e., image information, in the memory D 408. The CPU 412 communicates with the CPU 1003 of the core unit 10 via the dual-port memory 410, and performs a setting operation to cause the printer unit 2 to print out an image by using the image information sent from the memory D 408 via the core unit 10. The CPU 412 starts the timing generation circuit 409 to output a predetermined timing signal from the signal line 460 to the memory controller 404. The memory controller 404 reads out the image information from the memory D 408 in synchronism with the signal from the timing generation circuit 409, sends the information to the signal line 452, and outputs it to the connector 400. Since the subsequent operations up to the operation of outputting the information from the connector 400 to the printer unit 2 have been described above with reference to the core unit 10, a description thereof will be omitted.

Figure 6:
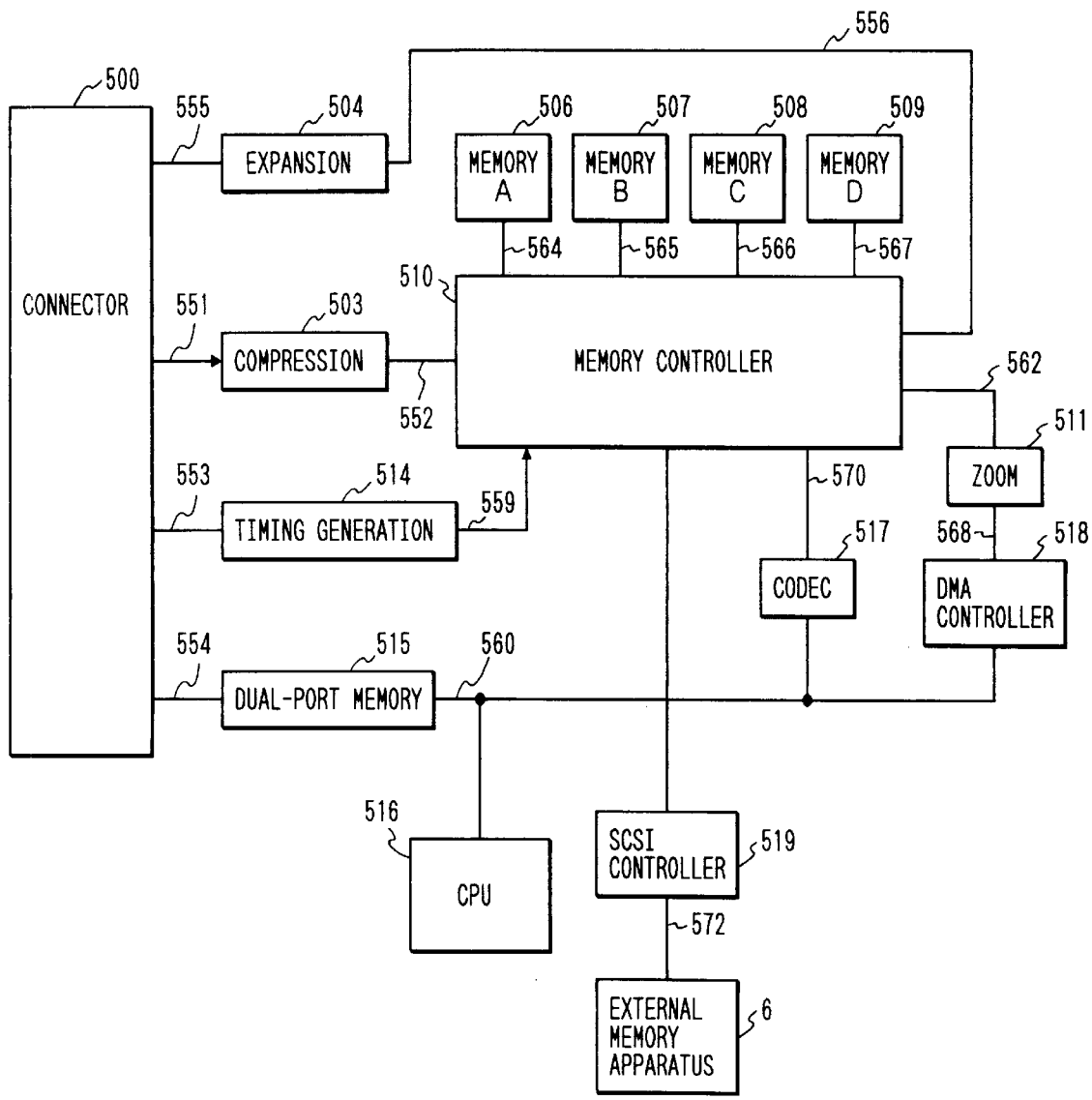
FIG. 6 is a block diagram showing a file unit 5.

(Description of File Unit 5) FIG. 6 is a block diagram showing the arrangement of the file unit 5 in detail. The arrangement and operation of the file unit 5 will be described below with reference to FIG. 6.

The file unit 5 is connected to the core unit 10 via a connector 500 and exchanges various signals therewith. A multivalued input signal 551 is input to a compression circuit 503. In the compression circuit 503, the multivalued image information is converted into compressed information and output to a memory controller 510. An output signal 552 from the compression circuit 503 is stored in one of a memory A 506, a memory B 507, a memory C 508, and a memory D 509 or two pairs of cascaded memories under the control of the memory controller 510. The memory controller 510 has five functions, i.e., operates according to the following five modes. In the first mode, the memory controller 510 exchanges data with the memory A 506, the memory B 507, the memory C 508, and the memory D 509, and a CPU bus 560 in accordance with instructions from a CPU 516. In the second mode, the memory controller 510 exchanges data with a CODEC bus 570 of a CODEC 517 for performing an encoding/decoding operation. In the third mode, the memory controller 510 exchanges data with the memory A 506, the memory B 507, the memory C 508, and the memory D 509 and a bus 562 extending from a zoom circuit 511 under the control of a DMA controller 518. In the fourth mode, the memory controller 510 stores a signal 563 in one of the memory A 506 to the memory D 509 under the control of a timing generation circuit 514. In the fifth mode, the memory controller 510 reads out data from one of the memory A 506 to the memory D 509 and outputs the data to a read signal line 558.

Each of the memory A 506, the memory B 507, the memory C 508, and the memory D 509 has a capacity of 2 Mbytes and stores an image of an A4 size at a resolution of 400 dpi. The timing generation circuit 514 is connected to the connector 500 via a signal line 553. The timing generation circuit 514 is started by control signals (HSYNC, HEN, VSYNC, and VEN) from the core unit 10 and generates signals for achieving the following two functions: a function of storing information from the core unit 10 into one or two of the memory A 506 to the memory D 509, and a function of reading out image information from one of the memory A 506 to the memory D 509 and sending the information a read signal line 556. A dual-port memory 515 is connected to the CPU 1003 of the core unit 10 via a signal line 554, and is connected to the CPU 516 of the file unit 5 via a signal line 560. Each CPU exchanges commands via this dual-port memory 515. A SCSI controller 519 interfaces with the external memory apparatus 6 connected to the file unit 5 in FIG. 1. The external memory apparatus 6 is constituted by a magnetooptical disk and stores data such as image information. The CODEC 517 reads out image information stored in one of the memory A 506 to the memory D 509 and encodes the information by desired one of the MH, MR, and MMR schemes. The CODEC 517 then stores the resultant information, as encoded information, in one of the memory A 506 to the memory D 509. In addition, the CODEC 517 reads out encoded information stored in one of the memory A 506 to the memory D 509 and decodes the information by desired one of the MH, MR and MMR scheme. Thereafter, the CODEC 517 stores the decoded information, as image information, in one of the memory A 506 to the memory D 509.

An embodiment in which file information is stored in the external memory apparatus 6 will be described below. An 8-bit multivalued image signal from the reader unit 1 is input via the connector 500 and input to the compression circuit 503 via a signal line 551. The signal 551 is input to the compression circuit 503, in which the signal is converted into compressed information. The compressed information 552 is input to the memory controller 510. The memory controller 510 causes a timing generation circuit 559 to generate a timing signal 559 by using a signal 553 from the core unit 10, and stores the compressed signal 552 in the memory A 506 in accordance with this timing signal. The CPU 516 connects the memory A 506 and the memory B 507 to the CODEC bus 570 of the CODEC 517. The CODEC 517 reads out the compressed information from the memory A 506, encodes the information by the MR method, and writes the encoded information in the memory B 507. When the encoding operation of the CODEC 517 is completed, the CPU 516 connects the memory B 507 of the memory controller 510 to the CPU bus 560. The CPU 516 sequentially reads out the encoded information from the memory B 507 and transfers the information to the SCSI controller 519. The SCSI controller 519 stores encoded information 572 in the external memory apparatus 6.

An embodiment in which information is taken out from the external memory apparatus 6 and output to the printer unit 2 will be described next. Upon reception of an information search/print command, the CPU 516 receives encoded information from the external memory apparatus 6 via the SCSI controller 519 and transfers the encoded information to the memory C 508. In this case, the memory controller 510 connects the CPU bus 560 to a bus 566 of the memory C 508 in accordance with an instruction from the CPU 516. When transfer of the encoded information to the memory C 508 is completed, the CPU 516 controls the memory controller 510 to connect the memory C 508 and the memory D 509 to the bus 570 of the CODEC 517. The CODEC 517 reads out the encoded information from the memory C 508 and sequentially decodes the information. Thereafter, the CODEC 517 transfers the information to the memory D 509. If variable magnification, e.g., enlargement or reduction, of the information is required before it is output to the printer unit 2, the memory D 509 is connected to the bus 562 of the zoom circuit 511 to variably magnify the contents of the memory D 509 under the control of the DMA controller 518. The CPU 516 communicates with the CPU 1003 of the core unit 10 via the dual-port memory 515, and performs a setting operation to cause the printer unit 2 to print out an image by using the information sent from the memory D 509 via the core unit 10. When this setting operation is completed, the CPU 516 starts the timing generation circuit 514 to output a predetermined timing signal from the signal line 559 to the memory controller 510. The memory controller 510 reads out decoded information from the memory D 509 in synchronism with a signal from the timing generation circuit 514, and sends the information to the signal line 556. The signal line 556 inputs the information to an expansion circuit 504, in which the information is expanded. An output signal 555 from the expansion circuit 504 is output to the core unit 10 via the connector 500. Since the subsequent operations up to the operation of outputting the information from the connector 500 to the printer unit 2 have been described above with reference to the core unit 10, a description thereof will be omitted.

(Description of Computer I/F Unit 7)

Figure 7:
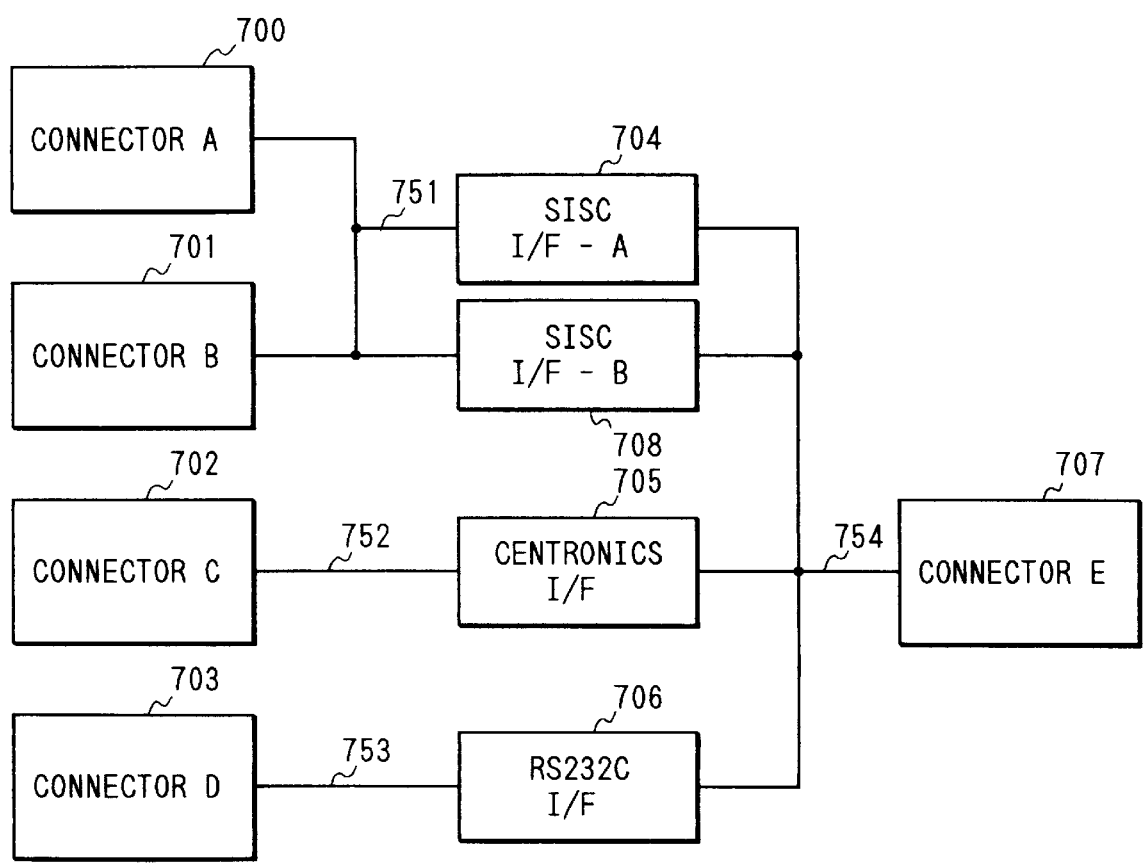
FIG. 7 is a block diagram showing a computer I/F unit 7.

The computer I/F unit 7 will be described below with reference to FIG. 7.

A connector A 700 and a connector B 701 are connectors for a SCSI interface. A connector C 702 is a connector for a Centronics interface. A connector D 703 is a connector for an RS232C interface. A connector E 707 is a connector to be connected to the core unit 10.

The SCSI interface has two connectors (the connector A 700 and the connector B 701). When a plurality of SCSI devices are to be connected, cascade connections are performed by using the connector A 700 and the connector B 701. When the external apparatus 3 and the computer 12 are to be connected to each other in a one-to-one correspondence, the connector A 700 is connected to the computer 12 via a cable, and a terminator is connected to the connector B 701. Alternatively, the connector B 701 is connected to the computer 12 via a cable, and a terminator is connected to the connector A 700. Information input from the connector A 700 or the connector B 701 is input to a SCSI.I/F-A 704 or a SCSI.I/F-B 708 via a signal line 751. The SCSI.I/F-A 704 or the SCSI.I/F-B 708 performs processing according to a SCSI protocol and outputs the resultant data to the connector E 707 via a signal line 754. The connector E 707 is connected to the CPU bus 1054 of the core unit 10. The CPU 1003 of the core unit 10 receives the information input to the SCSI.I/F connector (the connector A 700 or the connector B 701) via the CPU bus 1054. Data from the CPU 1003 of the core unit 10 is output to a SCSI connector (the connector A 700 or the connector B 701) according to a reverse procedure to that described above.

The Centronics interface is connected to the connector C 702. A signal is input to a Centronics I/F 705 via a signal line 752. The Centronics I/F 705 receives data according to a predetermined protocol procedure, and outputs the data to the connector E 707 via the signal line 754. The connector E 707 is connected to the CPU bus 1054 of the core unit 10. The CPU 1003 of the core unit 10 receives information input to the Centronics I/F connector (the connector C 702) via the CPU bus 1054.

The RS232C interface is connected to the connector D 703. A signal is input to an RS232C I/F 706 via a signal line 753. The RS232C I/F 706 receives data according to a predetermined protocol procedure, and outputs the data to the connector E 707 via the signal line 754. The connector E 707 is connected to the CPU bus 1054 of the core unit 10. The CPU 1003 of the core unit 10 receives information input to the RS232C I/F connector (the connector D 703) via the CPU bus 1054. Data from the CPU 1003 of the core unit 10 is output to the RS232C I/F connector (the connector D 703) according to a reverse procedure to that described above.
(Description of Formatter Unit 8)

Figure 8:
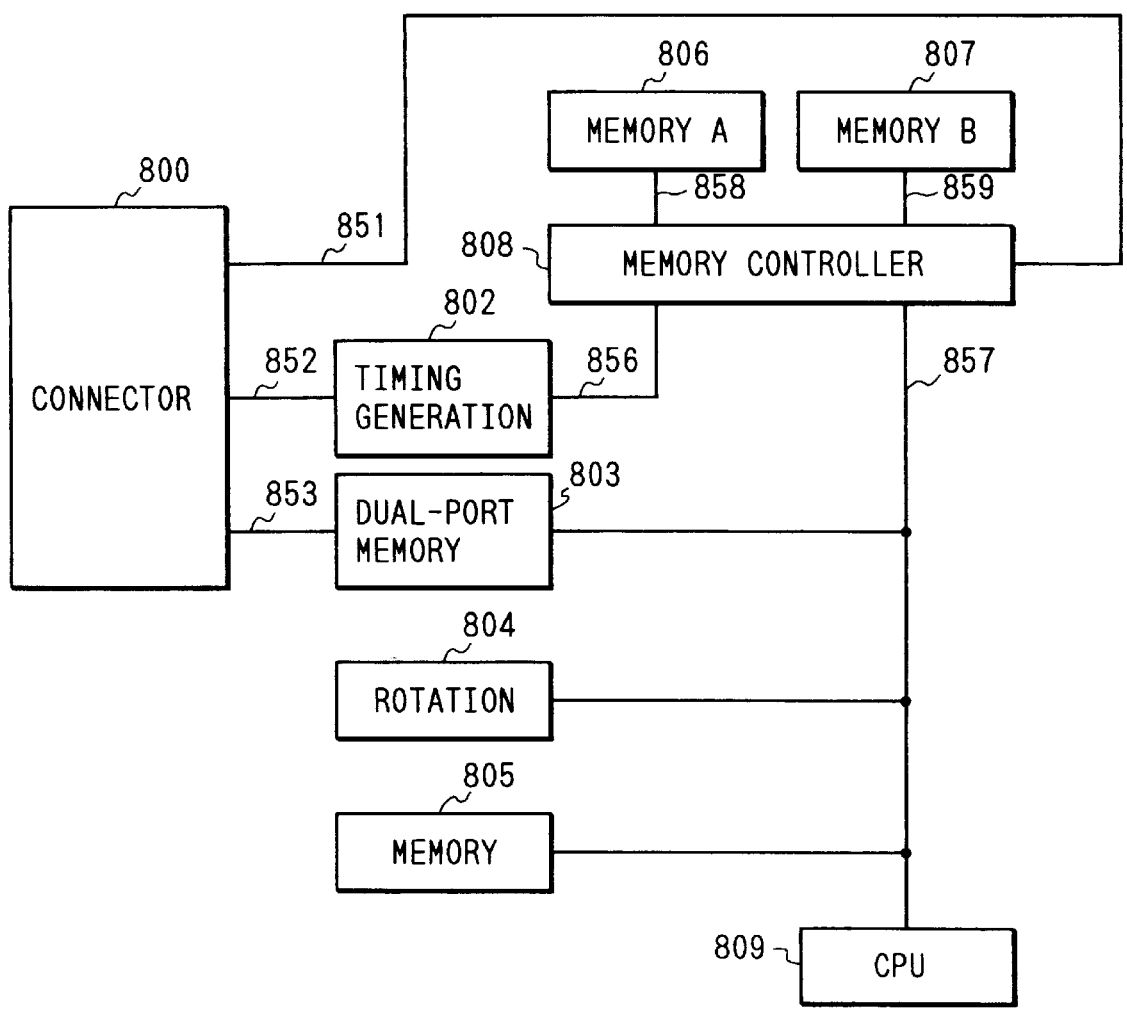
FIG. 8 is a block diagram showing a formatter unit 8.

FIG. 8 is a block diagram showing the arrangement of the formatter unit 8. The arrangement and operation of the formatter unit 8 will be described below with reference to FIG. 8.

Data from the computer I/F unit 7 described above is discriminated by the core unit 10. If the data is associated with the formatter unit 8, the CPU 1003 of the core unit 10 transfers the data from the computer 12 to a dual-port memory 803 via the connector 1008 of the core unit 10 and a connector 800 of the formatter unit 8. A CPU 809 of the formatter unit 8 receives the code data sent from the computer 12 via the dual-port memory 803. The CPU 809 sequentially develops this code data into image data and transfers the image data to a memory A 806 or a memory B 807 via a memory controller 808. Each of the memory A 806 and the memory B 807 has a capacity of 1 Mbyte. Each memory (the memory A 806 or the memory B 807) can store data of an A4 size at a resolution of 300 dpi. If data is to be stored up to an amount corresponding to an A3 size at a resolution of 300 dpi, the memory A 806 and the memory B 807 are cascaded to develop image data. The above memories are controlled by the memory controller 808 in accordance with instructions from the CPU 809. In developing image data, if rotation of a character or figure is required, the data is rotated first by a rotation circuit 804 and is then transferred to the memory A 806 or the memory B 807, When development of the image data in the memory A 806 or the memory B 807 is completed, the CPU 809 controls the memory controller 808 to connect a data bus line 858 of the memory A 806 or a data bus line 859 of the memory B 807 to an output line 855 of the memory controller 808. Subsequently, the CPU 809 communicates with the CPU 1003 of the core unit 10 via the dual-port memory 803 and sets a mode for outputting image information from the memory A 806 or the memory B 807. The CPU 1003 of the core unit 10 sets a print output mode in the CPU 122 via the communication IC 1002 in the core unit 10 by using a communication function incorporated in the CPU 122.

When the print output mode is set, the CPU 1003 of the core unit 10 starts a timing generation circuit 802 via the connector 1008 and the connector 800 of the formatter unit 8. The timing generation circuit 802 generates a timing signal for reading out image information from the memory A 806 or the memory B 807 into the memory controller 808 in accordance with a signal from the core unit 10. The image information from the memory A 806 or the memory B 807 is input to the memory controller 808 via the signal bus line 858. Output image information from the memory controller 808 is transferred to the core unit 10 via a signal line 851 and the connector 800. Since output of data from the core unit 10 to the printer unit 2 has been described above with reference to the core unit 10, a description thereof will be omitted.
(Description of Image Memory Unit 9)

Figure 9:
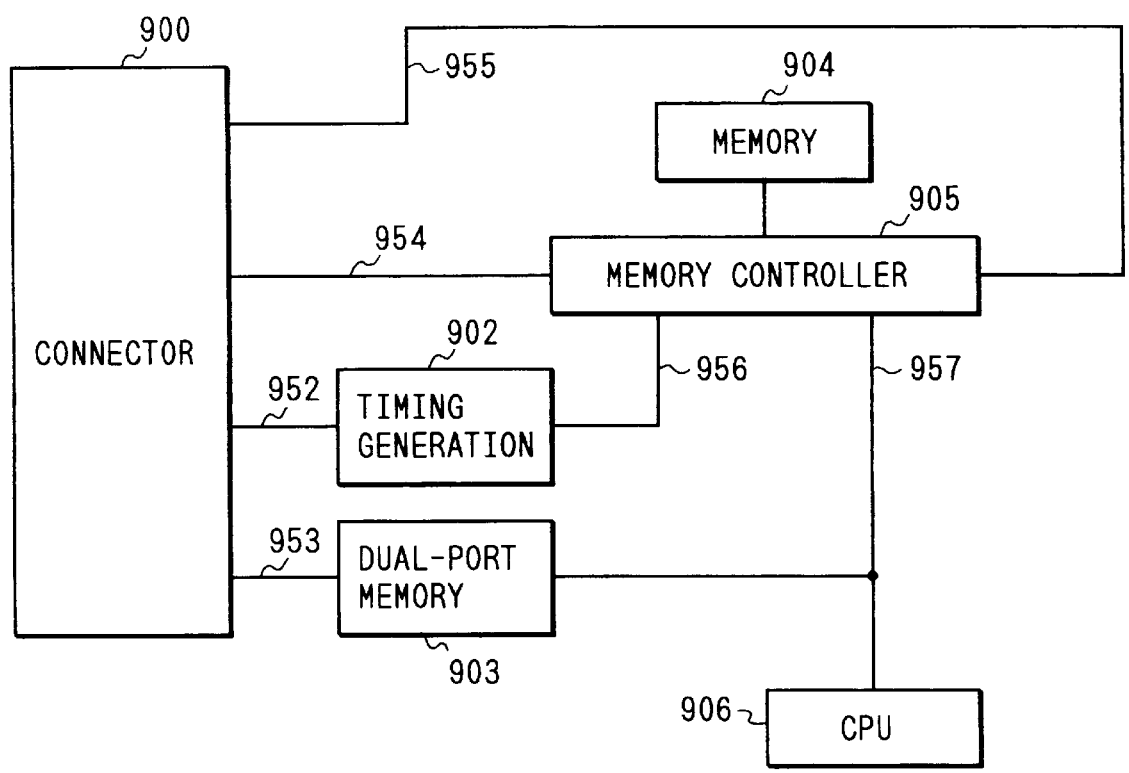
FIG. 9 is a block diagram showing an image memory unit 9.

The arrangement and operation of the image memory unit 9 will be described below with reference to the block diagram in FIG. 9.

The image memory unit 9 is connected to the core unit 10 via a connector 900 and exchanges various signals therewith. An input signal 954 is stored in a memory 904 under the control of a memory controller 905. The memory controller 905 has three functions, i.e., operates according to the following three modes. In the first mode, the memory controller 905 exchanges data with the memory 904 and a CPU bus 957 in accordance with instructions from a CPU 906. In the second mode, the memory controller 905 stores the signal 954 in the memory 904 under the control of a timing generation circuit 902. In the third mode, the memory controller 905 reads out data from the memory 904 and outputs the data to a signal line 955. The memory 904 has a capacity of 32 Mbytes and can store image data having 256 gradation levels and corresponding to an A3 size at a resolution of 400 dpi. The timing generation circuit 902 is connected to the connector 900 via a signal line 952 and is started by control signals (HSYNC, HEN, VSYNC, and VEN) from the core unit 10 to generate signals for achieving the following two functions: a function of storing information from the core unit 10 in the memory 904 and a function of reading out information from the memory 904 and sending the information to the signal line 955. A dual-port memory 903 is connected to the CPU 1003 of the core unit 10 via a signal line 953, and is also connected to the CPU 906 of the image memory unit 9 via the signal bus 957. Each CPU exchanges commands via the dual-port memory 903.

An embodiment in which image information is stored in the image memory unit 9 and transferred to the computer 12 will be described below. An 8-bit multivalued image signal from the reader unit 1 is input from the connector 900 and input to the memory controller 905 via the input signal 954. The memory controller 905 causes the timing generation circuit 902 to generate a timing signal 956 in accordance with the signal 952 from the core unit 10, and stores the signal 954 in the memory 904 in accordance with this timing signal. The CPU 906 connects the memory 904 of the memory controller 905 to the CPU bus 957. The CPU 906 sequentially reads out image information from the memory 904 and transfers the information to the dual-port memory 903. The CPU 1003 of the core unit 10 reads out the image information from the dual-port memory 903 of the image memory unit 9 via the signal line 953 and the connector 900, and transfers the information to the computer I/F unit 7. Since transfer of the information from the computer I/F unit 7 to the computer 12 has been described above, a description thereof will be omitted.

An embodiment in which image information sent from the computer 12 is output to the printer unit 2 will be described next. Image information sent from the computer 12 is sent to the core unit 10 via the computer I/F unit 7. The CPU 1003 of the core unit 10 transfers the image information to the dual-port memory 903 of the image memory unit 9 via the CPU bus 1054 and the connector 1009. At this time, the CPU 906 controls the memory controller 905 to connect the CPU bus 957 to the bus of the memory 904. The CPU 906 transfers the image information from the dual-port memory 903 to the memory 904 via the memory controller 905. When transfer of the image information to the memory 904 is completed, the CPU 906 controls the memory controller 905 to connect the data line of the memory 904 to the signal line 955. The CPU 906 communicates with the CPU 1003 of the core unit 10 via the dual-port memory 903 to perform a setting operation to cause the printer unit 2 to print out an image by using the information sent from the memory 904 via the core unit 10. When this setting operation is completed, the CPU 906 starts the timing generation circuit 902 to generate a predetermined timing signal to the memory controller 905 via a signal line 956. The memory controller 905 reads out the image information from the memory 904 in synchronism with the signal from the timing generation circuit 902, and outputs the information to the connector 900 via the signal line 955. Since the subsequent operations up to the operation of outputting the information from the connector 900 to the printer unit 2 have been described above with reference to the core unit 10, a description thereof will be omitted.

The CPU 906 of the image memory unit 9 has a function of performing block selection processing of classifying image data stored in the memory 904 into attributes of partial areas in an image, i.e., a character portion, a title portion, a closing line portion, a table portion, a halftone drawing portion, a line drawing portion, a line portion, and a caption portion such as a table or a drawing.

An embodiment of block selection processing in the image memory unit 9 will be described in detail below.

Image data to be subjected to block selection processing is stored in the memory 904. In this case, the image data may be data read by the reader unit 1, image data transferred from the computer 12 connected to the computer I/F unit 7, or image data received by the fax unit 4. Note that image data for which block selection processing can be performed is limited to binary image data. For this reason, if image data is read by the reader unit 1 or image data transferred from the computer 12 connected to the computer I/F unit 7 is multivalued image data, the image data must be binarized by the binarization circuit 1012 of the core unit 10 before it is stored in the memory 904.

Block selection processing is performed with respect to the binary image data stored in the memory 904. An algorithm for block selection processing will be described in detail below.

Figure 10:
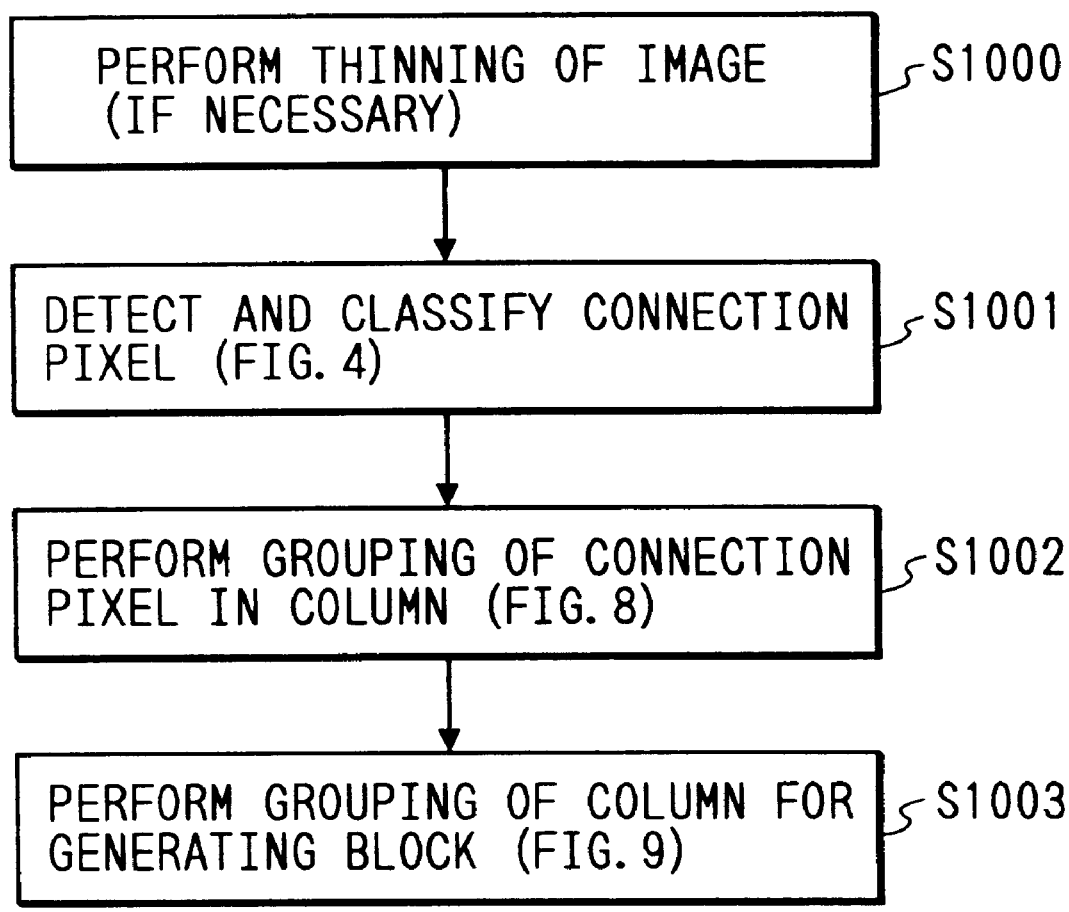
FIG. 10 is a flow chart roughly showing a block selection algorithm.

FIG. 10 is a flow chart schematically showing block selection.

When the processing speed of block selection is to be increased, thinning of image data is performed in step S1000. When image data is thinned, block selection processing is performed for the thinned image data. The processing speed of the block selection, i.e., the thinning ratio of image data, is set by the console unit 124. This setting can be performed in multiple stages. The contents set by the console unit 124 are sent to the CPU 906 of the image memory unit 9 via the core unit 10.

Thinning of image data is performed by checking the connection characteristic of black pixels in an m×m pixel block. If, for example, there are two black connection pixels in a 3×3 pixel block, the pixel block is thinned into one black pixel. In contrast to this, if there are two white connection pixels in this block, the block is thinned into one white pixel.

In step S1001, a pixel image is analyzed to detect a connection characteristic, and a connection component is classified in accordance with its size and the position relative to other connection components. One connection component is a group of black pixels completely surrounded by white pixels. Therefore, one black pixel connection component is completely separated from another black pixel connection component via at least one white pixel. The processing in step S1001 will be described in detail later with reference to FIG. 11. In brief, in step S1001, connection components are detected and classified on the basis of the size information of the connection components and statistical information obtained from the connection components. In this classification, each connection component is classified as a text unit (character portion) or a non-text unit. Each non-text unit is analyzed in more detail to be classified as a frame (closing line), a halftone drawing, a line drawing, or a table. If a non-text is unknown, it is determined as an unknown portion and is not classified. Configuration data for each connection component is provided, and a hierarchical tree structure is formed with respect to each connection component to facilitate remaking of the data.

In step 1002, connection components adjacent to each other in the horizontal direction are grouped as long as no gap line exists therebetween. The tree structure formed in step S1001 is used to prevent texts and non-texts from being inadequately mixed. In step S1002, a gap extending between columns in the vertical direction and a boundary extending in the vertical direction of non-texts are detected to determine whether to perform grouping of text units in a column. This grouped text unit will be referred to as a text line unit hereinafter. By adequately updating the hierarchical tree structure, this text line unit is held in the tree structure.

In step S1003, if a column grouped in step S1002 is small in space in the vertical direction, the column is grouped in the vertical direction in a block. The non-text units are sorted in the vertical direction to be used as boundaries with respect to the corresponding image page. A text unit between two non-text units is processed independently of the remaining text units.

In step S1003, the non-texts which cannot be classified in step S1001 are analyzed to determine whether they are a title having a large font size. If it is determined that the non-texts are a title, an adequate attribute is added to them, and the tree structure is updated. The title helps to remake the page.

Figure 11:
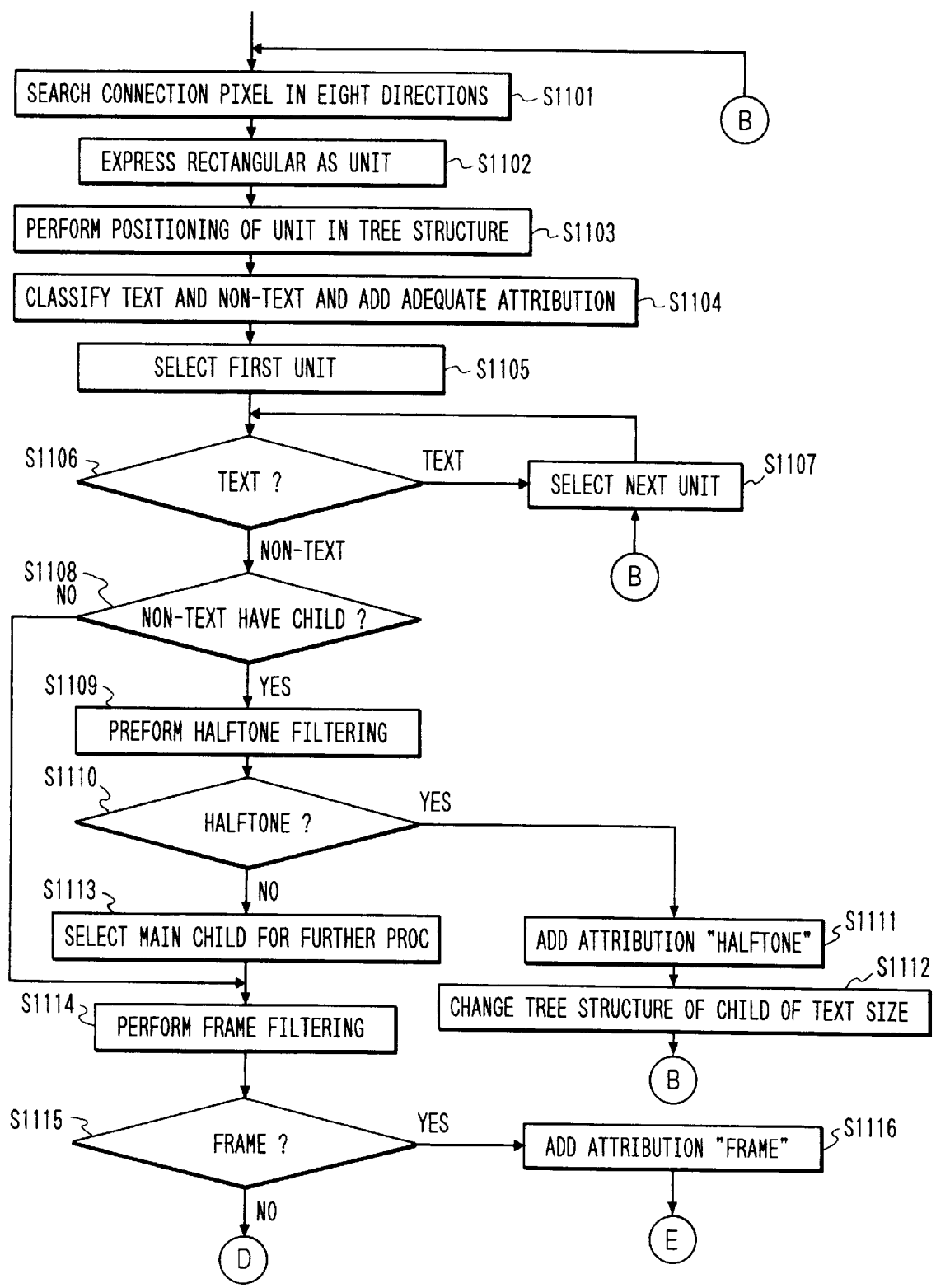
FIG. 11 is a flow chart showing step S1001 in detail.
Figure 12:
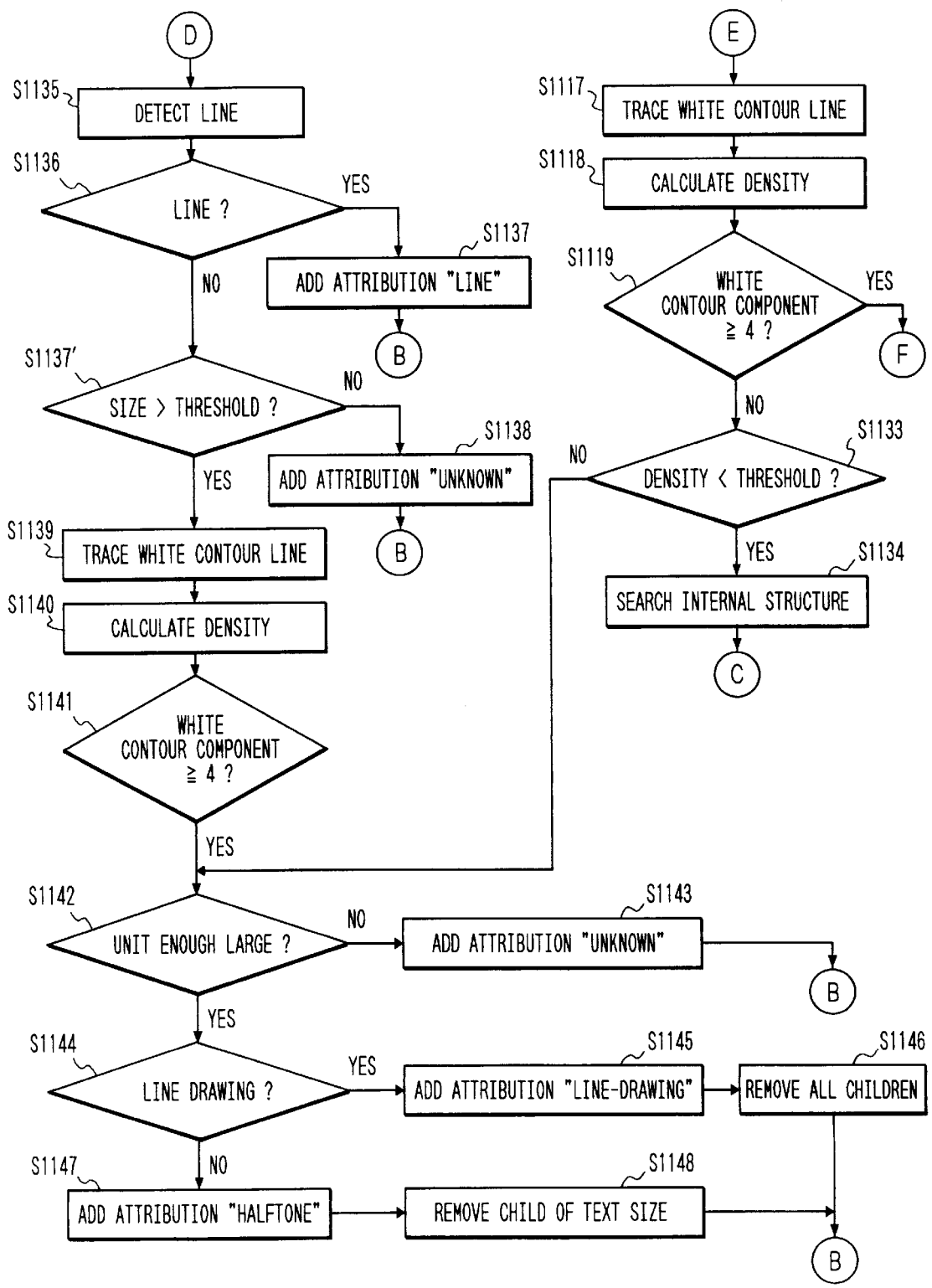
FIG. 12 is a flow chart showing step S1001 in detail.
Figure 13:
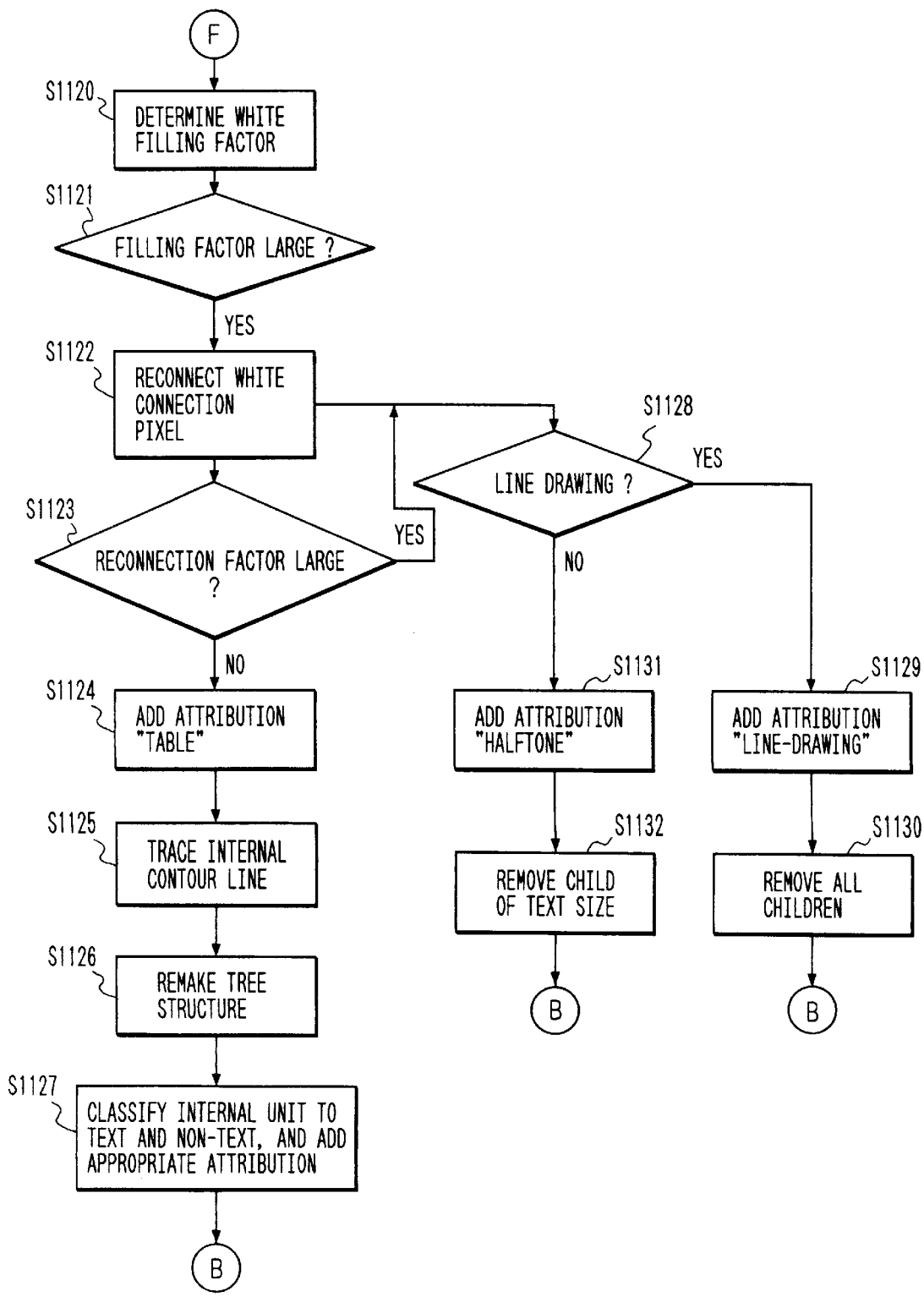
FIG. 13 is a flow chart showing step S1001 in detail.

FIGS. 11, 12, and 13 are flow charts showing how the connection pixels of pixel image data are detected and classified.

Figure 14:
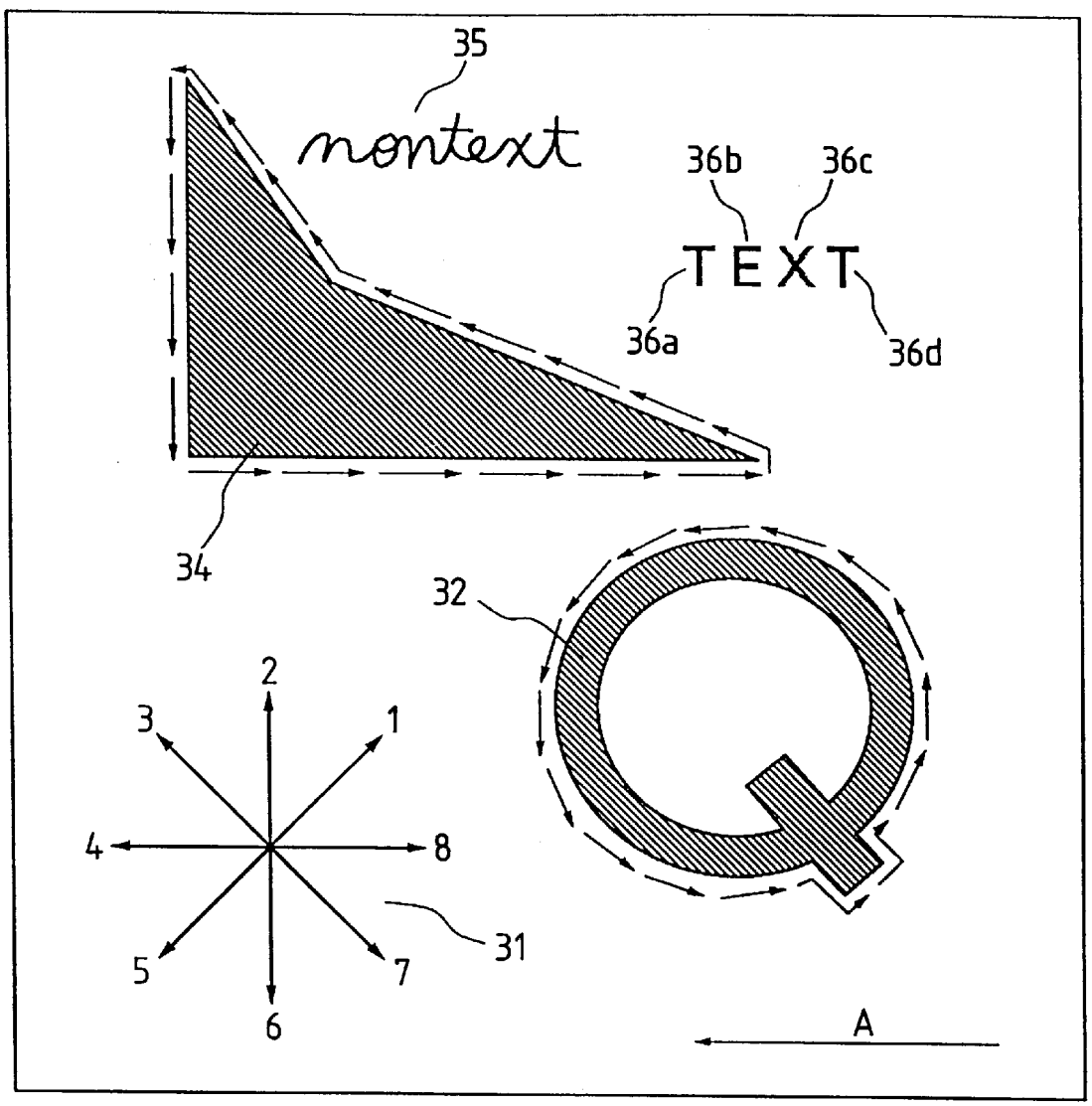
FIG. 14 is a view for explaining step S1001.
Figure 15:
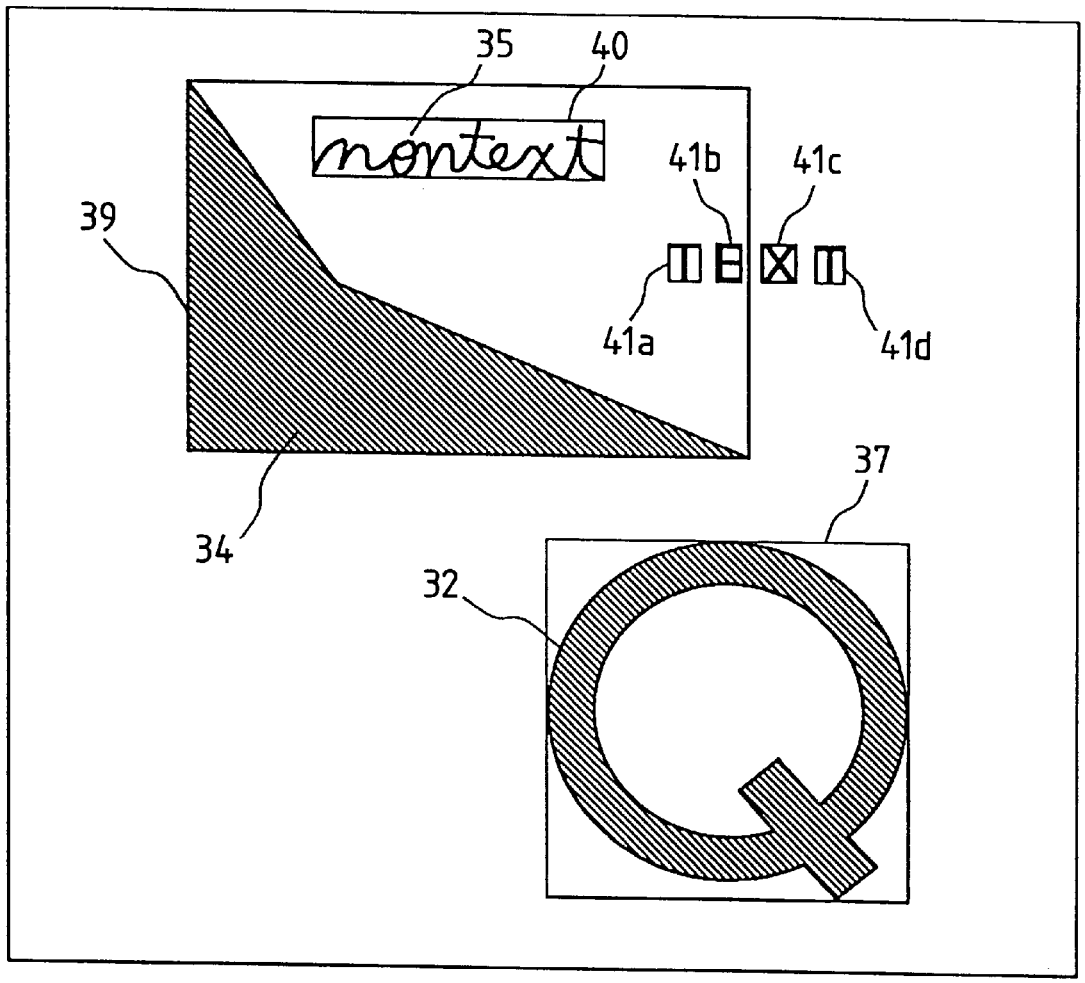
FIG. 15 is a view for explaining step S1001.

In step S1101, pixel image data is searched by contour line tracing. Contour line tracing is performed by scanning an image, as shown in FIG. 14. Scanning is started from a lower right corner indicated by an arrow A and performed upward up to a right end of a drawing. This scanning may be performed in other directions, e.g., from an upper left corner to a lower right corner. When a black pixel is scanned, it is checked in the order indicated by a pattern 31 whether adjacent pixels are black pixels. This search processing can be expressed by vectors in eight directions with respect to the center, and hence is called an eight-direction search. If there are adjacent black pixels, the outer contour of a drawing can be obtained by this process. In this manner, as shown in FIG. 15, a point corresponding to an end of a character "Q" 32 is scanned in the direction indicated by the arrow A. Adjacent pixels are then checked according to the pattern 31 to trace the outer contour of the character "Q". The inner portion of the closed contour is not traced.

When a contour line obtained by an eight-direction search, i.e., one connection component, is extracted, scanning proceeds until the next black pixel is scanned. In this manner, for example, an object 34 which seems to represent a complete black area is detected by an eight-direction search. Similarly, an object 35 as a non-text which is a handwritten "non-text" is traced, and a group object 36 of characters constituting the word "text" is traced. The scanning operation shown in FIG. 14 is continued until all connection components are detected.

The flow advances to step S1102 to express all connection components as rectangles. In this case, a minimum rectangle is drawn to cover each connection component. In this manner, as shown in FIG. 15, a rectangle 37 is drawn around the object 32; a rectangle 39, around the object 34; and a rectangle 40, around the object 35. Similarly, rectangles 41a to 41d are drawn around text objects 36a, 36b, 36c, and 36d, respectively.

Figure 16:
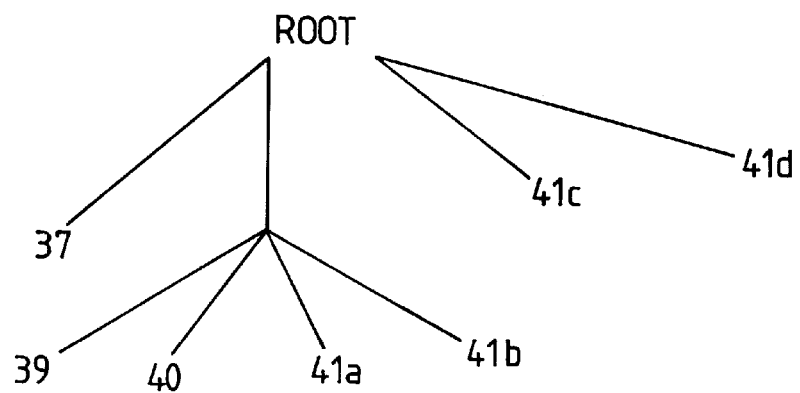
FIG. 16 is a view for explaining step S1001.

In step S1103, positioning of all the rectangles in the tree structure is performed. In most cases, the tree structure obtained in step S1103 is directly formed from the root for each object. This is because only the outer contour of each connection component is traced, but the inner portion of each closed area is not traced. As shown in FIG. 16, therefore, the rectangle 37 corresponding to the connection component 32 is directly formed from the root of the page. However, connection components surrounded by rectangles which are completely surrounded by another rectangle, such as the non-text object 35 surrounded by the rectangle 40 and the text objects 36a and 36b surrounded by the rectangles 41a and 41b, are regarded as children of the connection component (the component 34 in this case) which surrounds them. In addition, a connection component such as the component 34 having at least one child is regarded itself as a "main child". In the case shown in FIG. 15, the component 39 is included as a main child, together with the remaining child components 40, 41a, and 41b.

In step S1104, each connection component in the first level in the tree structure is classified as a text unit or a non-text unit. A classification process is constituted by two steps. In the first step, a rectangle surrounding a connection component is compared with a predetermined size. If the height of the rectangle surrounding the connection component exceeds a predetermined value corresponding to the maximum value of a font size, or the width of the rectangle is larger than a value obtained by dividing the page width by an empirically determined value (a satisfactory result was obtained with "5"), the connection component is classified as a non-text unit. As a result, an attribute "non-text" is added to the unit.

In the second step, each of the remaining units to which no attribute is added, i.e., each unit which is not classified as a non-text, is compared with a value determined on the basis of a statistical size obtained from the remaining connection components. Especially, the average height of all the rectangles which are not classified as non-texts is calculated. An adaptive threshold can be obtained by multiplying this average height by a predetermined value (generally "2"). Each unit larger than this threshold is classified as a non-text. In contrast to this, each unit smaller than the threshold is classified as a text. In this manner, each unit is classified, and an adequate attribute is added thereto. The above two classification steps undergo several processes shown in FIGS. 11 to 13. These processes will be described in detail below.

After each unit in the first level of the tree is classified as a text or non-text, the children of each text unit, including a main child (i.e., the unit itself), are classified as texts. Although the main child of each non-text is left as a non-text, other children are classified as texts.

In step S1105, the first unit is selected. If it is determined in step S1106 that the unit is a text, the flow advances to step S1107 to select the next unit. The processing in steps S1106 and S1107 is continued until a non-text unit is selected. When a non-text is selected, the flow advances to step S1108.

It is checked in step S1108 whether the non-text has a child. For example, in the case shown in FIG. 16, the non-text unit 39 has the main child 39 as a non-text and the children 40, 41a, and 41b as texts.

If it is determined in step S1108 that the unit has a child, the flow advances to step S1109. In this step, each unit is subjected to filtering to check whether the unit is a halftone unit. In halftone filtering, the children of the unit are checked to count children which are smaller than a "noise" size. A unit of a noise size is a unit having a height smaller than the minimum font size in the input image data. If the number of children which are smaller than the noise size is larger than ½ the total number of children, the unit is determined as a halftone drawing. As a result, the flow advances from step S1110 to step S1111 to add an attribute "halftone drawing" to the unit. In step S1112, the texts in the halftone drawing are checked. That is, the tree structure is changed such that each child in the halftone drawing which has a text size is set in the same level as that of the halftone drawing instead of being a child thereof. If this processing is properly performed, character recognition in the halftone drawing can be performed. The flow returns to step S1105 to select the next unit. The selected unit is then processed.

It is determined, after halftone filtering in step S1109, that the unit is not a halftone unit. The flow advances from step S1110 to step S1113. In step S1113, the main child of the unit is selected for the subsequent processing. The flow then advances to step S1114.

Figure 17A:
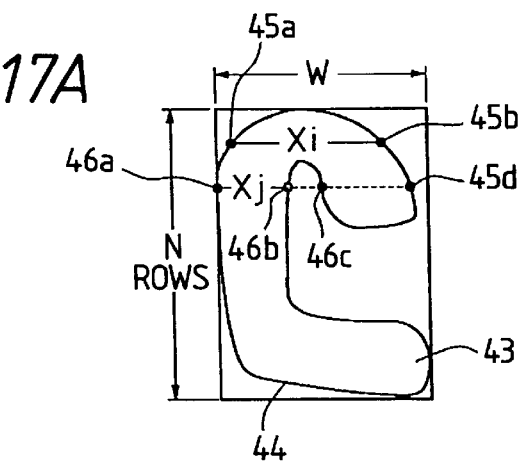
FIGS. 17A to 17C are views for explaining step S1001.

If it is determined in step S1108 that the unit is a non-text but has no child, or the main child of the unit is selected for the subsequent processing in step S1113, the unit is subjected to frame filtering in step S1114. Frame filtering is performed to check whether the unit is a frame (closing line). A unit is determined as a frame when lines constituting a rectangle surrounding the unit are parallel straight lines having almost the same width and heights. Especially, in a target unit, the line width of the connection component on each row (from the viewpoint of pixels) is checked. Referring to FIG. 17A, a non-text unit 42 includes a connection component 43 having a contour component 44. In this case, a line width x of the connection component on a row i corresponds to a distance from a left end 45a to a right end 45b of the contour line. On a row j, there are two line widths inside the connection component, i.e., the line width between points 46a and 46b and the line width between points 47a and 47b. The longest distance between the points 46a and 46b is defined as a distance x.

The distances on all rows n in the non-text unit 42 are calculated, and it is checked according to the following inequality whether the non-text unit is a frame.

$$\sum_{k=1}^{N}(Xk-W)2/N < \text{threshold}$$

where Xk is the longest line width on the kth row in the connection component, and N is the number of rows. The threshold is calculated in advance to allow detection of a frame as a frame even if the frame is inclined to a certain extent. In order to allow inclination of 1°, a threshold given by sin(1°)×L+a predetermined value may be set. This predetermined value is the average height of the characters, which is calculated in step S1104.

If the above inequality is satisfied, it is determined that the unit is frame data, and the flow advances from step S1115 to step S1116 to add an attribute "frame" to the unit. In this manner, for example, "frame and table" or "frame and halftone drawing" can be determined with respect to each frame.

After step S1116, the flow checks the possibility that the frame data includes a table or a table-like portion. In step S1117, a check is performed to obtain a white contour inside a connection component.

Figure 18A:
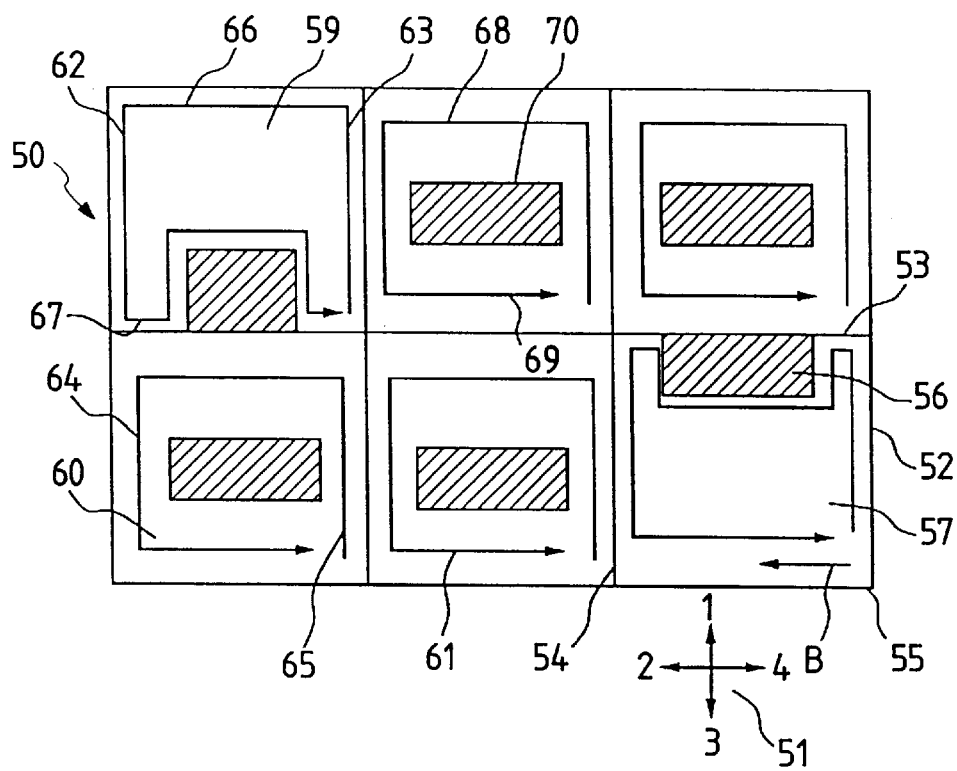
FIGS. 18A and 18B are views for explaining step S1001.

A white connection component is basically the same as the (black) contour obtained in step S1101, but is obtained by checking white pixels instead of black pixels. As shown in FIG. 18A, the inside of each non-text unit is searched from a lower right corner to an upper left corner in the direction indicated by an arrow B. When a white pixel is scanned for the first time, searches for white pixels adjacent to the scanned pixel are performed outward therefrom, as indicated by a pattern 51. Note that in this outward search processing indicated by the pattern 51, searches are only required in four directions, i.e., directions 1 to 4. That is, white contour tracing in this processing is four-direction search processing. This processing is continued until all white contours are extracted. For example, white contour tracing is performed to extract a contour portion surrounded by black line segments 52, 53, 54, and 55. Similar processing is also performed with respect to the inside of a black pixel area 56. The above scanning in the direction indicated by the arrow B is continued until all the closed white contours in the non-text object are traced.

In step S1118, the density of the non-text unit is calculated. The density is calculated by counting black pixels in the connection component, and dividing the number of black pixels by the total number of pixels surrounded by the rectangle.

If it is determined in step S1119 that the number of white contour components found in the non-text unit is equal to or lager than four, there is a possibility that the non-text image is a table or a set of text blocks arranged in the form of a table. In step S1120, a white filling factor is calculated. A white filling factor is the ratio of the area surrounded by white contour components in a non-text image to the total area of the non-text image. In the case shown in FIG. 18A, white contours 57 and 59 are constituted by only white pixels, whereas white contours 60 and 61 include black pixel areas inside the areas surrounded by the white contours. If the filling factor is large, the non-text image may be a table or a set of a text blocks arranged in the form of a table. In order to confirm this estimation, it is checked whether a target white contour has an lattice-like internal structure in the horizontal/vertical directions. Especially, in step S1122, white contours having boundary lines which do not cross at least two contour lines in the horizontal or vertical direction are considered as white contours which are not arranged in the form of a lattice and are reconnected to each other. For example, in the case shown in FIG. 18A, left and right boundaries 62 and 63 of the white contour 59 extend in the vertical direction to coincide with left and right boundaries 64 and 65 of the white contour 60. For this reason, it is determined that these white contours are arranged in the form of a lattice, and the white contours are not reconnected. Similarly, upper and lower boundaries 66 and 67 of a white contour 63 extend in the horizontal direction to coincide with upper and lower boundaries 68 and 69 of another white contour 70. For this reason, it is determined that these white contours are arranged in the form of a lattice, and no reconnection is performed.

Figure 18B:
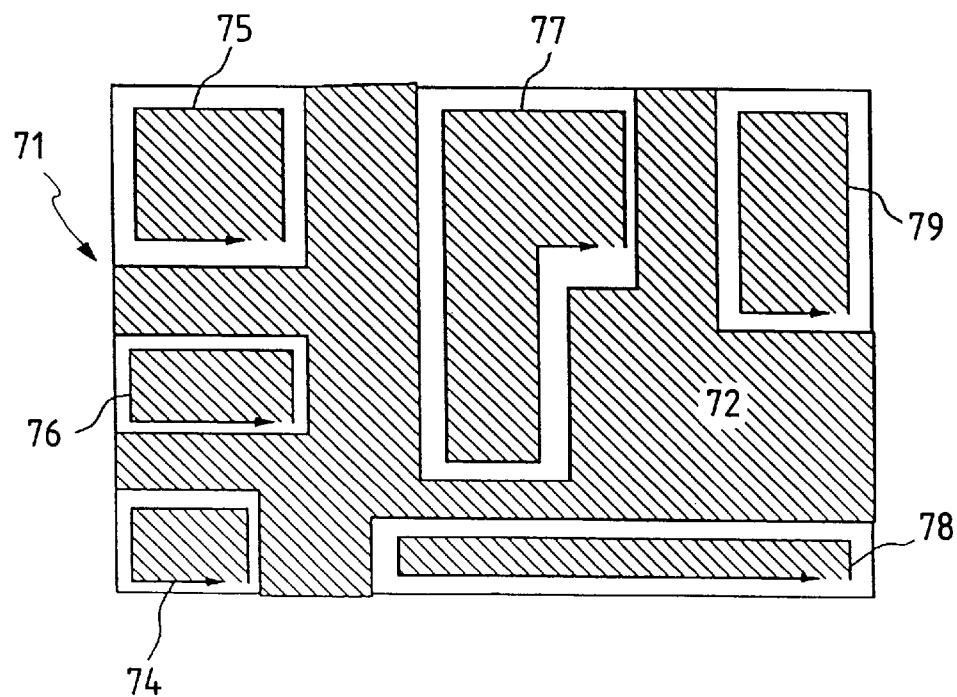
Figure 19A:
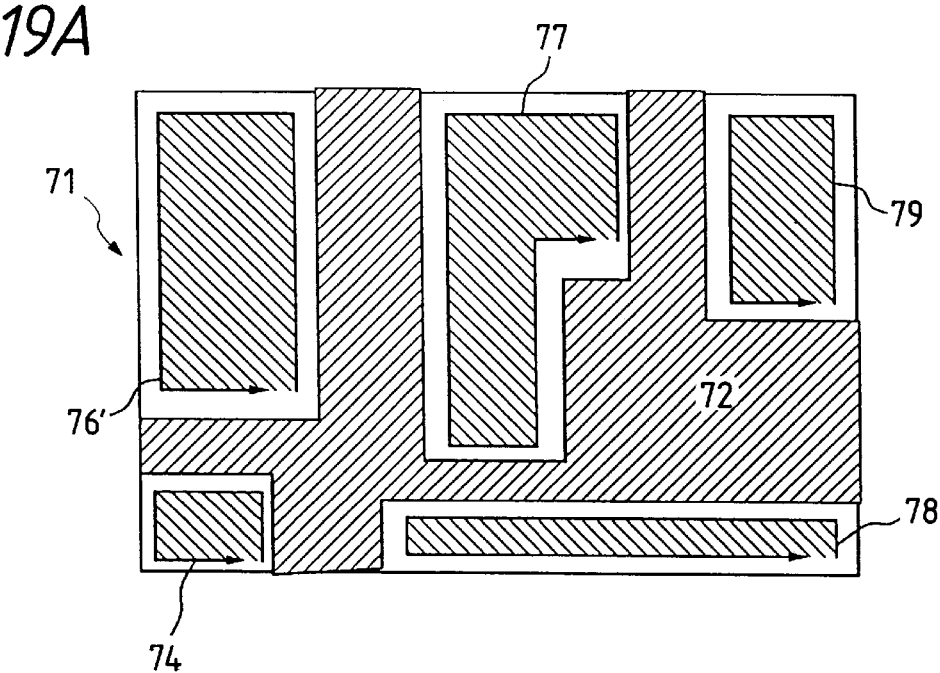
FIGS. 19A and 19B are views for explaining step S1001.
Figure 19B:
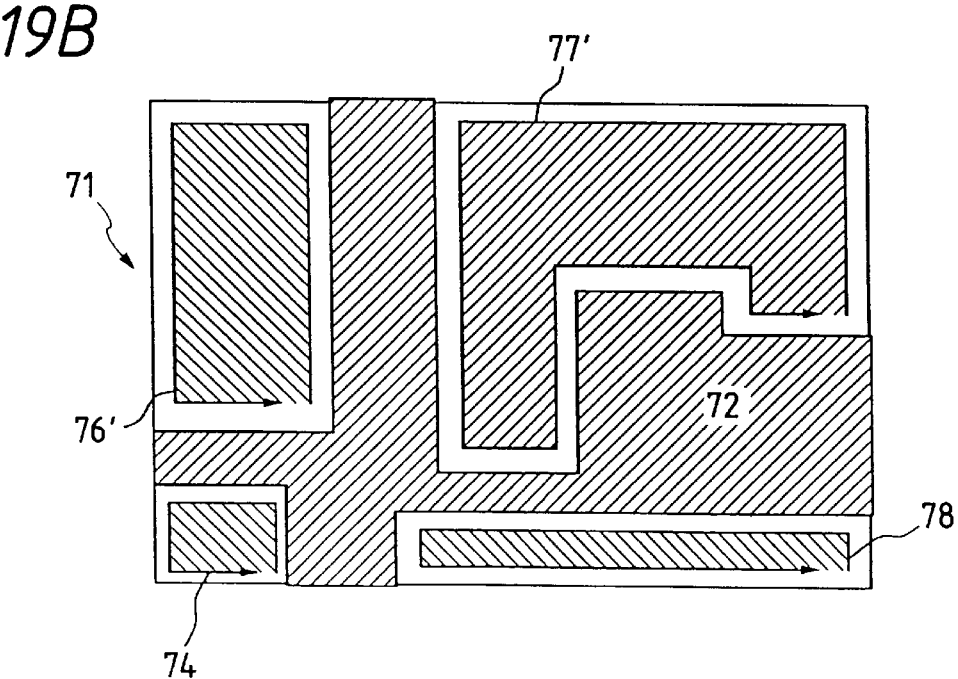

FIGS. 18B, 19A, and 19B are views for explaining a case wherein white contours are connected to each other. Referring to FIG. 18B, for example, a non-text unit 71 includes various units such as a halftone drawing unit and a binary image unit. The non-text image 71 includes a black pixel area 72 and white pixel areas 74, 75, 76, 77, 78, and 79. It is determined in step S1121 that the filling factor of this white pixel area is large. As a result, the flow advances to step S1122. First of all, as shown in FIG. 19A, the upper and lower ends of the white contour are compared with the upper and lower ends of the white contour 77. Since these upper and lower ends do not coincide with each other, the white contours 75 and 76 are connected to each other to form a new white contour 76'.

Referring to FIG. 19B, the left and right boundaries of the white contour 77 are compared with the left and right boundaries of a white contour 78. Since these boundaries do not coincide with each other, the white contours 77 and 79 are reconnected to each other to form a new white contour 77'.

This process is repeated in the horizontal and vertical directions until no reconnection occurs.

As described above, the white contours of a table are not easily connected to each other. The white contours of units other than a table, e.g., a halftone drawing and a line drawing, are easily connected to each other. In step S1123, a reconnection factor is calculated. If the reconnection factor is large, or the number of white contour components left after reconnection processing is less than four, the flow advances to step S1128. As will be described in detail later, in this step, it is checked whether the non-text unit is a halftone drawing or a line drawing.

If it is determined that the reconnection factor is not large, or the number of white contour component is equal to or larger than four, the flow advances to step S1124, and the non-text unit is determined as a table. In step S1125, the inside of the unit newly determined as a table is checked, and connection components included in the table are searched and classified. In step S1126, the tree structure is updated in accordance with the new internal connection components. In step S1127, each internal connection component is classified again as a text or a non-text, and an adequate attribute is added thereto. This processing is the same as that in steps S1102 and S1104 described above. The flow then returns to step S1107 to select the next text unit.

If it is determined in step S1121 that the filling factor is not large, or it is determined in step S1123 that the reconnection factor is not large, it is highly probable that the non-text closing line drawing is a halftone drawing or a line drawing. Whether the unit is a halftone drawing or a line drawing is determined on the basis of the average run length of the black pixels in the unit in the horizontal direction, the ratio between the white pixels and the black pixels, and the density. In general, a very dark image is regarded as a halftone drawing, whereas a white, bright image is determined as a line drawing.

Especially, if the average run length of the white pixels is almost 0 (the unit is an almost black image or spotted image), and the density of the white pixels calculated in step S1118 is higher than that of the black pixels (i.e., the density is higher than a threshold of about 0.5 (the first threshold)), the closing line unit is determined as a halftone drawing. If the density is not larger than the first threshold, the unit is determined as a line drawing.

If the average run length of the white pixels is not almost 0, and the average run length of the white pixels is larger than that of the black pixels, the closing line unit is determined as a line drawing. If, however, the average run length of the white pixels is not larger than that of the black pixels (i.e., the unit is a blackish image), a further text is required.

Especially when the number of black pixels is much smaller than that of the white pixels (i.e., the number of black pixels is smaller than twice the number of white pixels (second threshold)), the closing line unit is determined as a halftone drawing. If a value obtained by dividing the number of the black pixels by the number of the white pixels is not larger than the second threshold, and the density calculated in step S1118 is larger than the first threshold, the closing line unit is determined as a halftone drawing. Otherwise, the closing line unit is determined as a line drawing.

If it is determined in step S1128 that the closing line unit is determined as a line drawing, the flow advances to step S1129 to add an attribute "line drawing" to the unit. In step S1130, all the children of the unit are removed. Especially when a given unit is determined as a line drawing, character recognition processing is not performed any more with respect to the unit. Thereafter, the flow returns to step S1107 to select the next text unit.

If it is determined in step S1128 that the closing line unit is not a line drawing, the flow advances to step S1131 to add an attribute "halftone" to the unit. In step S1132, a child of the text size, of the children of the unit, is removed. All the children larger than the text size are allowed to be left as the children of a closing line and halftone drawing. The flow then returns to step S1107 to select the next text unit.

The flow returns to step S1119 to check whether the number of white contour components is equal to or larger than four. If NO in step S1119, it is determined that the closing line unit is not a table. The flow then advances to step S1133 to compare the density calculated in step S1118 with a given threshold (about 0.5). This threshold is selected on the assumption that the text unit or a line drawing surrounded by a closing line is smaller than ½ the total pixel area. If the density is smaller than this threshold, the flow advances to step S1134 to check the internal structure of the closing line unit. This processing is the same as that for the internal structure of the closing unit in step S1101 described above.

If it is determined in step S1133 that the density is not smaller than the predetermined threshold, the flow advances to step S1122. In this step, the closing line unit is classified as a line drawing or a halftone drawing, or it is determined that the closing line unit cannot be classified (i.e., the closing line unit is "unknown").

The returns to step S1115. If no line drawing is detected in the non-text unit by frame filtering in step S1114, the flow advances to step S1135 to check whether the non-text unit includes a line. It can be said that "line" is a useful non-text unit for representing a boundary of a text. However, a text defined (surrounded) by such a line is often very close to the line, and the text and the line may be in contact with each other. For this reason, line search processing must be performed in consideration of two cases, i.e., a case wherein a text is in contact with a line, and a case wherein a text is not in contact with a line.

Figure 17B:
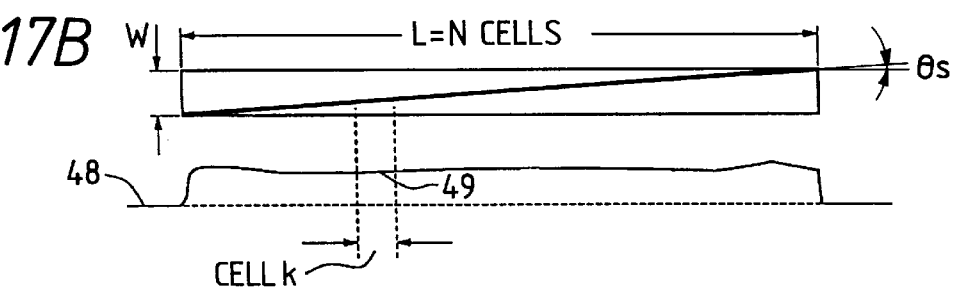

For line search processing in the case wherein a text is not in contact with a line, a histogram in the vertical direction of is calculated. In the case shown in FIG. 17B, the height of a histogram 48 of a line should be almost equal to the line width. The line width is approximately equal to the width ("W") of the text unit. If there is a difference between the height of the histogram and the line width, the difference is caused by an inclination Θs. The inclination has occurred when the original was input. In order to check whether the non-text unit includes a line, a height 49 of each cell k in the histogram is compared with the width W. As indicated by the following inequality, the mean square of the difference between these values is compared with a threshold.

$$\sum_{k=1}^{N}(cellk - W)2/N < \text{threshold}$$

This threshold is calculated to allow distortion or the inclination Θs of the line in the non-text unit. It is known that the following threshold provides a satisfactory result with respect to a distortion or inclination of 1°.

$$\sum_{k=1}^{N}[K \cdot \sin(1°)/N]2$$

Figure 17C:
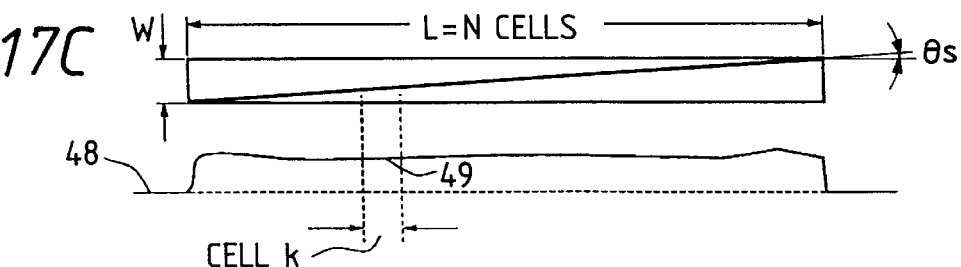

If a line which is not in contact with the non-text unit is found by the above inequality, search processing is performed to find a line in contact with the non-text unit. In order to check whether the non-text unit of interest includes a line which is in contact with the unit, it may be checked whether a line-like portion is present near a boundary line of the unit. Assume that a line is present near a boundary line surrounding the unit, as shown in FIG. 17C. In this case, whether the line is in contact with the boundary line can be checked by calculating the square sum of distances from the boundary line. In this case, the following inequality is calculated.

$$\sum_{k=1}^{N} Xk2/N < \text{threshold}$$

If the value of the left-hand side is smaller than a predetermined threshold, it can be determined that there is a line in contact with the unit. As this threshold, the same value as that used for the case wherein no contact between a line and a unit occurs may be used.

If a line is detected in step S1135, the flow advances from step S1136 to step S1137 to add an attribute "line" to the non-text unit. The flow then advances to step S1107 to select the next unit.

If no line is detected in step S1135, the flow advances from step S1136 to step S1137' to check the size of the non-text unit. If the size is smaller than a given threshold, the non-text unit cannot be classified. This threshold is determined on the basis of the maximum font size. More specifically, if the threshold is set to be ½ the maximum font size, a satisfactory result can be obtained. The flow then advances to step S1138 to add an attribute "unknown" to the unit. Thereafter, the flow returns to step S1107 to select the next unit.

If it is determined in step S1137' that the size is larger than the predetermined threshold, the flow advances to steps S1139, S1140, and S1141. In these steps, the internal area of the non-text unit is searched to find white contour components, and the number of white contour components is calculated in the same manner as in steps S1117 to S1119 described above.

If it is determined in step S1141 that the number of white contour components is less than four, the flow advances to step S1142 to calculate the size of the unit so as to check whether the unit is large enough to be determined as a line drawing or a halftone drawing. The size of the unit is determined on the basis of the eight and width of the unit and the maximum run length of black pixels. Especially when the size determined by the height and width of the non-text unit is smaller than the maximum font size, the unit is regarded as a unit which is not large enough to constitute a line drawing or a halftone drawing. As a result, the flow advances to step S1143 to add the attribute "unknown". Similarly, if the width of the unit is larger than the maximum font size but the maximum run length of black pixels is not larger than the maximum font size, the flow also advances to step S1143 to add the attribute "unknown" to the unit. The flow then returns to step S1107 to select a new unit.

If it is determined in step S1142 that the non-text unit is large enough to constitute a line drawing or a halftone drawing, th e flow advances to step S1144. The attribute "line drawing" or "halftone drawing" is then added to the unit. Since the processing in steps S1144 to S1148 is the same as that in steps S1128 to 1132, a description thereof will be omitted.

Figure 21:
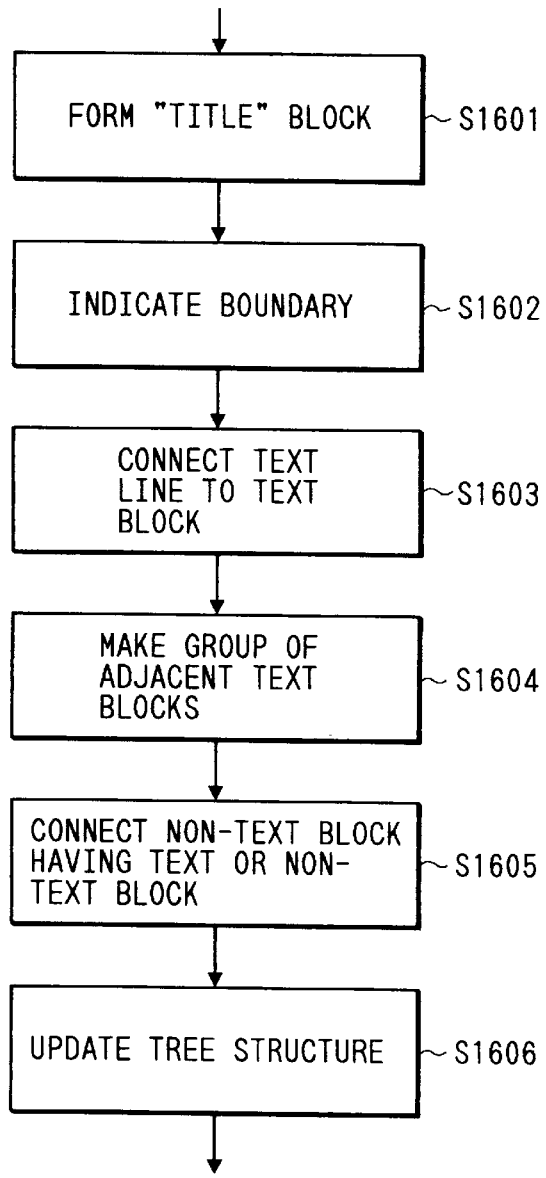
FIG. 21 is a flow chart showing step S1003 in detail.

When all the connection components in the input image are checked ad classified according to the flow charts shown in FIGS. 11 to 13 (step S1001 in FIG. 10), a tree structure like the one shown in FIG. 21 can be obtained. As shown in FIG. 21, a root corresponds to a page of the input image. The children of the root are text blocks and a non-text block constituted by "unknown", "closing line", "halftone drawing", and "line". The children of a frame are a text block, unknown non-text data, and a table. This table includes a text block constituted by "halftone drawing/line drawing" and "line".

Figure 22:
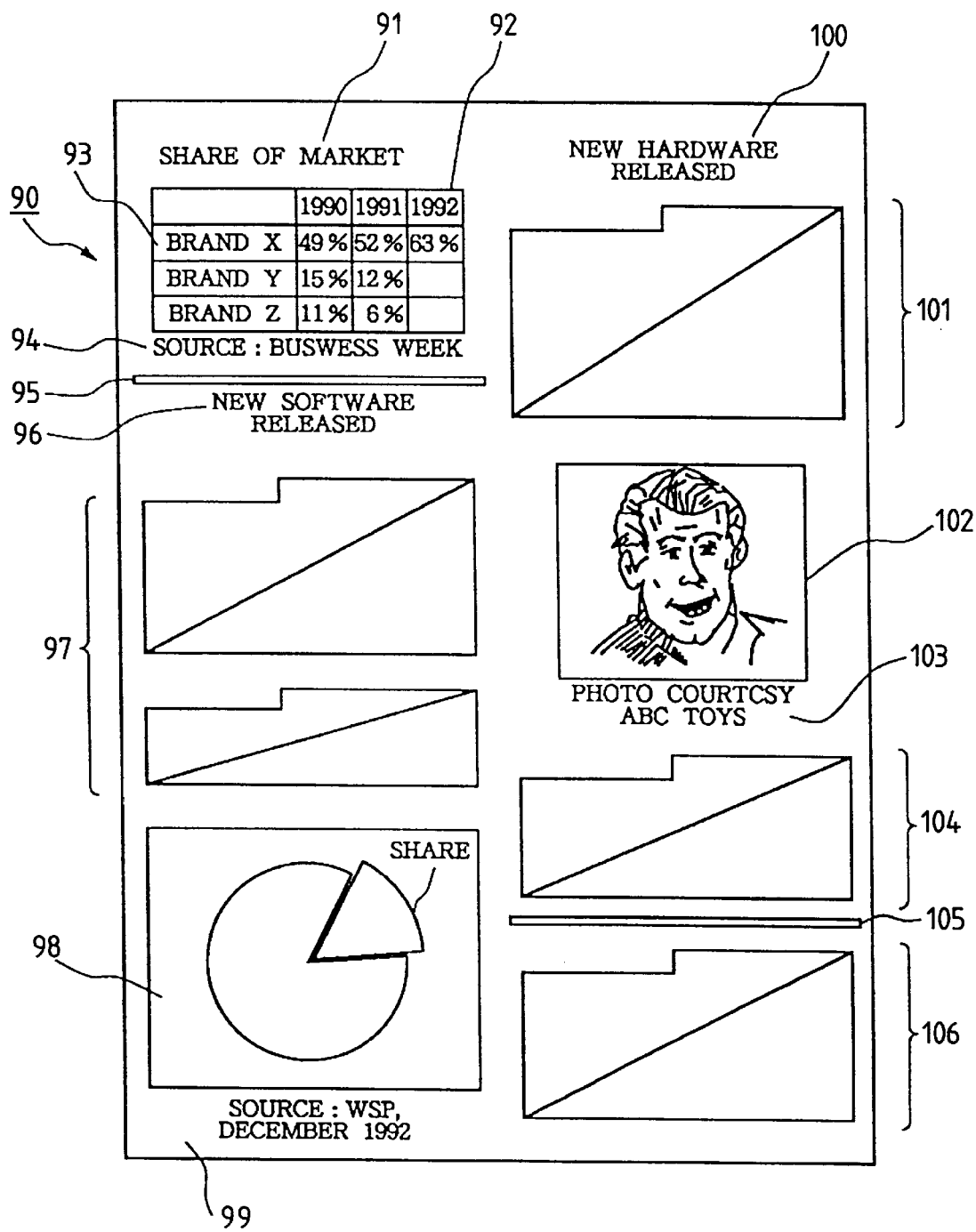
FIG. 22 is a view for explaining an example of processing executed according to the algorithm of the first embodiment.
Figure 23:
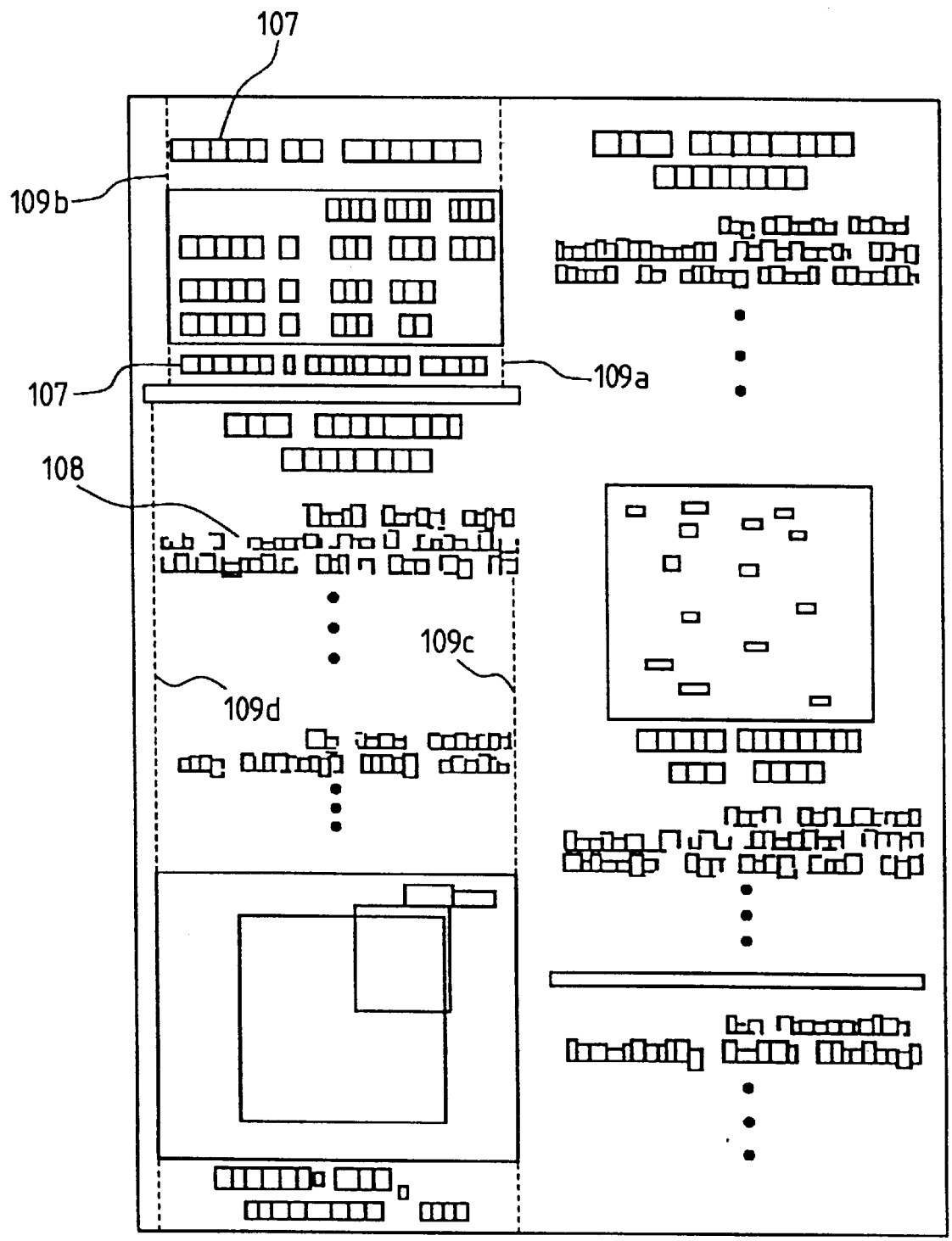
FIG. 23 is a view for explaining another example of processing executed according to the algorithm of the first embodiment.

FIG. 22 is a table showing a page 90 of pixel image data. This page 90 includes a text 90 of a large font size, a table 92 including, e.g., text data 93, text data 94, a horizontal line 95, another title 96, text data 97 constituted by two paragraphs, a line drawing 98 having a caption 99 and surrounded by a frame, the second column starting from a title 100 and following text data 101, a halftone image 102 having a caption 103 and surrounded by a frame, text data 104, a horizontal line 105, and a last paragraph 106. FIG. 23 shows an image obtained by performing the processing in step S1001 with respect to the same image. As is apparent from FIG. 23, the connection components in the page 90 are expressed as rectangles, and the attribute of each connection component is checked by the processing in steps S1115 to S1134.

All the text units obtained in step S1001 are grouped in the horizontal direction regardless of their positions in the tree. This grouping operation is based on the degree to which the respective text units and surrounding units are gathered. A gap (space) extending in the vertical direction and indicating a column setting is detected and held. The processing in step S1002 will be described in detail below with reference to FIG. 20.

In step S1501, the left and right boundary lines of the non-text unit are extended to form gap-line markers. As shown in FIG. 23, gap-line markers 109a and 109b are extended in the vertical direction to cross a text or non-text unit (a unit 95 in this case). Similarly, gap-line markers 109c and 109d are extended to cross the unit 95. Gap-line markers are effectively used to detect gaps (spaces). With this detection, a column setting can be obtained.

In step S1502, a text unit like a text unit 107 in FIG. 23 is connected as a text line satisfying the following conditions: i) the text unit should not cross over any gap-line marker, and ii) the text unit should be in contact with another text unit or be at a distance equal to or smaller than a predetermined threshold. As this threshold, a value obtained by multiplying the average text length obtained in step S1104 by an experimentally obtained scale factor (a satisfactory result can be obtained with a scale factor of 1.2) may be used. If, however, the gap between text units is extended in the vertical direction, it can be checked whether there is a gap extending in the vertical direction and representing a column structure. For example, in the case shown in FIG. 23, a gap 103 is present between two texts. The gap extends over several columns in the vertical direction. Therefore, in step S1502, even if the distance between the text units is smaller than the threshold, the distance is left as a gap.

In step S1503, a pair of text units which are not connected to each other in step S1502 are connected to each other if the two units are overlapped by other adjacent text units, and connection of the two units can be performed without crossing any gap-line marker. This step is effective in removing gaps which are not based on the column structure but are based on the spaces between text lines. In the case shown in FIG. 23, the gap 108 left in step S1502 is removed in step S1503. This is because the characters above the gap are overlapped by the characters on a line immediately below the gap, and connection between the two lines can be performed without crossing any gap-line marker.

In step S1504, the tree structure is updated.

Figure 24:
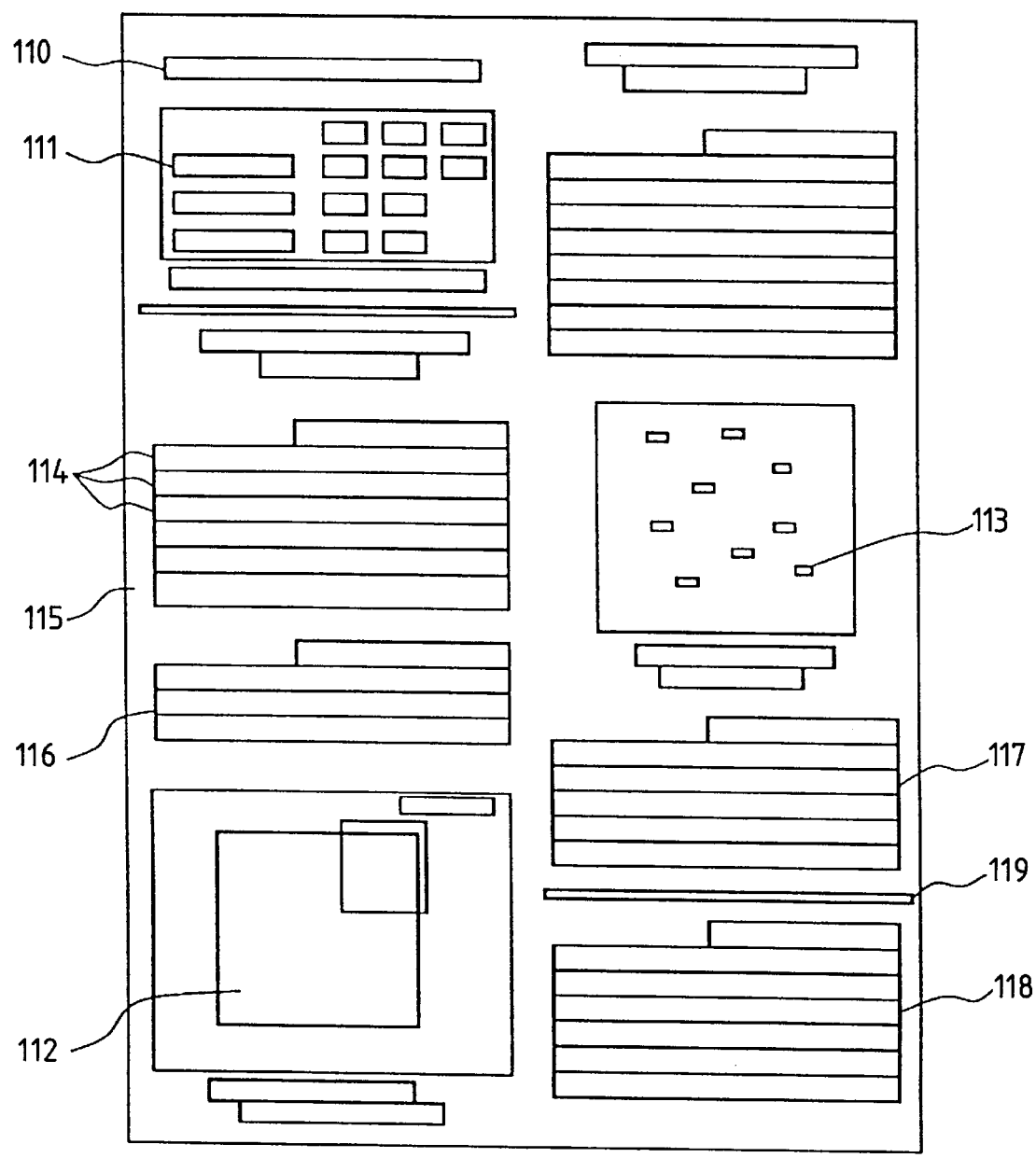
FIG. 24 is a view for explaining still another example of processing executed according to the algorithm of the first embodiment.
Figure 27:
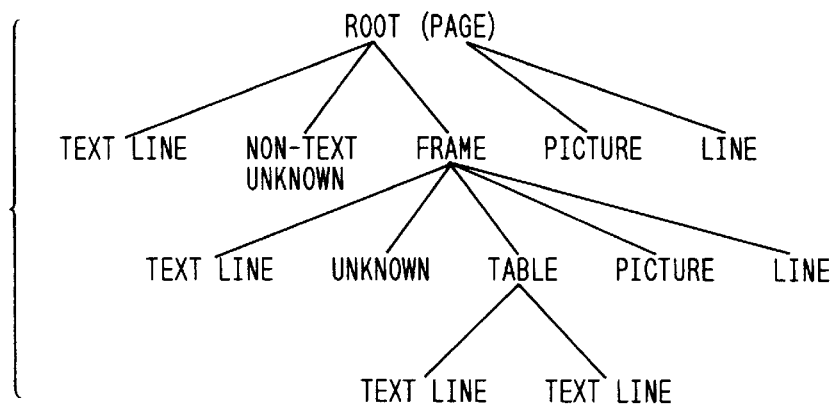
FIG. 27 is a view for explaining still another example of processing executed according to the algorithm of the first embodiment.
Figure 28:
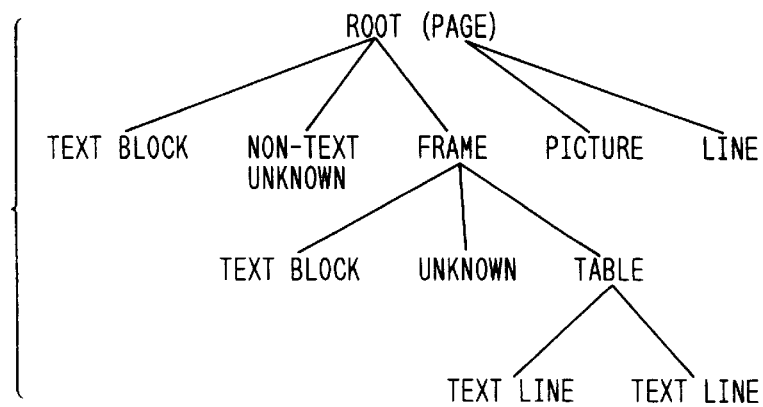
FIG. 28 is a view for explaining still another example of processing executed according to the algorithm of the first embodiment.

FIG. 24 is a schematic view showing a result obtained by the grouping processing in step S1002 described above. FIG. 27 shows how the tree structure is changed after the processing in step S1002. As shown in FIG. 24, for example, connected text units are grouped into a text line 110. Especially, text units are connected to each other to form a text line regardless of their position in a tree structure. For example, although a text unit 111 is located below a frame table in the tree structure, the text unit 111 is connected. Note, however, that re-grouping beyond the white contour, obtained in steps S1117 to S1139 is not performed. This is because the items in a table should not be grouped into one line. The gap between the left and right columns is held. In addition, non-text units are not re-grouped. Even if, therefore, non-text units, e.g., are located at a distance equal to or smaller than a threshold, they are not grouped as in the case of non-text units 112 and 113.

FIG. 27 shows a tree structure reflecting this new grouping.

Figure 20:
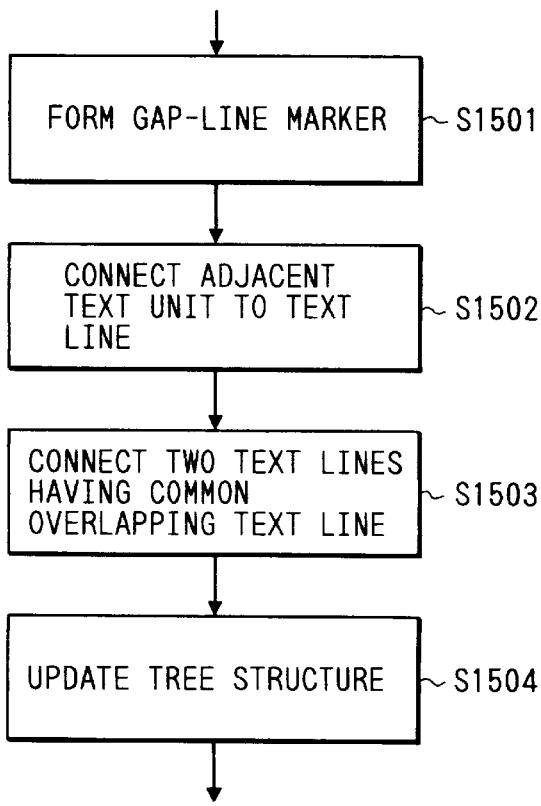
FIG. 20 is a flow chart showing step S1002 in detail.

After text units are connected to each other by the process described with reference to FIG. 20 (step S1002 in FIG. 10) so as to form text lines, the text lines are connected to each other in the vertical direction to form text blocks. This process will be described in more detail below with reference to FIG. 21. The process of grouping is based on the degree to which text line units are gathered and the position of non-text units. For example, a non-text line between text lines serves as a boundary line to prevent the text lines on the opposite sides of the non-text line from being grouped into one text block. All the text lines between two consecutive non-text line units are simultaneously processed. Furthermore, in step S1003, it is checked whether to connect several text units to a non-text unit (for example, a caption constituted by text units and a non-text unit), or connect a given non-text unit to another non-text unit (for example, a line drawing associated with a halftone drawing).

FIG. 21 is a flow chart showing how text lines are grouped into text blocks. In step S1601, a title block is formed from some of the units classified as non-text units in step S1104. The criterion used for this classification is a size which is smaller than the maximum font size but is larger than the average text size. A title block is formed by grouping all non-text units which have such a size and are adjacent to each other. An attribute "title" is added to this block. An attribute "line drawing and character" is added to each of the remaining non-text blocks which cannot be grouped. The tree structure is updated accordingly. Note that a title can be effectively used to remake a page.

In step S1602, non-text units between the text units are detected. These non-text units serve as boundary lines between the text blocks to prevent the text lines from being grouped into one text block.

In step S1603, the text lines are grouped in the vertical direction by a process constituted by two steps to form text blocks. In the first step, a search for a gap between columns is performed. For this purpose, for example, histograms in the vertical direction of pixels are calculated. In the second step, if the distance between text lines which are consecutive in the vertical direction is smaller than the text height calculated in step S1104, these text lines are grouped within each column. Step S1603 is effective in connecting text lines belonging to the same column as in the case of text lines 114.

In step S1604, text blocks which are adjacent to each other in the vertical or horizontal direction are grouped, if they are not separated from each other via non-text units and any gaps found from the histograms obtained in step S1603 are not destroyed. Grouping of text blocks is performed on the basis of a separated state between blocks smaller than a predetermined threshold calculated in accordance with a height in the vertical direction calculated in step S1104. Step 1604 is effective in grouping text blocks formed from the text lines of paragraphs 115 and 116, but is not effective in connecting text blocks 117 and 118. This is because these text blocks are separated from each other via a non-text block 119 (line). In step S1605, it is determined whether to connect a given text block to a non-text block or connect a given non-text block to another non-text block. A text block can be connected to a non-text title block, a non-text halftone drawing block, or a non-text line having an attached portion. Such connection is performed in accordance with the following determination.

(1) If a given text block is located near a non-text title block and overlaps it in the vertical direction, the text block is connected to the non-text title block.

(2) If a given text block is smaller than a block of a word size (both in the horizontal and vertical directions), and has no adjacent text block of the word size, the text block is arranged inside a non-text halftone drawing block.

(3) When a given text block overlaps a non-text line having an attached portion, the line having the attached line may be a text with an underline. Therefore, such a non-text line is simply determined as a text.

In addition, several non-text blocks are connected to other non-text blocks according to the following table.

TABLE 1

|  | Halftone Drawing | Line Drawing | Character and Line Drawing | Title |
|---|---|---|---|---|
| Halftone Drawing | Test #1 | non-connection | connection | non-connection |
| Character and Line Drawing | Test #1 | Test #2 | Test #2 | Test #3 |
| Line Drawing | Test #1 | Test #1 | non-connection | non-connection |
| Title | non-connection | non-connection | non-connection | Test #3 |

The following are the contents of Test #1 to Test #3.
Test #1:
If a given block is completely included in another block, they are connected to each other.
Test #2:
If the width of each picture text is smaller than the width of a word size block, the picture texts are connected to each other.

Test #3:
If blocks are close to each other, they are connected to each other.

In step S1606, the attributes are changed, and the tree structure is updated by the processing described above.

Figure 25:
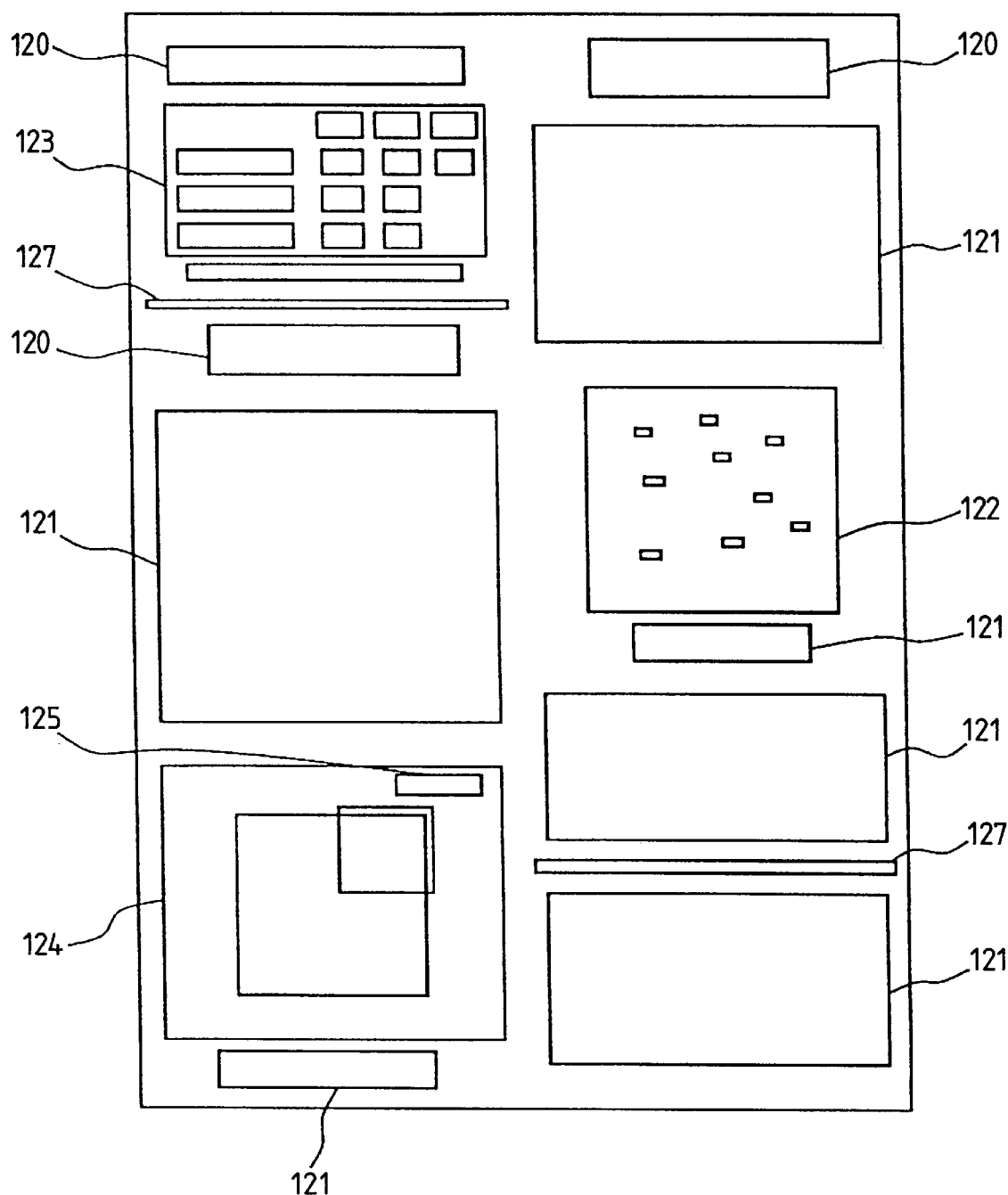
FIG. 25 is a view for explaining still another example of processing executed according to the algorithm of the first embodiment.
Figure 26:
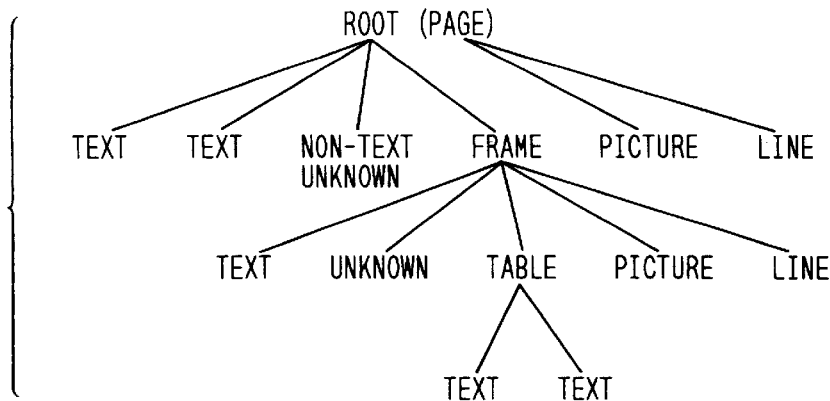
FIG. 26 is a view for explaining still another example of processing executed according to the algorithm of the first embodiment.

FIG. 25 shows a block structure obtained by the processing shown in FIG. 21. FIG. 23 shows a tree structure. The blocks shown in FIG. 25 include a title block 120, a text block 121, and a halftone drawing/line drawing 122. In addition, closing line data are a block 123 in the form of a table and a block 124 including a text unit 125 therein and having a table structure. Non-text images 127 serve as separators with respect to various units in FIG. 25.

Block section processing is performed by the image memory unit 9 according to the above-described algorithm. By this block selection processing, each of the units, in the image, basically constituted by black pixel connection components is identified as a character portion, a title portion, a closing line portion, a table portion, a halftone drawing portion, a line drawing portion, a line portion, or a caption portion such as a table or a drawing. In addition, the coordinates and sizes of minimum rectangles surrounding the respective units are obtained as a block selection processing result. This block selection processing result is temporarily recorded, as block selection processing result information, in the memory 904. This block selection processing result information can be transferred to the computer 12 via the computer I/F unit 7, and various image processes can be performed on the basis of the block selection processing result information transferred to the computer 12. Note that since transfer of the information temporarily recorded in the memory 904 to the computer 12 has been described in detail above, a description thereof will be omitted.

In the above image system, an image is read first, as image data, from the reader unit 1, the host computer 12 via the computer I/F unit 7, or the fax unit 4, and is sent to the image memory unit 9 via the core unit 10. Block selection processing is then performed to classify the read image data in units of attributes. Subsequently, images are extracted only from regions corresponding to attributes (e.g., a character portion, a title portion, and a caption portion) selected in advance through the console unit 124 of the reader unit 1 or the host computer 12, and are sent to the printer unit 2 via the core unit 10, thereby outputting images (e.g., obtained by extracting only a character portion, a title portion, and a caption portion from the original image). Alternatively, such images are sent, as image data, to the host computer 12 via the computer I/F unit 7.

The above image data may be sent to the fax unit 4 to be transmitted to a certain destination.

The above image data may be sent to the file unit 5 to be stored in the external memory apparatus 6.

In this case, the attribute selection information is sent to the CPU 906 via the core unit 10. As a result, of the image data stored in the memory 904, only image data in areas corresponding to the selected attributes are output to the core unit 10.

[Second Embodiment]

In an image forming system as in the first embodiment, an image is read first, as image data, from a reader unit 1 or a host computer 12 via a computer I/F unit 7 and sent to an image memory unit 9 via a core unit 10. In the image memory unit 9, block selection processing as in the first embodiment is performed to classify the image data in units of attributes. Subsequently, images are extracted only from regions corresponding to attributes (e.g., a halftone drawing portion and a line drawing portion) selected in advance through a console unit 124 of the reader unit 1 or the host computer 12. In addition, in a printer unit 2, the extracted images are enlarged/reduced to fit the size of an output paper sheet set in advance or the size of one of paper sheet which can be output if the size of an output paper sheet is not specifically set in advance. The resultant image data (e.g., a halftone drawing and a line drawing enlarged/reduced to fit the size of an output paper sheet) is output to the printer unit 2 via the core unit 10.

The above image data may be sent to a fax unit 4 to be transmitted to a certain destination.

Alternatively, the image data may be sent to a file unit 5 to be stored in an external memory apparatus 6.

In this case, the paper size information is sent to a CPU 906 via the reader unit 1 and the core unit 10. The CPU 906 then magnifies the image data at a magnification corresponding to the size information.

[Third Embodiment]

In an image forming system as in the first embodiment, an image is read first, as image data, from a reader unit 1 or a host computer 12 via a computer I/F unit 7 and sent to an image memory unit 9 via a core unit 10. In the image memory unit 9, block selection processing as in the first embodiment is performed to classify the image data in units of attributes. Subsequently, images are extracted only from regions corresponding to attributes (e.g., a character portion, a title portion, and a caption portion) selected in advance through a console unit 124 of the reader unit 1 or the host computer 12. The extracted images are rearranged to reduce space portions. If images corresponding to a plurality of paper sheets are read, the rearrangement may be performed over a plurality of images. For example, images corresponding to two paper sheets may be stuffed into images corresponding to one paper sheet. The rearranged images are sent to a printer unit 2 via the core unit 10, thereby outputting images (e.g., images obtained by extracting only a character portion, a title portion, and a caption portion from the original image). Alternatively, these images are sent, as image data, to the host computer 12 via the computer I/F unit 7. With this operation, only necessary images can be extracted altogether.

The above image data may be sent to a fax unit 4 to be transmitted to a certain destination. With this operation, only necessary data can be transmitted within a short period of time.

The image data may be sent to a file unit 5 to be stored in an upper boundary 6. Since only necessary data is automatically filed, the efficiency of filing can be improved.

[Fourth Embodiment]

In an image forming system as in the first embodiment, an image is read first, as image data, from a reader unit 1 or a host computer 12 via a computer I/F unit 7 and sent to an image memory unit 9 via a core unit 10. The image data read in this case is multivalued data. Block selection processing as in the first embodiment is then performed to classify the read image data in units of attributes. The original multivalued image data is binarized on the basis of correspondence between binarization methods and attributes (for example, an average density retention method for a halftone drawing and a simple binarization method with a fixed threshold for other images), which is designated through a console unit 124 of the reader unit 1 or the host computer 12. The binarized data is sent to a fax unit 4 via the core unit 10 to be transmitted. If, for example, a halftone area is binarized by the average density retention method, and other portions are binarized by the simple binarization method, a portion in which a halftone image is to be retained can be faithfully reproduced, while other portions become clear images having undergone undercolor removal and noise reduction. In addition, with the use of the simple binarization method, the compression ratio can be increased. Therefore, clear images can be sent within a short period of time.

The above image data may be sent to a file unit 5 and an external memory apparatus 6, instead of the fax unit 4. With this operation, as described above, clear images can be stored with a small storage capacity.

[Fifth Embodiment]

In an image forming system as in the first embodiment, an image is read first, as image data, from a reader unit 1 or a host computer 12 via a computer I/F unit 7 and sent to an image memory unit 9 via a core unit 10. Block selection processing as in the first embodiment is then performed to classify the read image data in units of attributes. The original multivalued image data is compressed on the basis of correspondence between compression methods and attributes (for example, different parameters are set for a halftone drawing portion and other portions), which is designated through a console unit 124 of the reader unit 1 or the host computer 12. The compressed data is transferred to the host computer 12 via the core unit 10 and the computer I/F unit 7. With this operation, since compression methods and parameters suitable for the respective attributes can be set, the entire image can be optimally compressed.

[Sixth Embodiment]

In an image forming system as in the first embodiment, an image is read first, as image data, from a reader unit 1 or a host computer 12 via a computer I/F unit 7 and sent to an image memory unit 9 via a core unit 10. Block selection processing as in the first embodiment is then performed to classify the read image data in units of attributes. The image is then reduced such that a character portion, a title portion, and a caption portion remain the same, but areas corresponding to other attributes and space portions are reduced according to a designated size. The image reduced in this manner is sent to a printer unit 2 via the core unit 10, thereby outputting an image. Alternatively, the image is sent, as image data, to the host computer 12 via the computer I/F unit 7. With this processing, an image reduced in original size can be obtained without impairing the readability of the characters.

The above image data may be sent to a fax unit 4 to be transmitted to a certain destination.

The image data may be sent to a file unit 5 to be stored in an external memory apparatus 6.

[Seventh Embodiment]

In an image forming system as in the first embodiment, an image is read first, as image data, from a reader unit 1 or a host computer 12 via a computer I/F unit 7 and sent to an image memory unit 9 via a core unit 10. Block selection processing as in the first embodiment is then performed to classify the read image data in units of attributes. A character portion, a title portion, and a caption portion are then enlarged in accordance with spaces around these portions. The obtained image is sent to a printer unit 2 via the core unit 10, thereby outputting an image. Alternatively, the image is sent, as image data, to the host computer 12 via the computer I/F unit 7. With this processing, an image with clear characters can be obtained without changing the original size.

The above image data may be sent to a fax unit 4 to be transmitted to a certain destination.

The image data may be sent to a file unit 5 to be stored in an external memory apparatus 6.

[Eighth Embodiment]

In an image forming system as in the first embodiment, an image is read first, as image data, from a reader unit 1 or a host computer 12 via a computer I/F unit 7 and sent to an image memory unit 9 via a core unit 10. Block selection processing as in the first embodiment is then performed to classify the read image data in units of attributes. Subsequently, image processing of an area corresponding to each designated attribute is performed on the basis of correspondence between attributes and various image processes (for example, halftone dot meshing for a title portion, a negative/positive reverse process for a halftone drawing portion, and a mirror image reverse process for a line drawing portion), which is determined in advance through a console unit 124 of the reader unit 1 or the host computer 12. The image which has undergone the image processing is sent to the printer unit 2 via the core unit 10 to be output, or is sent, as image data, to the host computer 12 via the computer I/F unit 7.

The above image data may be sent to a fax unit 4 to be transmitted to a certain destination.

The image data may be sent to a file unit 5 to be stored in an external memory apparatus 6.

[Ninth Embodiment]

Figure 29:
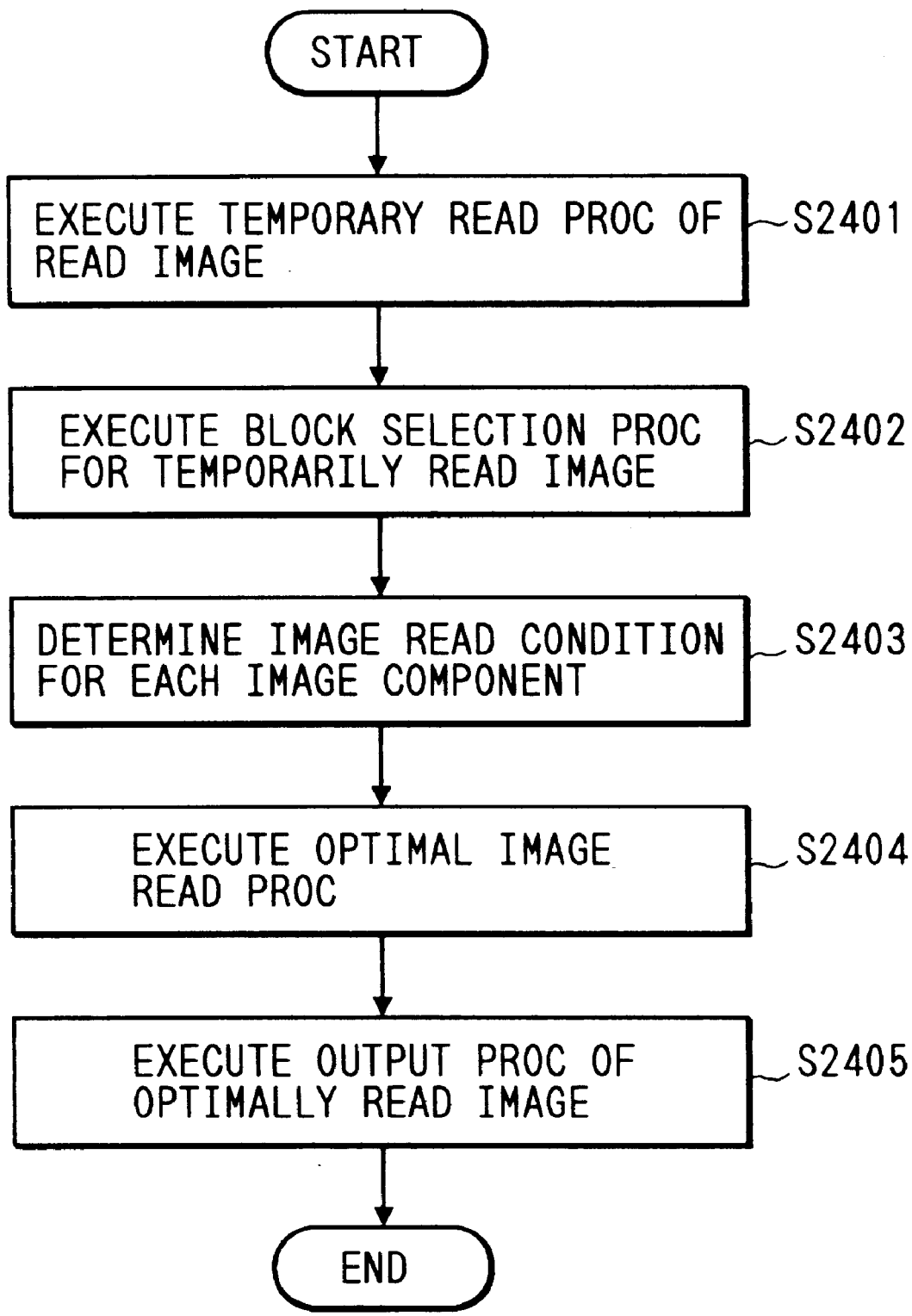
FIG. 29 is a flow chart showing an outline of optimal image read processing using the block selection processing in FIG. 9.

An embodiment in which optimal image read processing based on block selection processing is performed in an image forming system as in the first embodiment will be described in detail below with reference to the flow chart shown in FIG. 29.

In step S2401, an operator performs image temporary read processing for an image original which is placed on an original feeder 101 to be read. A temporarily read image is required to determine conditions for executing optimal image read processing afterward.

In executing temporary read processing, the operator designates temporary read processing through an operation terminal connected to a computer I/F unit 7 in the image forming system of this embodiment.

When temporary read processing is designated by the operator, the reader unit 1 in the image forming system is operated in the same manner as described in detail above in the first embodiment, thereby executing temporary read processing of the image. Assume that some standard conditions are designated in advance as for reading conditions in the reader unit 1, such as the reading density for an original and execution/non-execution of image processing such as edge emphasis and shading correction, and temporary read processing of the image is performed on the basis of these conditions.

The temporary read image read by the reader unit 1 is received by a core unit 10 of an external apparatus 3 via a signal line 1057. Although the temporary read image received by the core unit 10 is multivalued image data having gradation, the image data is input to a binarization circuit 1012 in the core unit 10 to be binarized, and the binarized data is stored in a memory 904 in an image memory unit 9. This binarization processing is required to perform block selection processing in step S2402.

In step S2402, a CPU 906 of the image memory unit 9 executes block selection processing for the temporary read image data stored in the memory 904. Since block selection processing has been described in detail in the first embodiment, a description thereof will be omitted.

With this block selection processing, each of the units, in the image, which are basically constituted by black pixel connection components is identified as a character portion, a title portion, a closing line portion, a table portion, a halftone drawing portion, a line drawing portion, a line portion, or a caption portion such as a table or a drawing. In addition, the coordinates and sizes of minimum rectangles (to be referred to as unit areas hereafter) surrounding the respective units on the image are obtained as a block selection processing result. This block selection processing result is temporarily stored, as block selection processing result, in the image memory unit 9. FIGS. 30A and 30B respectively show an actual block selection processing result and a detailed data structure of block selection processing result data formed by the processing.

In step S2403, image reading conditions in the reader unit 1 for each unit area in the read image are determined on the basis of the block selection processing result data stored in the image memory unit 9. That is, reading conditions can be changed in accordance with each unit area in one read image. Image reading conditions in the reader unit 1 are determined by starting a software program in a host terminal having a CPU connected to the computer I/F unit 7.

The following are image reading conditions in the reader unit 1 which can be determined in step S2403:

(1) reading conditions associated with the operation of the reader unit 1 itself:

reading density resolution gradation (2) conditions associated with image processing for image read by reader unit 1:

edge emphasis, smoothing coefficients shading correction coefficient gamma conversion coefficient color conversion (correction) parameter In addition to these conditions, conditions which can changed by a known method in an image read operation of the reader unit 1 in the image forming system may be added as changeable image reading conditions in the reader unit 1. In this case, at least some of these conditions are sent to a CPU 122 of the reader unit 1 via the core unit 10, and the CPU 122 sets these conditions for each unit area.

In step S2403, reading conditions in the reader unit 1 for each unit area are determined by either an automatic determination method or a method based on an instruction input operation performed by the operator.

Figure 32:
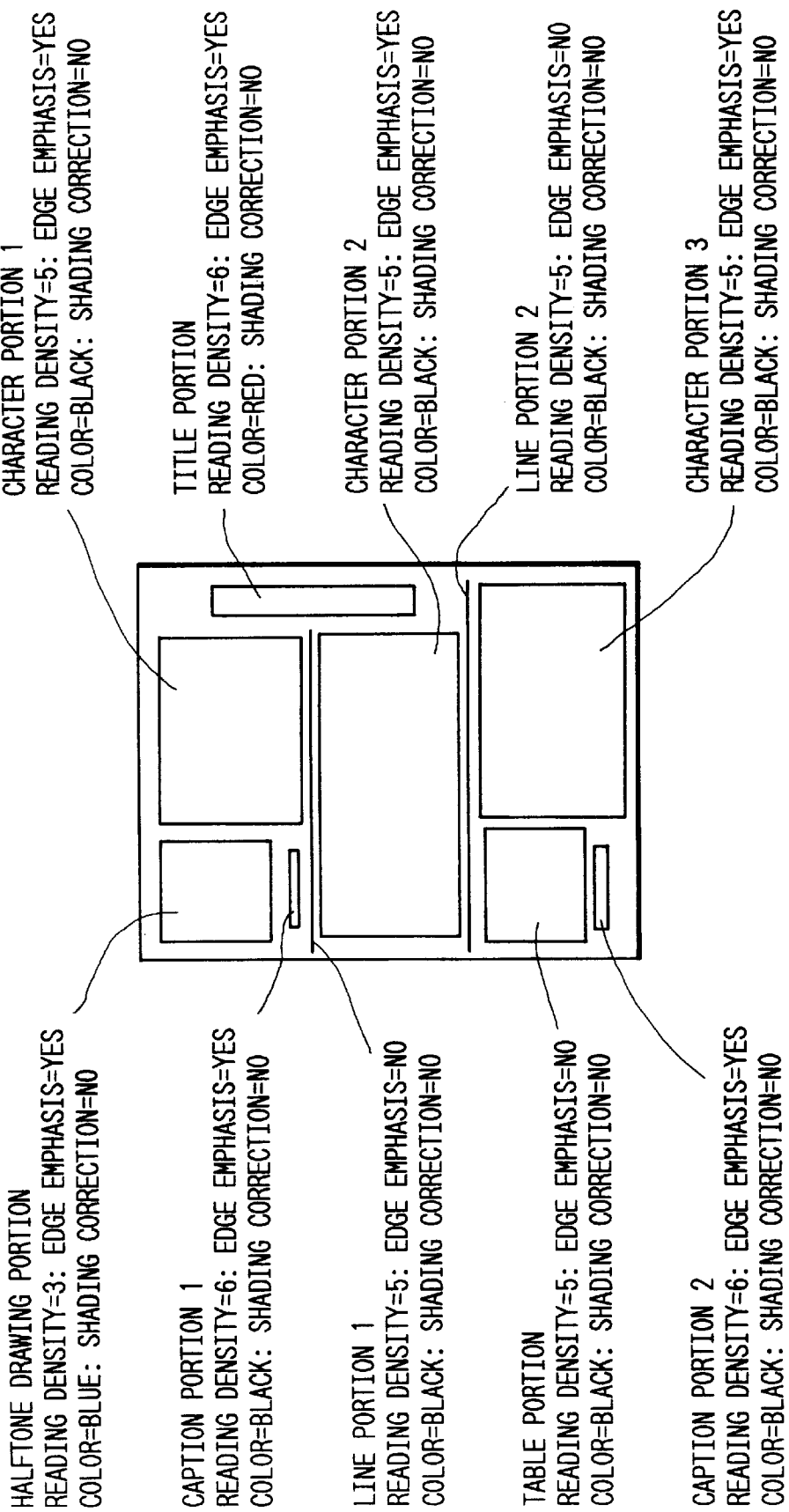
FIG. 32 is a view showing reading conditions for the respective unit areas, which are determined according to the reference table.

In the automatic determination method, reader unit reading conditions corresponding to each unit attribute which can be classified by block selection processing are determined in advance, and reading conditions for each unit area classified by the block selection processing in step S2402 are determined in accordance with the predetermined conditions. FIG. 31 shows a detailed reference table showing the correspondence between the classification of the attributes of the respective units and reading conditions. FIG. 32 shows the actual reading conditions for the respective unit areas which are determined on the basis of the reference table in FIG. 31. Note that the contents of the reference table shown in FIG. 31 may be values determined as fixed values in advance, or variable values calculated from information, such as a reader unit reading density 2601 in "halftone drawing portion" in FIG. 31 (the average density of the unit areas in this case) obtained from the temporary read image. In addition, the operator may perform an input operation by using a host computer 12 connected to the computer I/F unit 7 as an instruction input terminal so as to update the reference table, thereby determining the contents of the reference table.

In the method based on an instruction input operation performed by the operator, a block selection processing result is displayed on the host computer 12 connected to the computer I/F unit 7 in the image forming system of this embodiment, and the operator inputs reading conditions for each unit area according to an interactive scheme while seeing the display. The reading condition data for each unit is temporarily stored in the image memory unit 9 in the image forming system of this embodiment.

Subsequently, in step S2404, the image read operation of the reader unit 1 is controlled on the basis of the block selection processing result data obtained in step S2403 and the reader unit reading condition data for each unit area, thereby performing optimal image read operation. In the optimal image read operation, only unit area portions, of the image, which are obtained by performing a reader unit reading operation on the basis of the reading conditions corresponding to the respective unit areas are extracted and synthesized into one image. Control of the reader unit reading operation for this processing is performed by starting a software program in a host terminal having a CPU connected to the computer I/F unit 7 as in the read unit image reading condition determination processing in step S2403.

Figure 33:
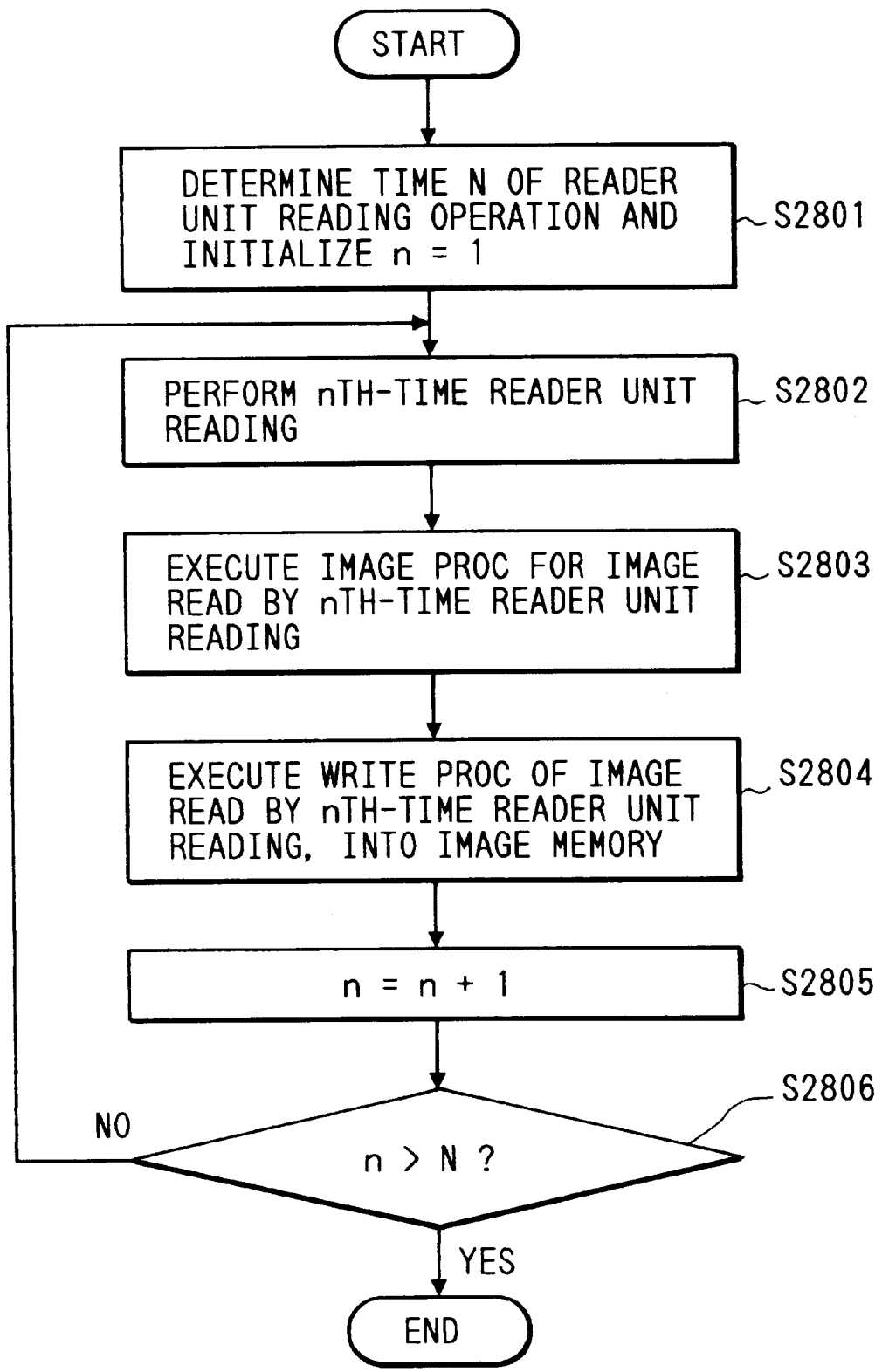
FIG. 33 is a flow chart showing control processing for a reader unit reading operation for optimal image reading.

Control processing for a reader unit reading operation for an optimal image read operation will be described in detail below with reference to the flow chart shown in FIG. 33.

In step S2801, the minimum necessary time of reader unit reading operation is determined on the basis of reader unit reading condition data for each unit. As is apparent, the time of reader unit reading operation required to obtain an optimal image should be equal to the number of reading conditions corresponding to each unit area on the image, which are obtained in step S2403. Even with different reading conditions, if only image processing conditions are the different conditions, a read image under a plurality of read conditions can be obtained by one reader unit reading operation. With this operation, the time of reader unit reading operation can be decreased. A minimum necessary time N of reader unit reading operation is determined on the basis of such determination.

In step S2802, the nth-time read unit reading operation is performed in accordance with one of reader unit reading condition data or a plurality of conditions which can be simultaneously obtained in the determination processing in step S2801. Note that n representing the time of reader unit reading operation is given as initial value n=1 in advance in step S2801.

In step S2803, image processing of the image read in step S2802 is performed in accordance with the reader unit reading condition data. In this case, the image processing based on the reader unit reading condition data is not performed for the overall image but is performed for only a unit area corresponding to the condition data. The coordinates and size of this unit area can be obtained by the block selection processing result data. In this image processing, shading correction and edge emphasis are provided by a shading circuit 112 and a contour edge emphasis circuit 115 of the reader unit 1, and other processes are provided as software programs in the host computer 12 connected to the computer I/F unit 7.

In step S2804, the read image which has undergone the image processing in step S2803 is written in the image memory unit 9. In this case, similar to step S2803, this write processing is not performed for the overall image but is performed with respect to only the unit area corresponding to the condition.

In step S2805, the time n is incremented by one. If it is determined in step S2806 that n is smaller than N, the flow returns to step S2802. The processing in steps S2802 to S2803 is repeated N times.

With the above processing, the image read operation of the reader unit 1 and the image write operation with respect to the image memory unit 9 are repeated, and the images read by the reader unit 1 under a plurality of different reading conditions are synthesized. The read image obtained in this manner is an image obtained by reader unit reading under the optimal conditions for each unit area.

The optimal read image obtained in this manner is temporarily stored in the image memory unit 9 in the image forming system of this embodiment.

Finally, in step S2405, output processing of the optimal read image temporarily stored in the image memory unit 9 in the image forming system of this embodiment is performed. Output processing units for performing output processing in the image forming system of the embodiment include a printer unit 2, a fax unit 4, an external memory apparatus 6, a host terminal connected to the computer I/F unit 7. That is, the optimal read image obtained in step S2404 can be printed out by the printer unit 2, transmitted from the fax unit 4, stored in the external memory apparatus 6, and output to the host terminal connected to the computer I/F unit 7.

[Tenth Embodiment]

In an image forming system as in the first embodiment, an image input by a reader unit 1 is edited by using block selection processing, and the edited image is displayed on the screen of a host computer 12, output to a printer unit 2, or stored in a memory. This operation will be described below.

Figure 34:
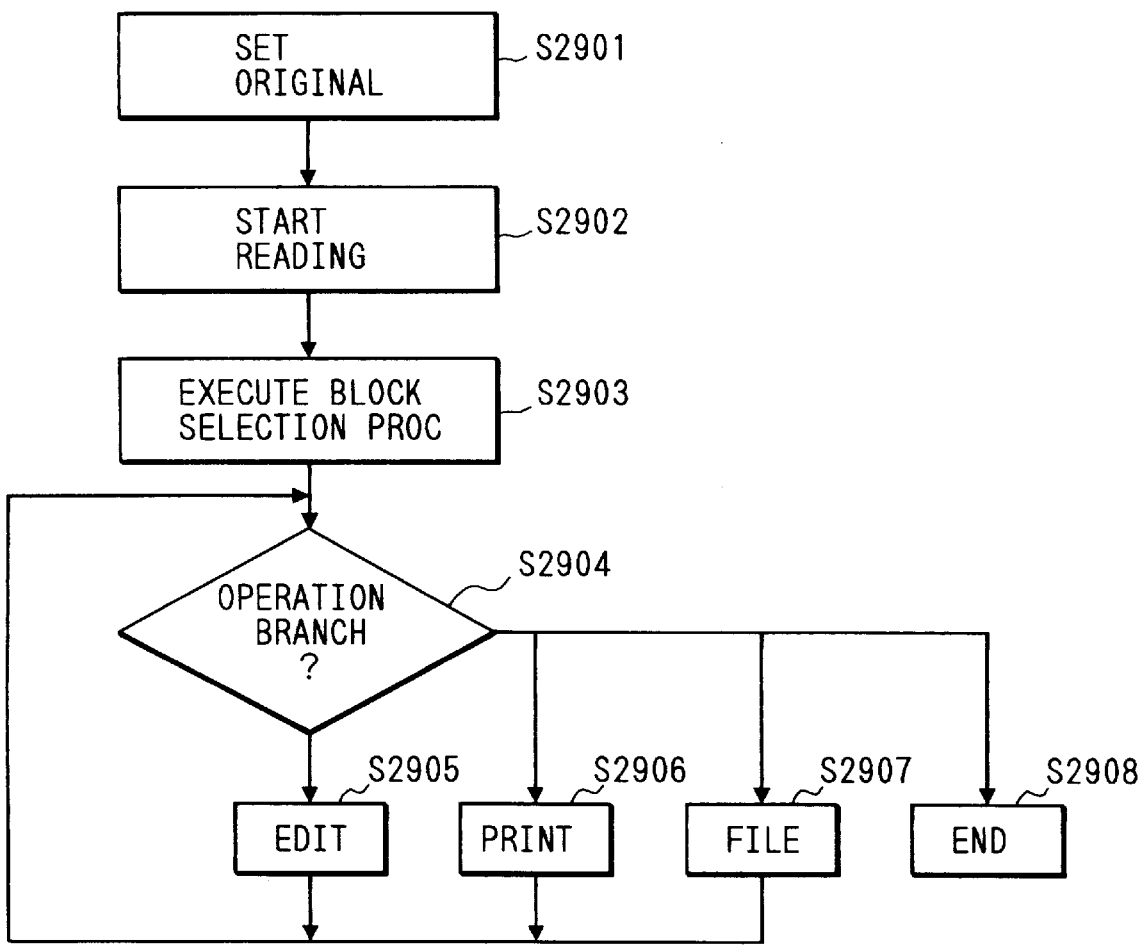
FIG. 34 is a flow chart showing the overall sequence of operations in the 10th embodiment.
Figure 35:
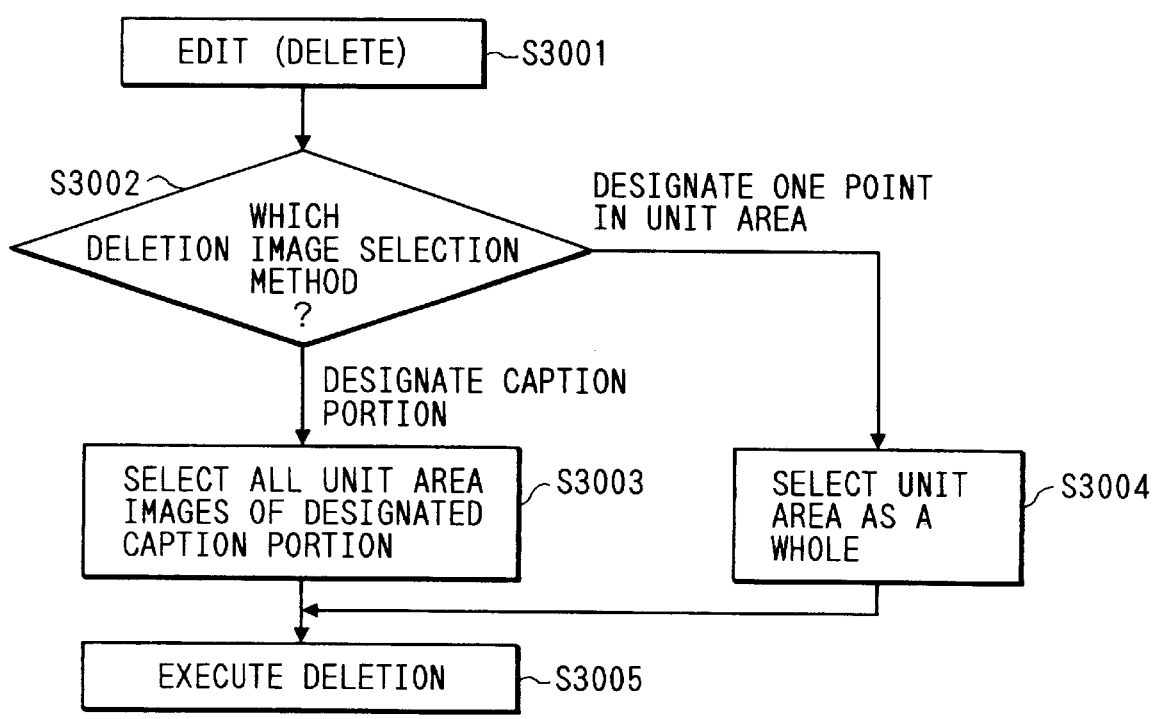
FIG. 35 is a flow chart showing edit (delete) processing in the 10th embodiment.

FIG. 34 is a flow chart showing the operation of this embodiment. FIG. 35 is a flow chart showing edit (delete) processing. These operations will be described below with reference to FIGS. 34 and 35.

In step S2901, the operator sets a desired original on an original feeder 101. In step S2902, the operator designates a read operation through an input means such as a computer 12. The image data read by the reader unit 1 is stored in an image memory unit 9. In step S2903, the above-described block selection processing is performed in the image memory unit 9. As a result, each of the units, in the image, which are basically constituted by black pixel connection components is identified as a character portion, a title portion, a closing line portion, a table portion, a halftone drawing portion, a line drawing portion, a line portion, or a caption portion such as a table or a drawing. In addition, the coordinates and sizes of minimum rectangles surrounding the respective units on the image are obtained as a block selection processing result. The image which has undergone the block selection processing is displayed on a display unit (not shown) connected to a computer terminal. In step S2905, edit processing is performed. Of edit operations, a delete operation of deleting an unnecessary image portion will be described below (step S3001).

In step S3002, the operator designates an image area to be deleted. For example, selection methods include a method of designating one point in a desired unit area on the screen with a console unit such as a mouse in the host computer 12 so as to select the overall unit area (step S3004), and a method of designating a caption portion (to be deleted) may be used to select the overall unit area including the designated caption portion information (step S3003). In step S3005, deletion of the selected image portion is designated. In the image memory unit 9, the data of the deletion image is specified and deleted on the basis of the selected unit area or caption portion.

In a layout operation of arbitrarily rearranging the respective unit areas, an image portion can be easily selected and moved by using unit area or caption portion information in the same manner as described above.

When print processing is selected in step S2906 after the edit operations, the edited image data stored in the image memory unit 9 is transferred to the printer unit 2 to be printed out. Similarly, the image data can be transferred to the fax unit 4 to be transmitted.

When file processing is selected in step S2907, index information, a keyword, and the like of the image to be registered is input, and the edited image data stored in the image memory unit 9 is transferred to a file unit 5 together with the attached information. The data is then stored in an external memory apparatus 6 connected to the file unit 5. Image data may be stored in a file in the form of a database in correspondence with each caption portion. With this operation, for example, the file can be searched by sequentially displaying only title portions.

[Eleventh Embodiment]

In an image forming system as in the first embodiment, an image is read first, as image data, from a reader unit 1 or a host computer 12 via a computer I/F unit 7 and sent to an image memory unit 9 via a core unit 10. Block selection processing as in the first embodiment is then performed to classify the read image data in units of attributes. By using the classification result, key images (obtained by extracting title portions while expressing areas of other attributes by rectangles) are generated. The read image and the generated key images are sent to a file unit 5. In the file unit 5, the image is filed as an image file, whereas the key images are filed as a key image file. In addition, these filed image and key images are sent to an external memory apparatus 6 to be stored. In searching the image, when the key image of desired image information is designated through an operation panel 124 of the reader unit 1, the file unit 5 retrieves the key image designated through the external memory apparatus 6, and outputs the image information corresponding to the key image to the printer unit 2 via the core unit 10. Alternatively, the file unit 5 sends the image data to the host computer via the computer I/F unit 7.

[Other Embodiments]

In the ninth embodiment, determination processing for reader unit reading conditions and control processing for a reader unit reading operation for optimal image reading are provided as software programs in the host terminal connected to the computer I/F unit 7. However, a determination processing apparatus for reader unit reading conditions and a control processing apparatus for a reader unit reading operation for optimal image reading may be added to, e.g., the reader unit 1 or the external apparatus 3, as parts of the arrangement of the image forming system. With this arrangement as well, these processes can be executed.

If the above processing apparatuses are added to the arrangement of the image forming system, a terminal connected to the computer I/F unit 7 need not be a host terminal but may be an instruction input terminal for receiving various instructions from the operator.

In addition, in the ninth embodiment, the image processing means other than the means for shading correction and edge emphasis are provided as software programs in the host terminal connected to the computer I/F unit 7. However, image processing apparatuses for executing these image processes may be added as parts of the arrangement of the image forming system. With this arrangement as well, the image processes can be executed.

In the 10th embodiment, processes and operations such as an edit operation may be executed by starting software programs in the computer terminal, or may be executed by adding image processing apparatuses for executing these processes and operations as parts of the arrangement of the image forming system.

Figure 36:
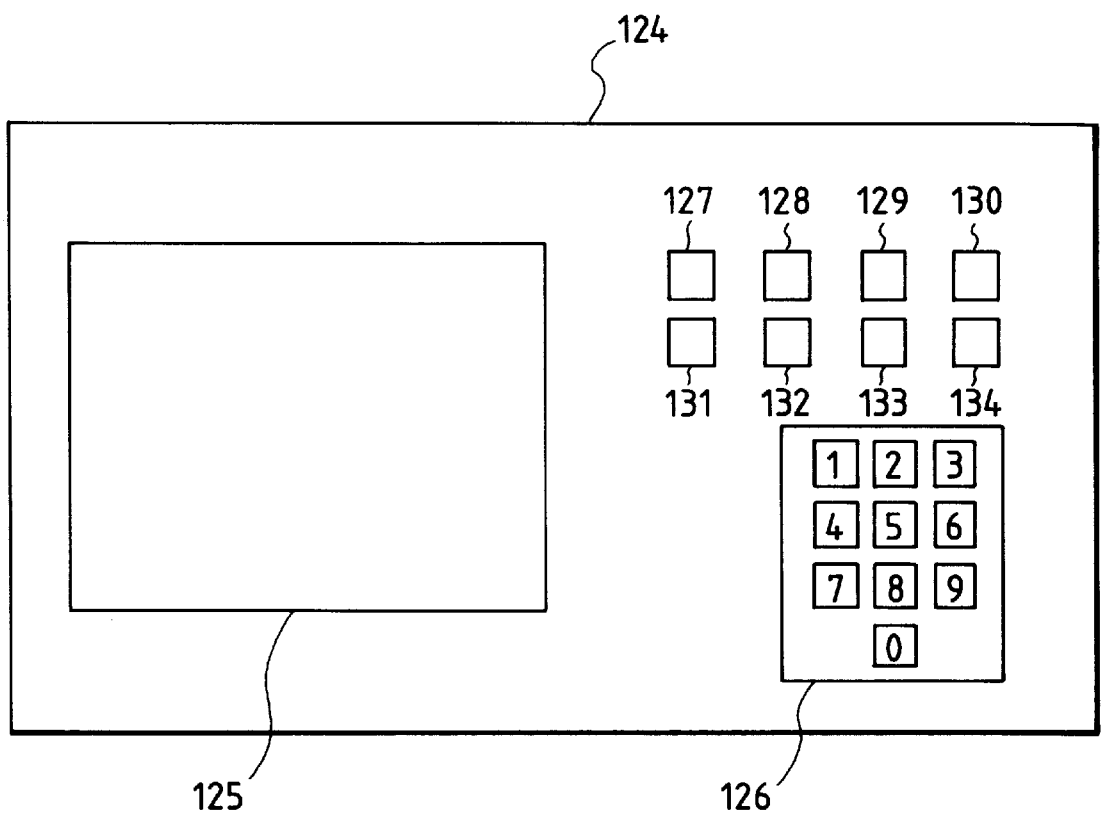
FIG. 36 is a view showing a console unit 124.

For example, the console unit 124 of the reader unit 1 may have the arrangement shown in FIG. 36.

Referring FIG. 36, the console unit 124 includes a liquid crystal touch panel display 125 for displaying various information required for operations performed by the operator. The liquid crystal touch panel display 125 also serves as soft keys and allows the operator to input information.

The liquid crystal touch panel display 125 performs display operations used for a normal copy operation, e.g., preset copy count display, paper size display, and display of a procedure for a copy operation. In addition, the liquid crystal touch panel display 125 receives the above-described block selection result from the CPU 906 of the image memory unit 9 via the core unit 10 and displays images, as shown in, e.g., FIGS. 30A and 30B.

If the liquid crystal touch panel display 125 is used for both a normal copy operation and display of a block selection result, the arrangement of the apparatus can be simplified.

If the size of the liquid crystal touch panel display 125 is not enough for display of, e.g., the images shown in FIGS. 30A and 30B, display scrolling may be performed.

Area designation for trimming, masking, and the like described above is performed by touching one point in a desired unit area displayed on the liquid crystal touch panel display 125 or inputting a corresponding number in FIG. 30B with a ten-key pad 126.

When a block selection mode key 127 is depressed, a mode for the above block selection processing is set. A processing speed of block selection can be selected by a soft key displayed on the liquid crystal touch panel display 125.

A trimming/masking mode key 128 is depressed to perform an area trimming/masking operation after block selection processing.

In addition, for example, an operation of trimming/masking a plurality of areas in a halftone drawing portion altogether can be designated by using the liquid crystal touch panel display 125.

The liquid crystal touch panel display 125 also includes an enlargement/reduction mode key 129 for enlargement/reduction processing in the second, sixth, and seventh embodiments, a rearrangement mode key 130 for rearrangement of areas in the third embodiment, a binarization mode key 131 for selecting the binarization mode in the fourth embodiment, a compression mode selection key 132 for selecting the compression mode in the fifth embodiment, an image processing designation key 133 for designating image processing for each attribute, and a filing mode key 134 for setting the filing mode in the 10th and 11th embodiments. The modes in the above embodiments are set by using these keys 129 to 134, and set information is sent to the CPU 906 of the image memory unit 9 via the core unit 10.

In the above embodiments, processing in each mode is executed by the CPU 906 of the image memory unit 9. However, the CPU 122 of the reader unit 1 may receive image data and execute the above processing on the basis of a block selection processing result sent from the image memory unit 9.

In this case, by setting only a block selection function in the external apparatus 3 alone, the copying machine constituted by the reader unit 1 and the printer unit 2 can perform all processing.

The function of the external apparatus 3 may be incorporated in the copying machine to realize a stand-alone type copying machine.

As has been described above, according to the present invention, the attributes of an image are classified, and optimal processing for each attribute is performed, thereby improving the overall quality of the image. In addition, when this processing method is applied to a copying machine, a high processing efficiency can be realized. Furthermore, an area designating operation can be omitted by automatically recognizing the above attributes.

The present invention is not limited to the above embodiments. Various modifications and changes can be made within the scope and spirit of the invention.

Especially, combinations of the above embodiments are included in the scope of the invention.

What is claimed is:

1. A copying apparatus comprising:

means for converting an object image into an image signal;

means for discriminating a character area and a non-character area of the object image based on the image signal;

means for displaying on a display means at least one of the character area and the non-character area graphically as a visible image;

means for performing mutually different image processing on the character area and the non-character area, respectively; and means for forming an image based on an output of said performing means, wherein said display means displays copying instruction information of said copying apparatus.

2. An apparatus according to claim 1, whereins aid displaying means is arranged on an operation panel of the copying apparatus.

3. An apparatus according to claim 1, wherein said converting means is a flat bed scanner.

4. An apparatus according to claim 1, wherein said discriminating means discriminates the character area and the non character area by detecting an edge of the object image.

5. An apparatus according to claim 1, wherein said mutual different image processing includes a variable magnification processing.

6. A copying apparatus comprising:

means for converting an object image into an image signal;

means for discriminating a character area and a non-character area of the object image based on the image signal;

means for reforming a character of the character area discriminated by said discriminating means;

means for printing an image on a medium based on the character reformed by said reforming means; and means for displaying the character, reformed by said reforming means, as a visible image on a display screen before said printing means prints the image.

7. An apparatus according to claim 6, wherein said converting means is a flat bed scanner.

8. An apparatus according to claim 6, wherein said discriminating means discriminates the character area and the non character area by detecting an edge of the object image.

9. An apparatus according to claim 6, wherein said reforming means reforms a shape of the character discriminated by said discriminating means.

10. An apparatus according to claim 9, wherein the shape of the character is a size of the character discriminated by said discriminating means.

* * * * *

UNITED STATES PATENT AND TRADEMARK OFFICE
CERTIFICATE OF CORRECTION

PATENT NO. : 6,072,941
DATED : June 6, 2000
INVENTOR(S) : Kazuyoshi Suzuki et al.

It is certified that error appears in the above-identified patent and that said Letters Patent is hereby corrected as shown below:

Title page,
Item [56] References Cited, under U.S. PATENT DOCUMENTS
"Kanada et al." should read -- Kanda et al. --.

Column 1,
Line 65, "portion" should read -- portion, --.

Column 8,
Line 39, "matching" should read -- matching unit --; and
Line 40, "matching" should read -- matching unit --.

Column 10,
Line 57, "can" should read -- can be --.

Column 12,
Line 47, "Unit 5) FIG. 6" should read -- Unit 5) ¶FIG. 6 --.

Column 21,
Line 40, "lager" should read -- larger --.

Column 25,
Line 14, "th e" should read -- the --; and
Line 20, "ad" should read -- and --.

Column 32,
Line 33, "can" should read -- can be --.

Column 37,
Line 32, "whereins" should read -- wherein --.

UNITED STATES PATENT AND TRADEMARK OFFICE
CERTIFICATE OF CORRECTION

PATENT NO.    : 6,072,941
DATED         : June 6, 2000
INVENTOR(S)   : Kazuyoshi Suzuki et al.

It is certified that error appears in the above-identified patent and that said Letters Patent is hereby corrected as shown below:

Column 38,
Line 3, "non character" should read -- non-character --; and
Line 27, "non character" should read -- non-character --.

Signed and Sealed this

Ninth Day of October, 2001

*Attest:*

NICHOLAS P. GODICI
*Attesting Officer*    *Acting Director of the United States Patent and Trademark Office*